March 13, 1962 M. PAPO ET AL 3,024,989

TABULATING AND COMPUTING MACHINE

Filed April 25, 1960

32 Sheets-Sheet 1

INVENTORS
MAURICE PAPO
EUGENE KOUZMINE
BY John P. Dority
ATTORNEY

March 13, 1962 M. PAPO ET AL 3,024,989

TABULATING AND COMPUTING MACHINE

Filed April 25, 1960 32 Sheets-Sheet 5

March 13, 1962 M. PAPO ET AL 3,024,989

TABULATING AND COMPUTING MACHINE

Filed April 25, 1960 32 Sheets-Sheet 6

March 13, 1962 M. PAPO ET AL 3,024,989

TABULATING AND COMPUTING MACHINE

Filed April 25, 1960 32 Sheets-Sheet 7

March 13, 1962 M. PAPO ET AL 3,024,989

TABULATING AND COMPUTING MACHINE

Filed April 25, 1960 32 Sheets-Sheet 8

March 13, 1962 M. PAPO ET AL 3,024,989

TABULATING AND COMPUTING MACHINE

Filed April 25, 1960 32 Sheets-Sheet 12

TABULATING AND COMPUTING MACHINE

Filed April 25, 1960 32 Sheets-Sheet 13

March 13, 1962 M. PAPO ET AL 3,024,989

TABULATING AND COMPUTING MACHINE

Filed April 25, 1960 32 Sheets-Sheet 16

March 13, 1962 M. PAPO ET AL 3,024,989

TABULATING AND COMPUTING MACHINE

Filed April 25, 1960 32 Sheets-Sheet 17

March 13, 1962 M. PAPO ET AL 3,024,989

TABULATING AND COMPUTING MACHINE

Filed April 25, 1960 32 Sheets-Sheet 24

United States Patent Office 3,024,989

Patented Mar. 13, 1962

3,024,989

TABULATING AND COMPUTING MACHINE

Maurice Papo and Eugene Kouzmine, Paris, France, assignors to International Business Machines Corporation, New York, N.Y., a corporation of New York Filed Apr. 25, 1960, Ser. No. 24,595

Claims priority, application France Apr. 23, 1959

8 Claims. (Cl. 235—151)

This invention relates to improvements in tabulating and computing machines operated with recording cards. The invention is particularly applicable to machines supplied simultaneously with two or more different card series, and primarily relates to the controls for such machine.

In the preparation of some invoices and account statements from recording cards various preliminary operations are required such as grouping and filing of the cards. Then the latter are often sorted into classes so that some of them may be used again. For various reasons of cost and convenience card files are often created. Such is the case for example for cards from which the name and address of a customer or of the owner of a current account are printed; cards having special importance or the likelihood of being used frequently; cards summing up the state of a stock or of a current account; cards determining special invoicing conditions, etc.

With the usual operating methods, i.e. with machines which may receive only one series of recording cards, it is necessary to merge the files and the detail cards, putting momentarily aside, if needed, the file cards for which there is no detail card, as well as all the detail cards for which no file cards have been drawn up. Later on, various other sorting and filing operations are necessary to separate the file cards from the detail cards and to remake the original files.

All these operations are relatively time-consuming and become more so as they affect a greater number of cards. They require multiple card handling which increases various risks of errors.

When it is desired to operate a machine, or a group of machines, by feeding it with two or more distinct series of record cards, it has been found that many intricate problems are raised, and which moreover are disadvantageous in that they may subdivide into a fairly great number of specific cases.

For example, in a machine or a group of machines comprising three card readers, one may be led to use only some of the card readers (one or two) the third one (or the other two) being left constantly unused. Such a case may be found in any operation wherein the three card readers are used, whenever one approaches the end of the work there always occurs a moment when the cards stored in any one of the card readers run out so that the operation must go on with only two card readers. Further, the cards stored in a second card reader will also run out, so that the work will be completed with only one card reader.

Similar problems are raised when it is desired to perform operations wherein one or two of the card readers must be used, and when it is desired to choose quite freely any of the card readers. Generally, the number and variety of the problems which may arise therefrom are such that in the past the problem has not been approached in the whole. For example, in a machine comprising three card readers A, B and C, it has been specified that an operation requiring one card reader will have to be performed with card reader A, and not with card readers B and C. Similarly, for an operation requiring two card readers, it has been specified that this operation will be performed compulsorily by means of card readers A and B and not by means of card readers A and C or B and C. Thus, and because of other similar rules, the number and variety of the problems that can be solved are reduced. Such a result is obtained to the detriment of the flexibility of the device, since the freedom in the selection is completely eliminated.

It may be useful, for a good understanding of the following description to examine some of the problems raised by the operation of a machine or of a group of machines fed with two or more distinct series of record cards.

Let it be considered first that the machine is provided with three card readers.

Let it be supposed that the cards are grouped into three series, A, B and C, having for index numbers respectively:

| Series A | Series B | Series C |
|---|---|---|
| 07<br>12-1<br>12-2<br>12-3<br>17-1 | 05<br>12-5<br>12-6<br>16<br>19 | 03<br>12-4<br>15<br>17-2 |

Let it be supposed first that these cards must be fed according to increasing index numbers, and, when their numbers are identical, in the following successive order: series A, series C, series B.

In the described example, it is seen that the feeding order must be successively 03, 05, 07, then cards 12–1 to 12–3 of the A series (since these cards must be fed first) then card 12–4 of the C series, and cards 12–5, 12–6 of the B series, etc. (Suffixes 1 to 6 of the cards bearing index number 12 being mentioned only to differentiate the various cards from one another, and to designate their feeding order.)

The problem of the well ordered advance of three card series raises various difficulties when the advance is desired to be entirely automatic. It is obvious that one does not know at first how the series are composed nor how the various cards are filed within the series with respect to one another, so that it is necessary to perform a preliminary scanning of each incoming new card and to compare systematically its index numbers with those of the already fed cards. Thus it may be known how the various cards are classified with respect to one another, and it will suffice to feed systematically the card corresponding to the lower index number for the whole card feed problem to be properly solved. If there are two or more cards having the same index number, it will suffice to use the priority rules, i.e. to feed first the cards of the A series, then the cards of the C series, the cards of the B series being fed last.

To solve the whole of these problems, there has been provided first, and according to the invention, three prescanning memories, which will be designated respectively by reference letters A, B and C for registering any newly fed card, the recording being obviously made according to the series and being erased only when another card of the same series is to be fed and recorded.

Let it be supposed that cards A07, B05, C03 are fed and recorded into the prescanning memories. It is possible to know which of the card readers will feed first only by systematically comparing two by two the index numbers of the various cards, i.e. by performing the following comparisons AB, BC and CA (index number A with index number B, etc.).

When the individual result of each comparison is known, it is possible to deduce the final result therefrom. The latter is always one of the three following cases:

(1) A card lower than the two others (which may be indifferently any one of cards A, B or C);

(2) Two equal cards, lower than the third one (this would be the case of three cards having index numbers 07—07—12);

(3) Three equal cards.

In the case of the illustrative example (analysis of cards A07, B05, C03), card C03 is the lower, so that it is necessary to cause a feeding operation in card reader C. Card C12-4 is thus advanced and recorded into the corresponding prescanning memory, instead of card C03. In these conditions, the following comparison will concern cards A07, B05, C12-4.

Prefixes A, B, C are no part of the index numbers; they are added to the index number only to designate to which series the various considered cards belong. On the other hand, index numbers having only two digits have been selected, while in the practice, the number of digits of the index numbers may be much higher. Moreover, these index numbers may be recorded originally in various card areas which are not adjacent; the areas possibly varying from one card to the next.

The tabulating and computing machines with which the invention is primarily useful normally comprise various organs such as program unit, arithmetical unit, selectors, etc. The comparisons between index numbers which have just been mentioned may be made by utilizing the program unit and the arithmetical unit of these machines, the selectors being used to store the results of the comparisons. Such arrangements require complicated connections and are costly. An object of the invention is to provide program and storage units permitting the execution and storage of various comparisons.

In addition to the systematic comparison of the index numbers of the various series of cards, it may be useful to perform a comparison within each series. It should be mentioned that such a comparison is systematically carried out in some accounting machines whenever the card sequence must be checked and when the sequence breaks are to be detected.

Such comparisons are necessary in the case of machines simultaneously fed with several distinct series of cards. Various types of sequence controls are required depending on whether one single series of cards or simultaneously all the series are involved. Sequence breaks of the first type occur when cards A12, B12 or C12 have run out. A sequence break of the second type occurs when all the cards bearing index number 12 have run out.

It is to be pointed out that the accounting applications are quite varied, and index numbers may preferably be punched in different locations to suit a particular application. The index numbers may be punched for example in columns 11 and 12 for series A, and in columns 25 and 26 for series B and C. It is obvious that the cards punched in that way cannot be grouped in one single series. Such cards, on the other hand are usable in a machine comprising several card readers, when the comparison fields may be chosen freely.

Similarly various types of cards may be encountered where index numbers are contained in but some of them for example in series B and C. In such a case, comparisons AB, and AC do not mean anything (since to index numbers B and C there corresponds no equivalent in series A) so that they must be eliminated as required.

On the other hand, it is obvious that if in a card reader a master card file is advanced and in another a series of detail cards, it is not certain at first that to each master card there corresponds a detail card (or a series of detail cards) and conversely. If the master cards represent the state of a stock and the detail cards the movements concerning that stock (entries and withdrawals) there may exist untouched lots or new lots. As the case may be, it may be desirable to perform a sorting between the master cards and the detail card in order to determine which are the untouched lots and the detail cards having no corresponding master card.

What has been mainly considered above by way of example is a machine, or a group of machines, comprising three card readers, and applications in which the three card readers are used simultaneously. For each element of the index numbers, and apart from the case when some elements of the index numbers are found only in some series of cards and not in all series, the comparisons which are to be effected are of the following type:

AA′ BB′ CC′ within a same series of cards (systematic comparison of the index numbers of a card with those of the immediately following card); and on the other hand of the following type:

AB BC CA between cards of two different series. It may be remarked that, for each element of the index numbers, the comparisons of each type are three in number.

For an operation in which two card readers only are necessary, the comparisons of the first type are reduced to two (for example AA′ and BB′), whereas those of the second type are reduced to a single operation (comparison AB in the considered case).

It is to be noted that an operation wherein only two card readers are used may be performed in three different ways, namely: card readers A and B; card readers A and C; or card readers B and C. The comparisons will be: either AA′, BB′, AB; AA′, CC′, AC; or BB′, CC′, BC.

As already mentioned, one of the preceding cases occurs automatically at the end of any work wherein normally the three card readers are used. Without going into the details it may be further mentioned that the interseries comparisons (i.e. types AB, BC or CA) are to be eliminated integrally at the end of the operation or in the case of an operation wherein one card reader is used.

Similarly, in the case of a machine using four card readers, it may be determined that the comparisons within a same series of cards are four in number (whereas the interseries comparisons are six, AB, AC, AD, BC, BD, CD).

This invention relates to tabulating and computing machines of the general type wherein there is effected an integral and preliminary recording of the information contained in the recording cards. As is known, such machines comprise in particular an arithmetical and logical unit enabling the handling of information contained in said cards. The operations to be performed may include transfer of all or part of the information from one memory to another, arithmetical operations (addition, subtraction, multiplication, division), comparisons between the various pieces of information, etc.

More particularly, the invention relates to a machine or a group of machines fed directly with two or more distinct series of recording cards, and contemplates as many different card reading devices and such a number of memory organs as to store the information contained in at least two adjacent cards in each series. This implies the presence of at least six memories of, for example, at least 80 locations in case it is desired to feed the machine with three distinct series of cards, and where each card comprises 80 recording positions.

A primary object of the invention is to provide improved means for determining the card feed order as well as the program operation which is to be effected according to the advance condition of the cards and according to the way the cards are matched.

Another object of the invention is to provide an improved arrangement of the functions performed between two consecutive card feeding operations.

According to the invention a card of one of the series is read out and integrally recorded into the memory provided therefor. The index numbers of this newly fed card are compared with those of the cards previously fed, said index numbers being directly taken from the various memories which are provided to record them. Then the computation programs and associated operations concerning said programs are performed. Finally, another card is advanced, account being taken, when the cards are fed, of all the results provided by the comparison operations performed on the various index numbers.

Another object of the invention is to provide an improved comparing device cooperating with above mentioned memories and with an arithmetical unit.

The comparing device reads out directly from these memories the information to be compared and delivers through the arithmetical unit various pulses eventually indicating the equality, the unequality and the direction of the unequality, the comparing device retaining none of the original information stored.

Another object of the invention is to provide improved means enabling a comparing device to operate either within a single series of cards or between two different series. In each case, the comparing device may be made to accommodate a number of fields of a variable size and may be modified at will by a system of removable connections. It is then possible to associate at will with each field various special related functions (sequence control, numerical or alphabetical comparisons, control of a given program step, matching check, etc.) and in some cases some comparisons or the scanning of some fields may be dropped at will.

Another object of the invention is to provide an improved program unit for a machine employing multiple card feeds.

Another object of the invention is to provide an improved memory unit adapted to operate with a program unit for recording and preserving the result of comparisons controlled from the program unit, and which may further interact with the program unit.

According to the invention the memory unit may act to modify the development of the programs controlled from the memory unit or to drop the comparisons of the lower order whenever a comparison of the same type, but of a higher order has caused an unequality to be detected.

Another object of the invention is to provide improved means for exercising special controls associated with a program unit.

Another object of the invention is to provide a comprehensive device requiring no specialized memories for the comparison operations and lending itself to the use of common devices for multiple purposes.

Another object of the invention is to provide various accessory arrangements for automatically feeding cards at the beginning of the work, for systematically turning off the card readers and for automatically suppressing the corresponding comparison operations either when a card reader is unused or at the end of an operation.

Another object of the invention is to provide special controls for the program unit so as to limit in all cases the comparison operations to only the operations which are concerned with the index numbers of the newly fed card.

Another object of the invention is to provide an improved mechanism wherein subsequent card feed operations are dependent on the contents of prior fed cards.

The foregoing and other objects, features and advantages of the invention will be apparent from the following more particular description of preferred embodiments of the invention, as illustrated in the accompanying drawings.

Figure 4A:
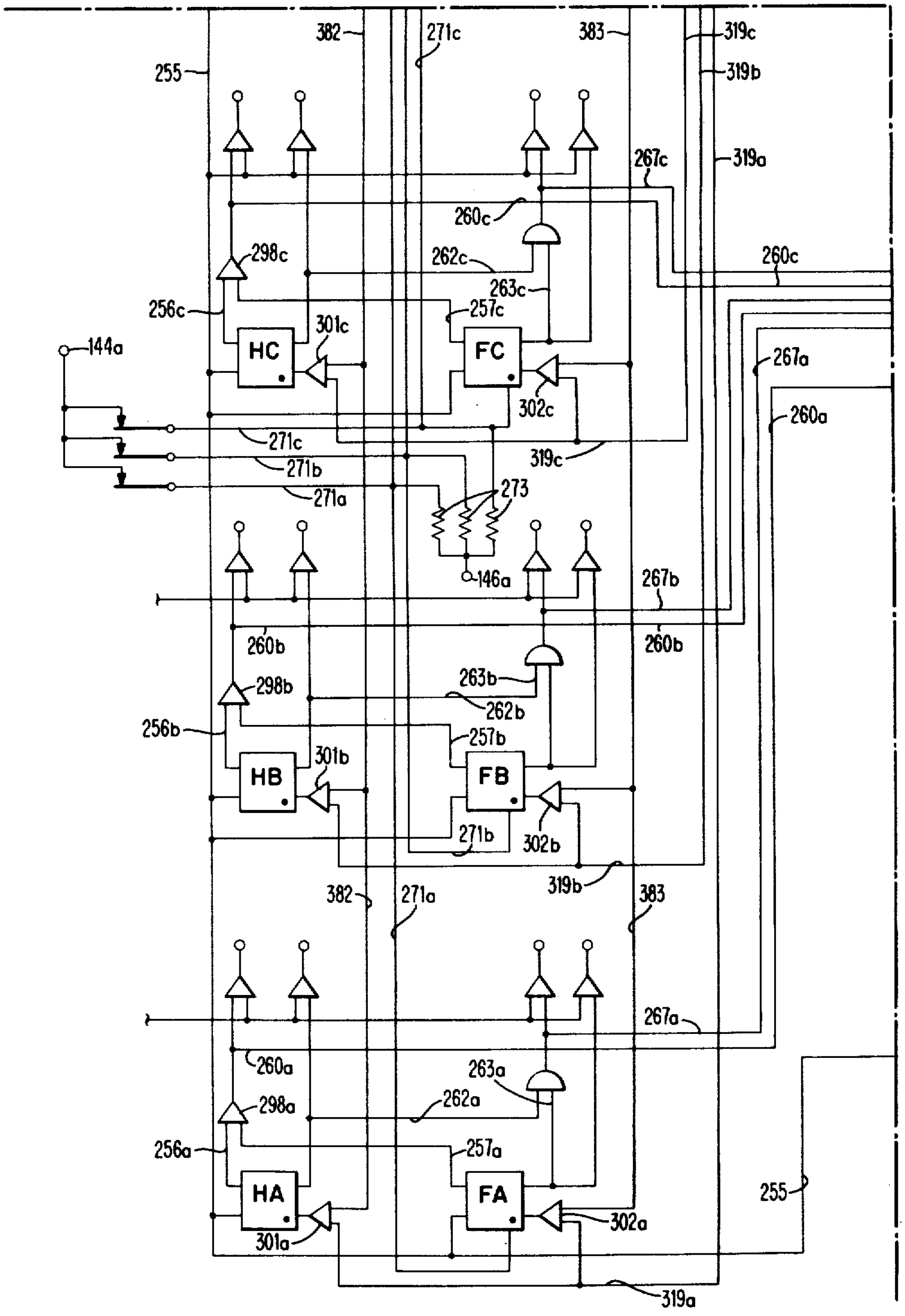
Figure 4B:
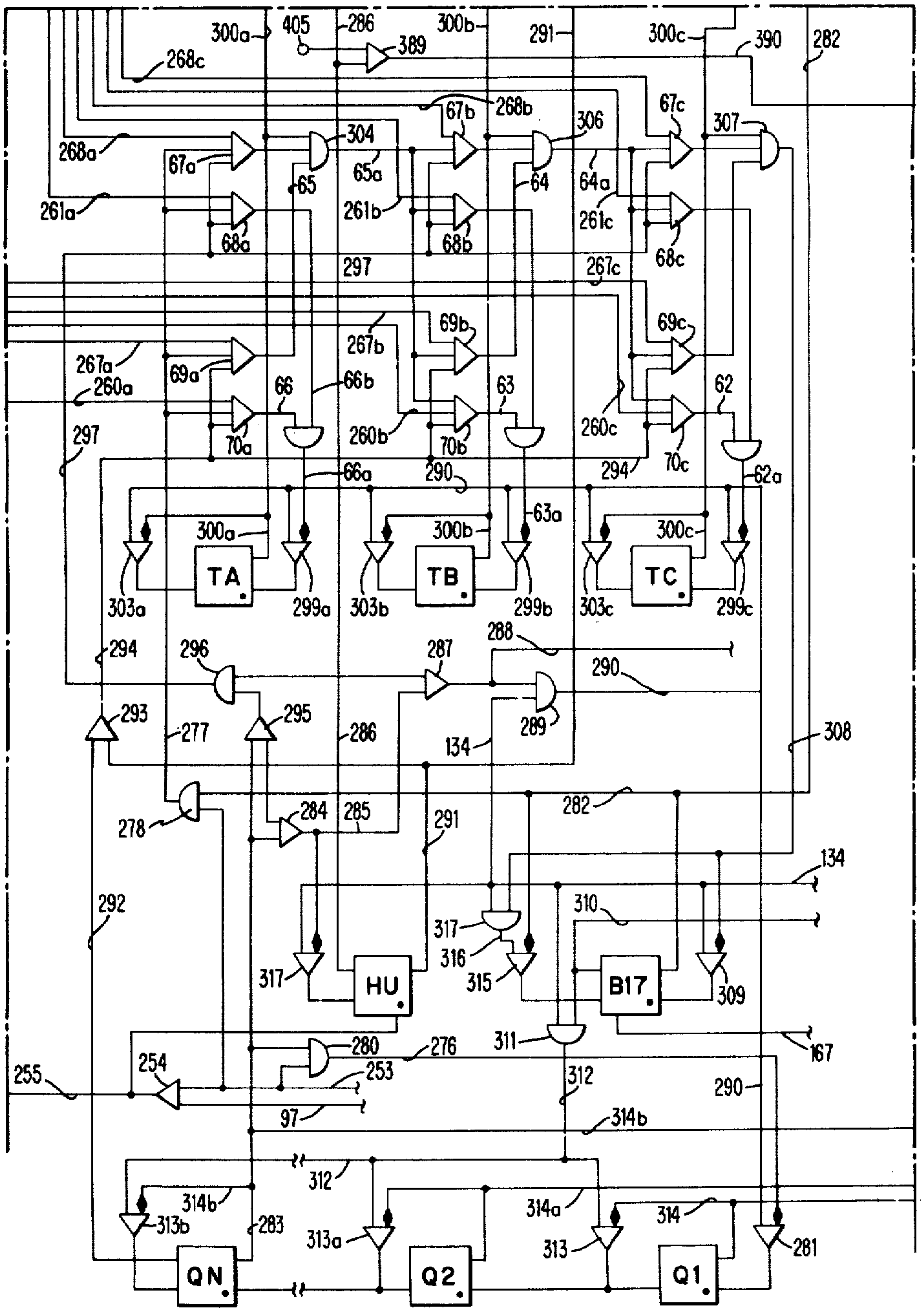
Figure 4D:
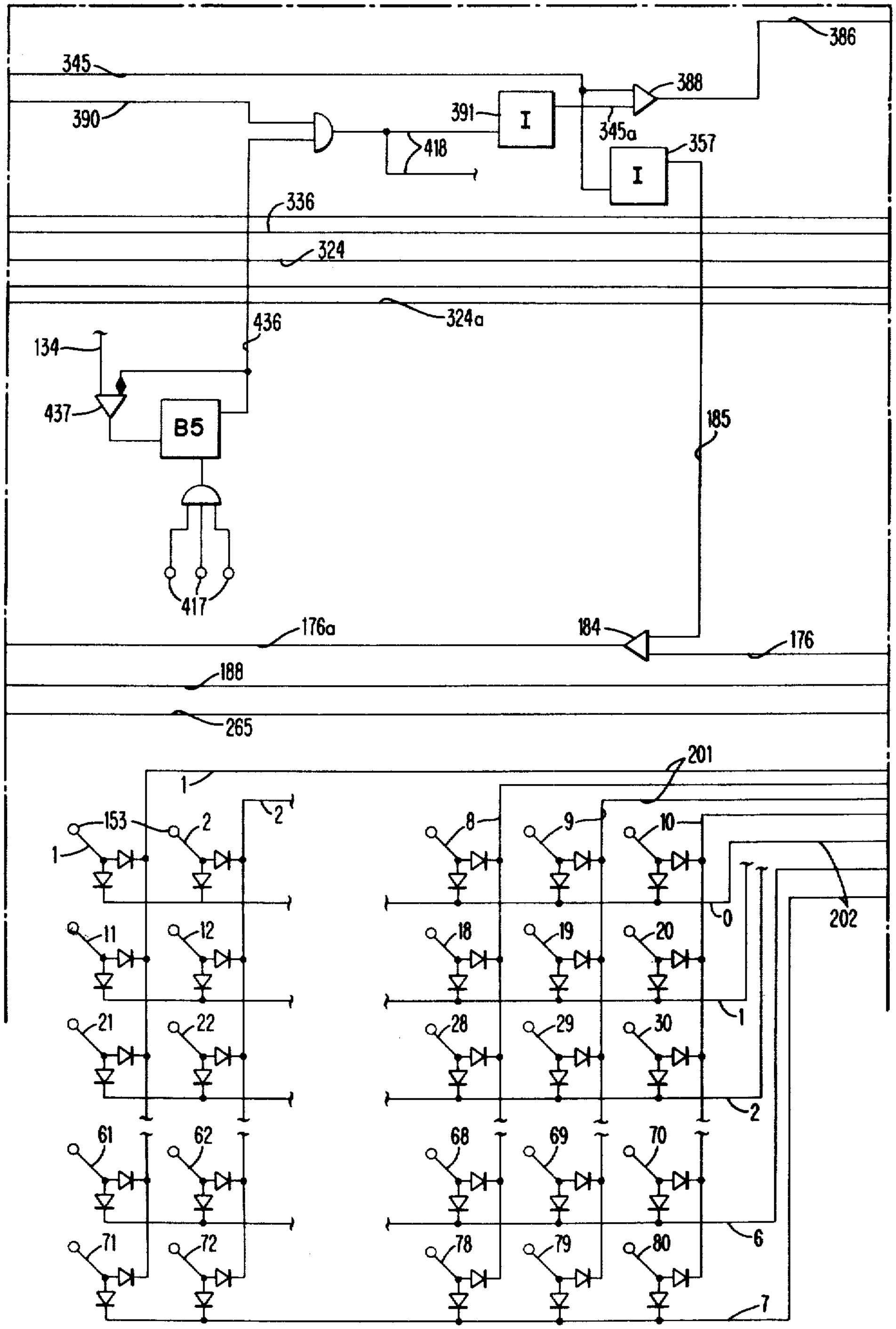
Figure 4C:
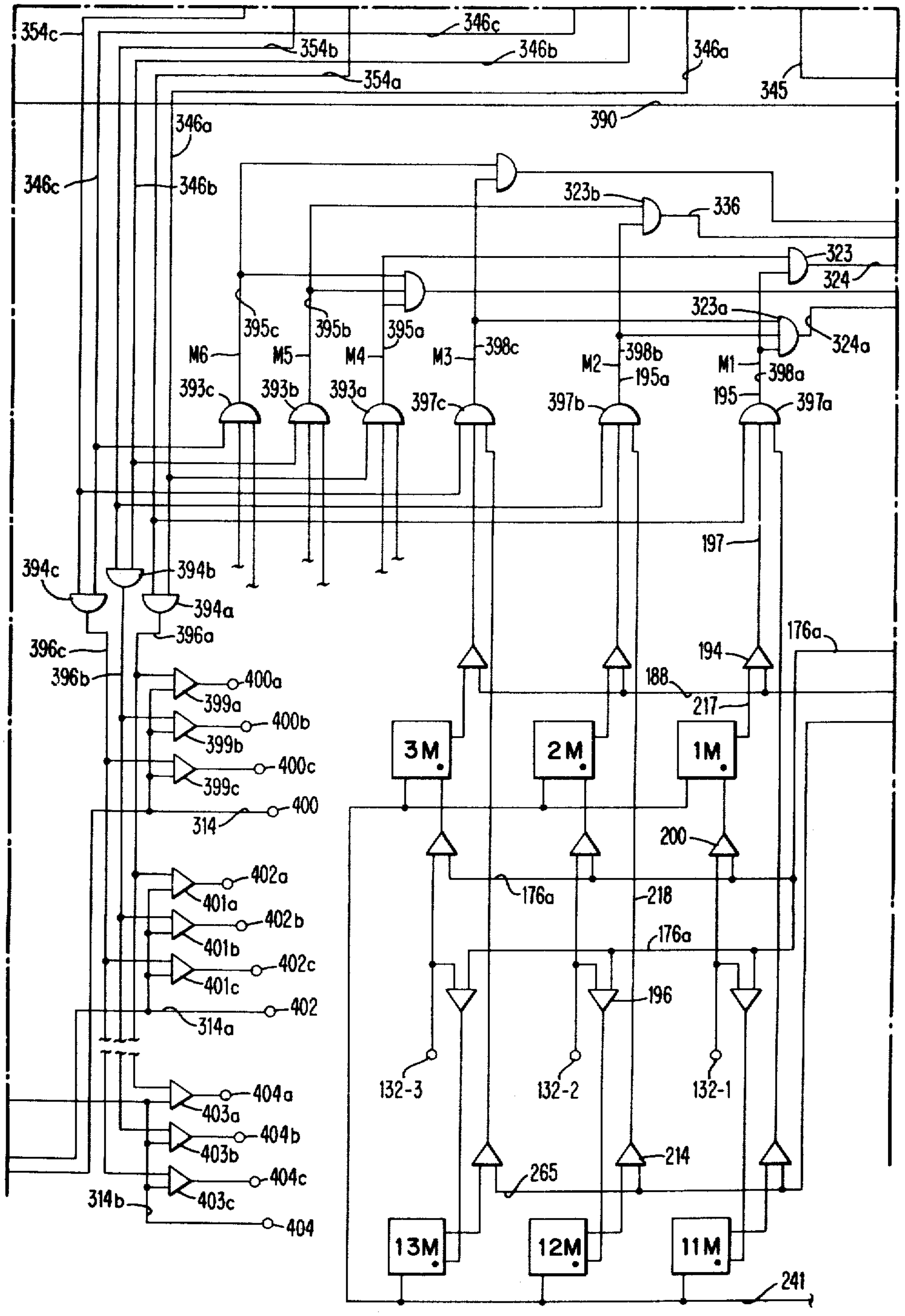
Figure 4E:
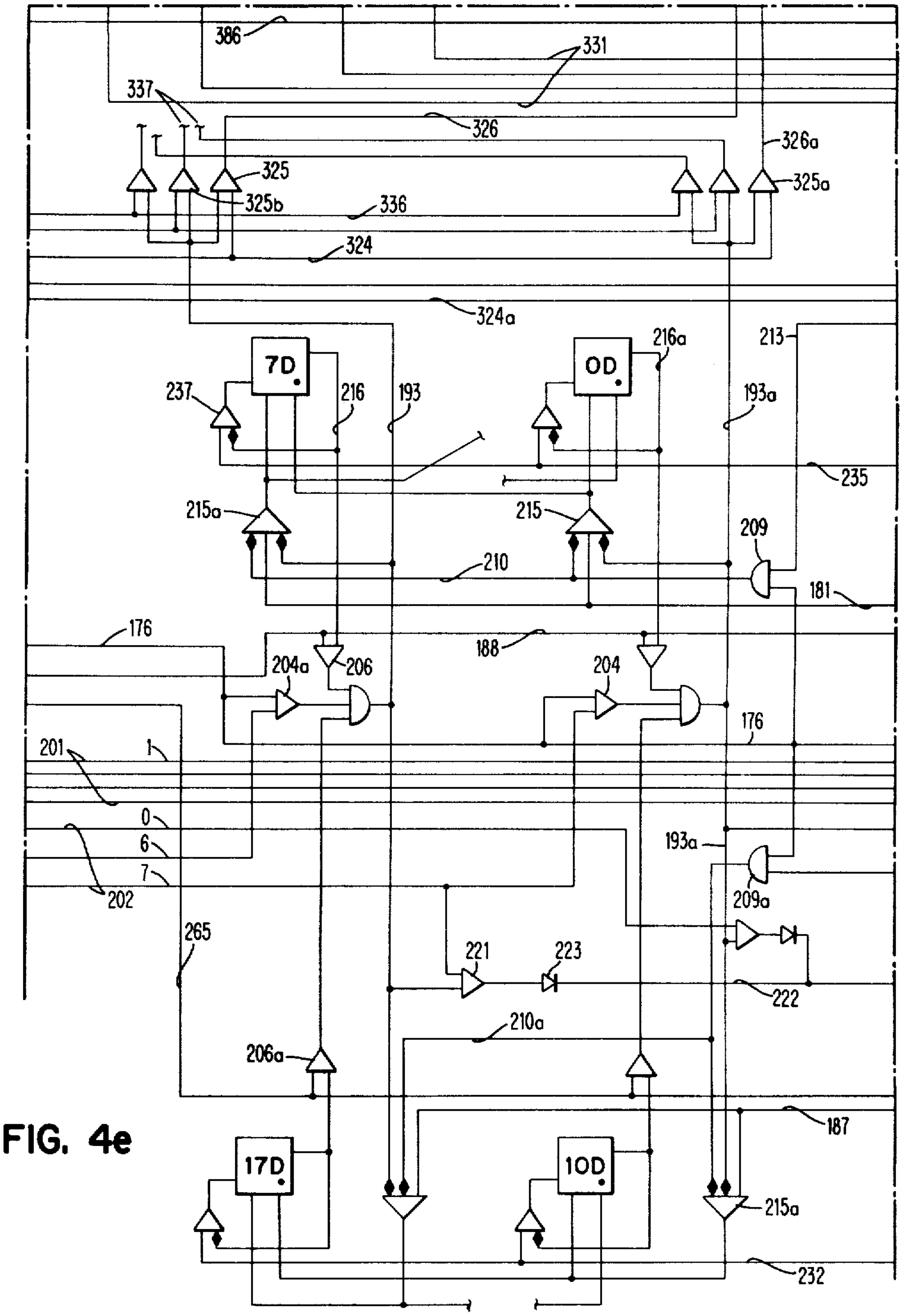
Figure 4F:
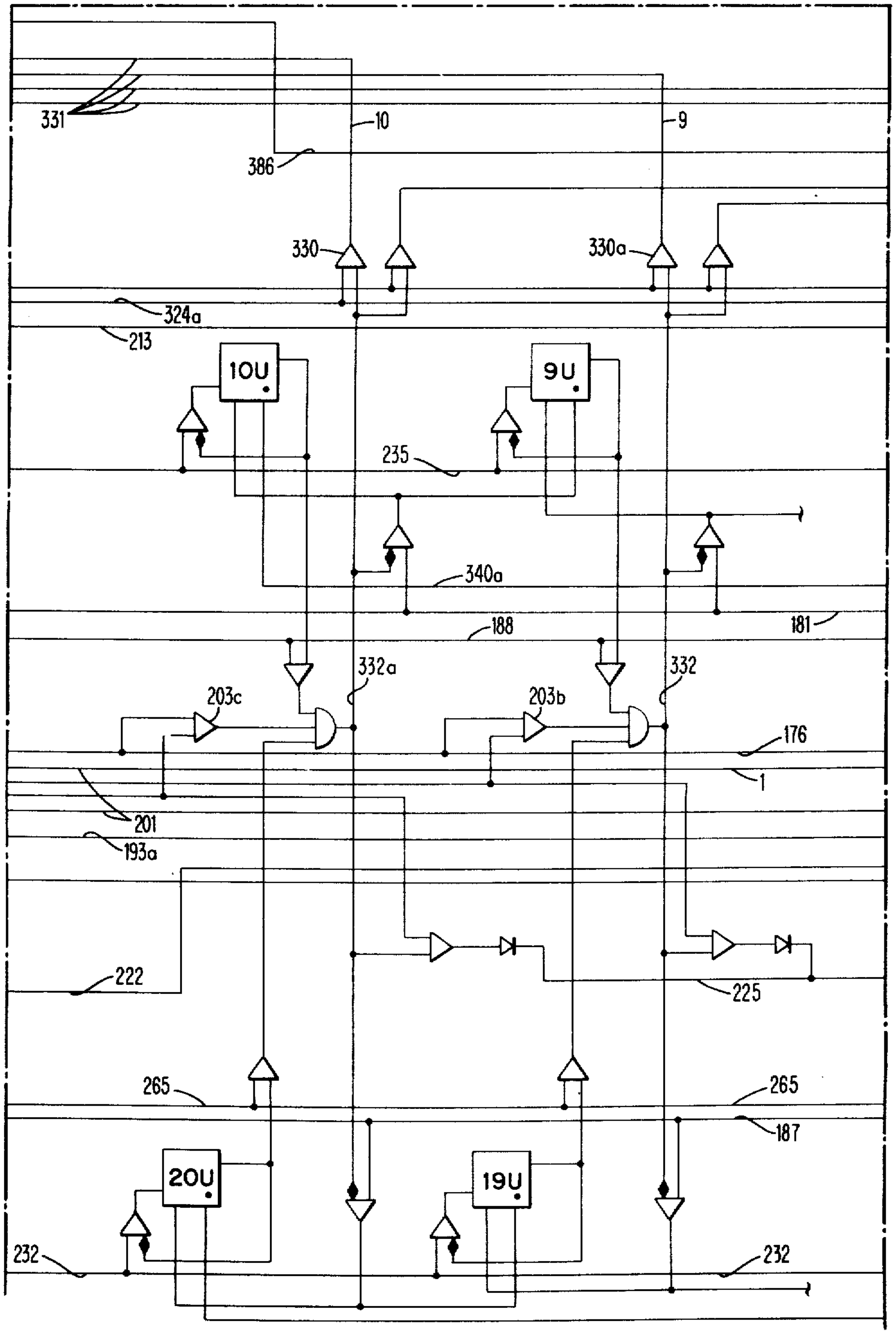
Figure 4G:
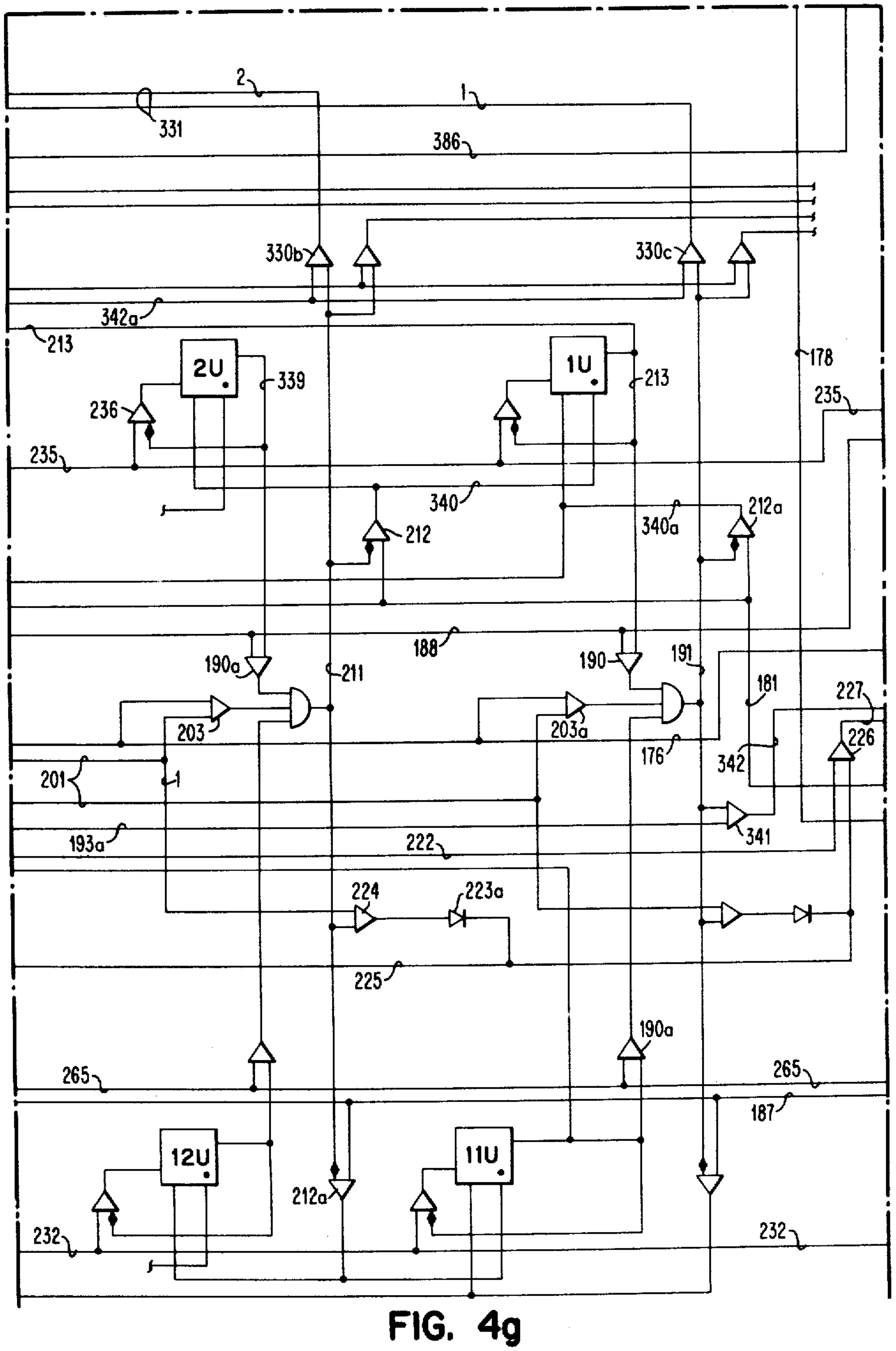
Figure 4H:
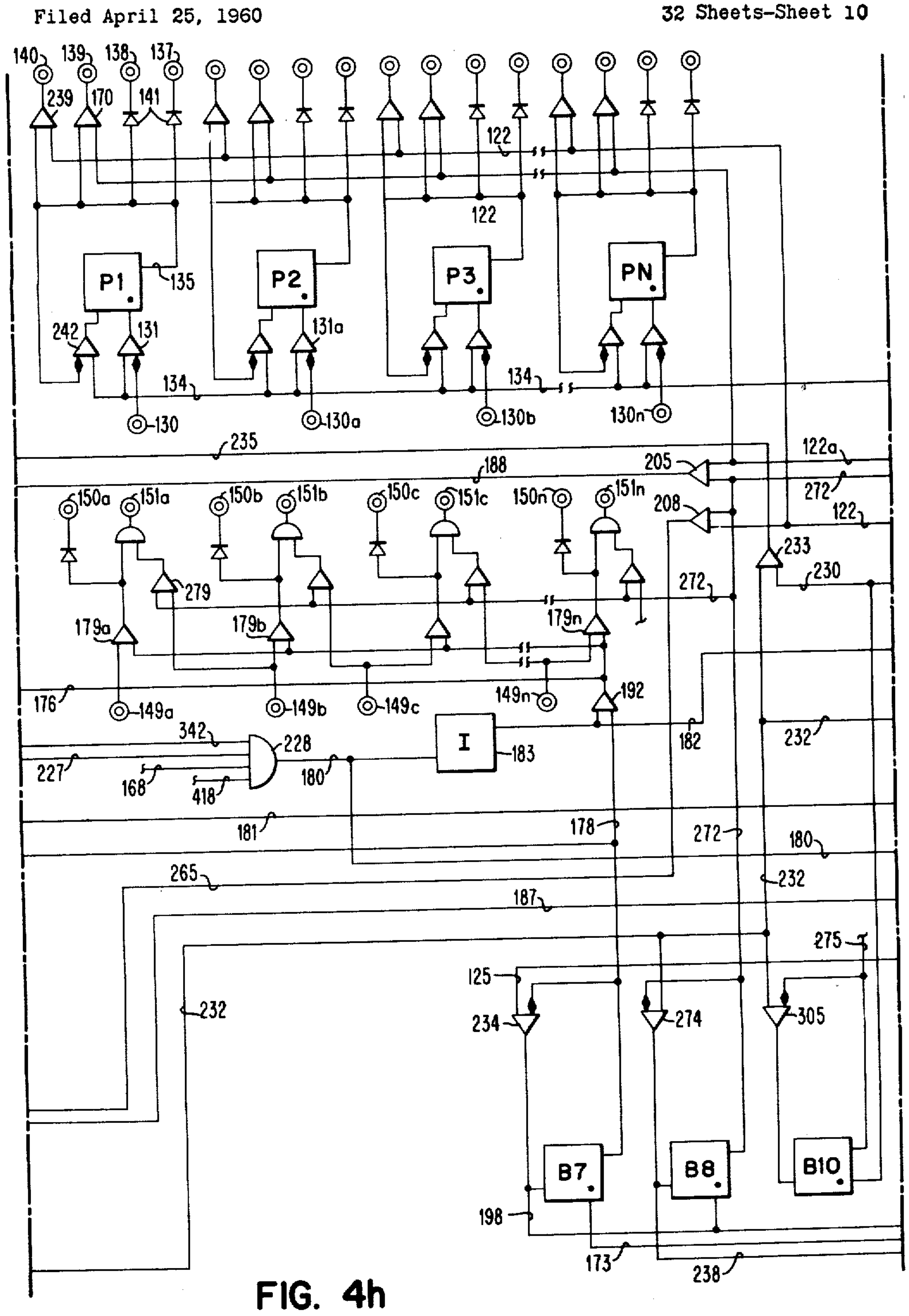
Figure 4I:
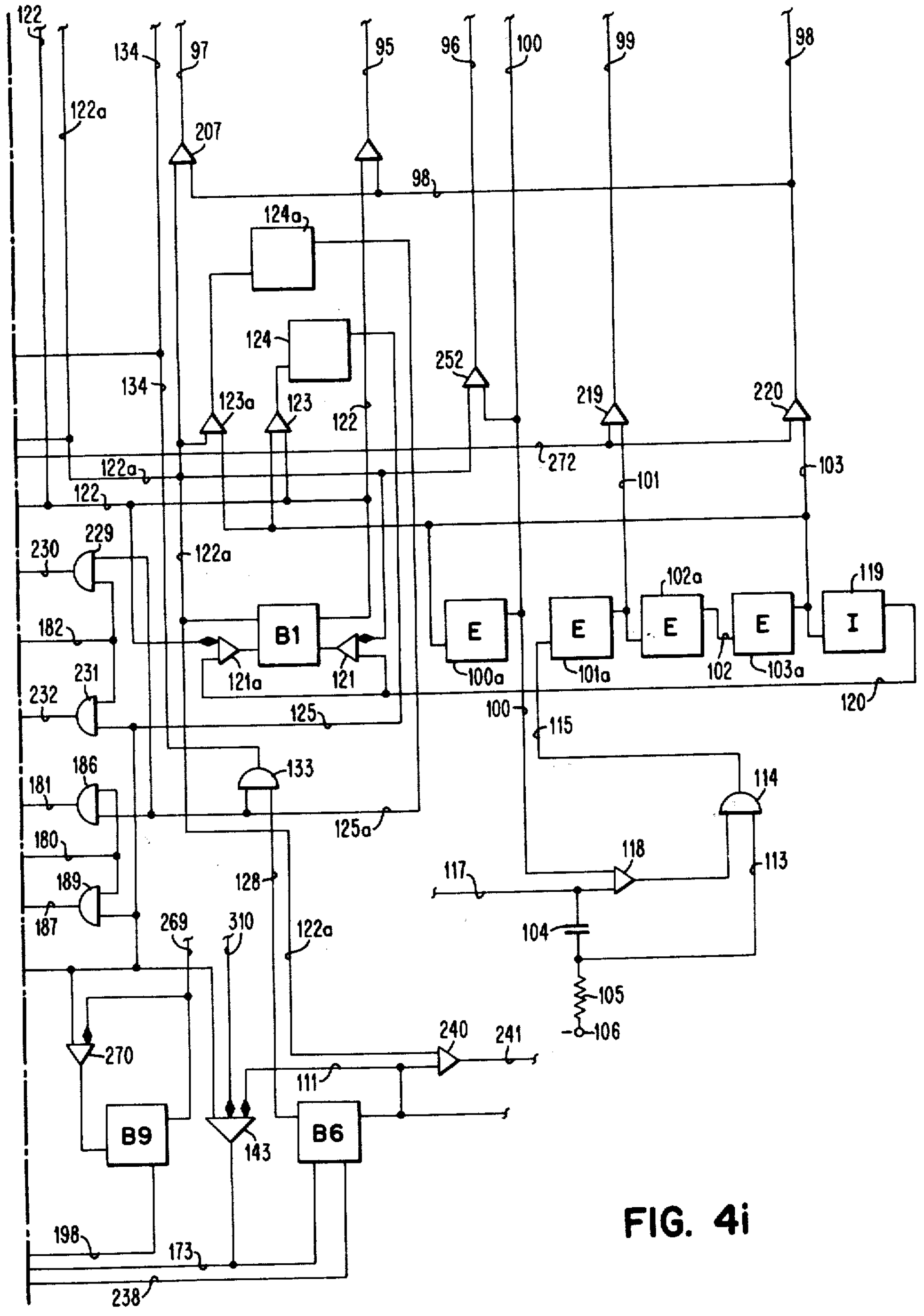
Figure 4J:
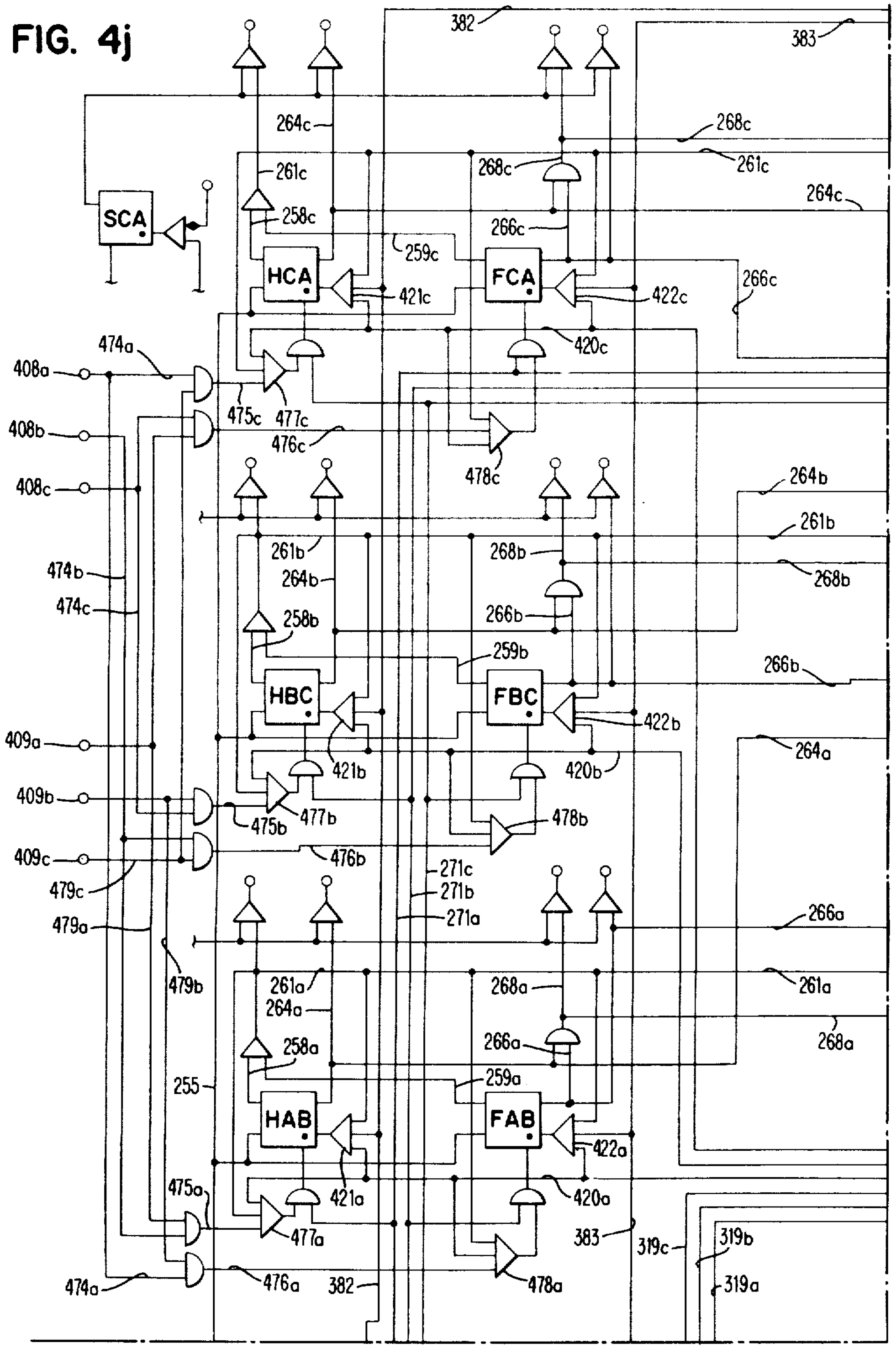
Figure 4K:
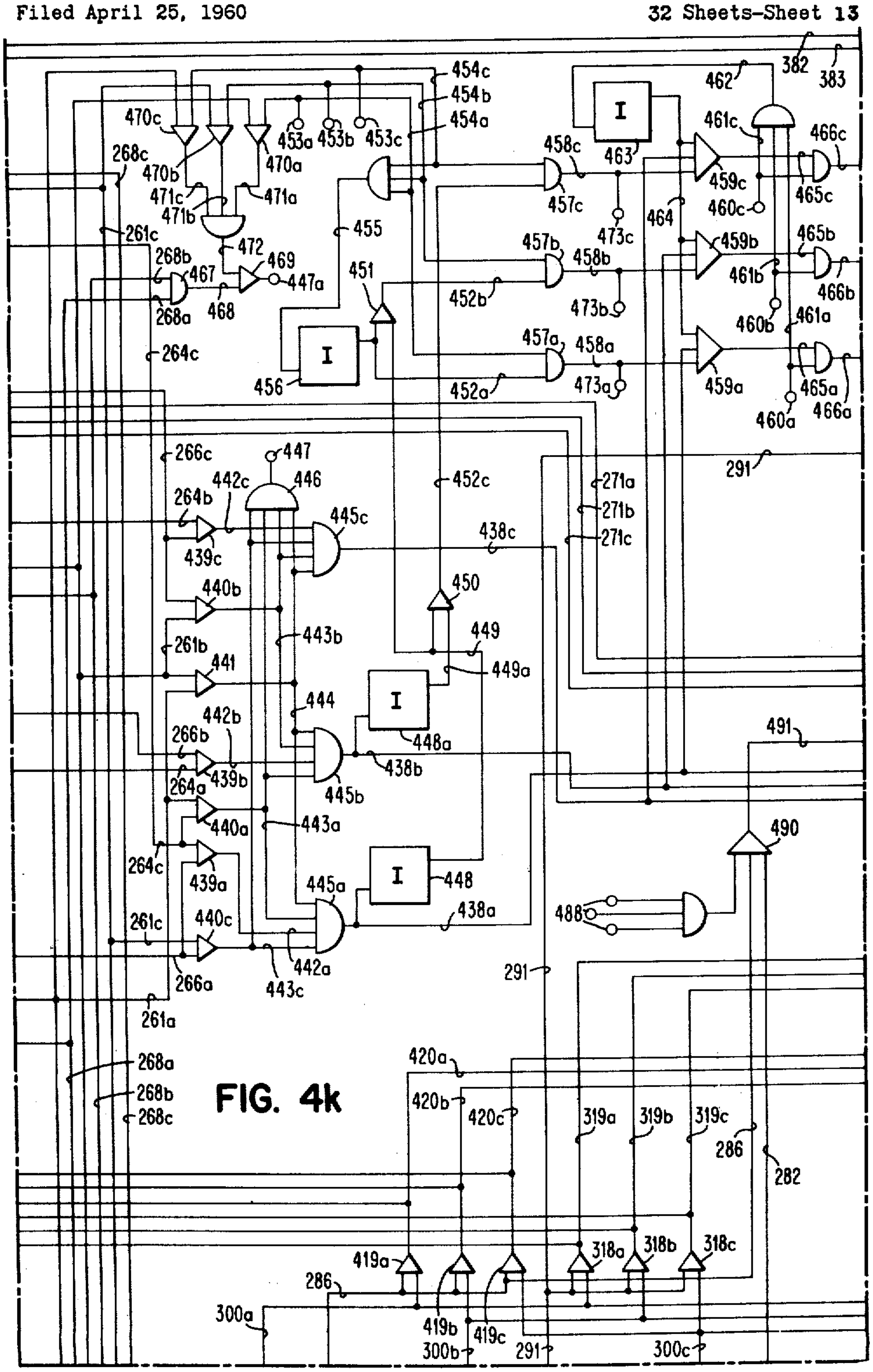
Figure 4M:
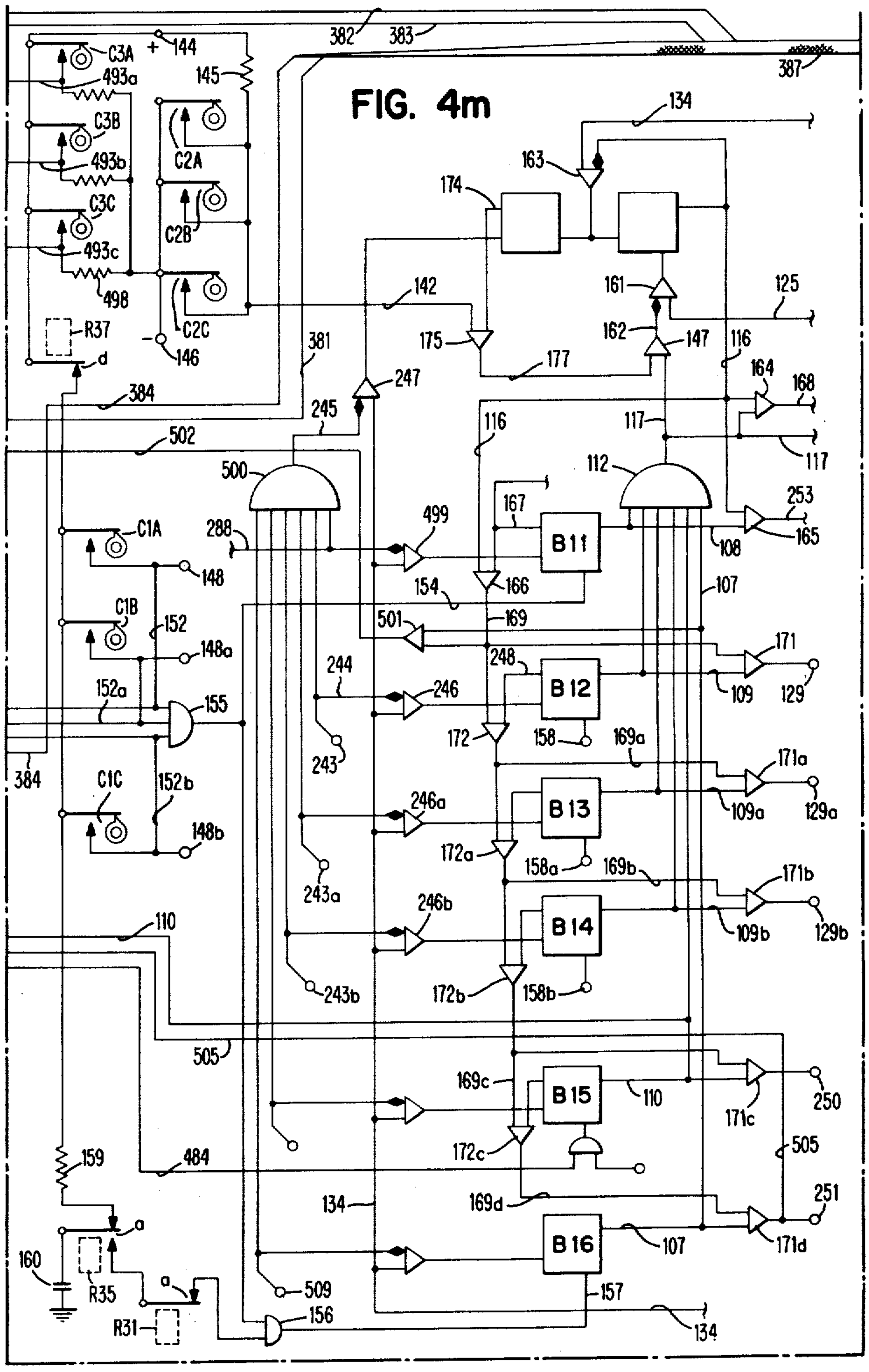
Figure 4N:
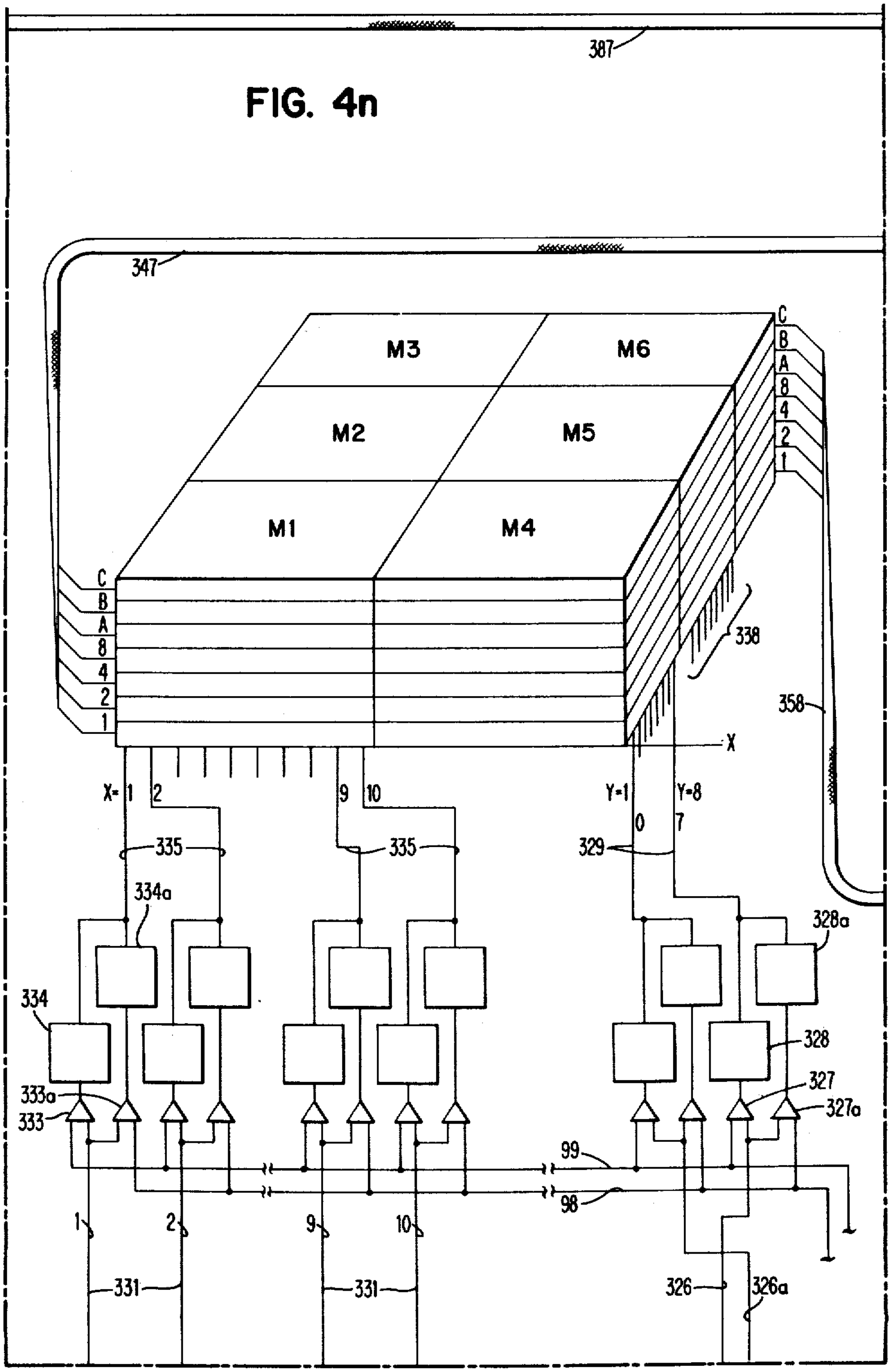
Figure 4P:
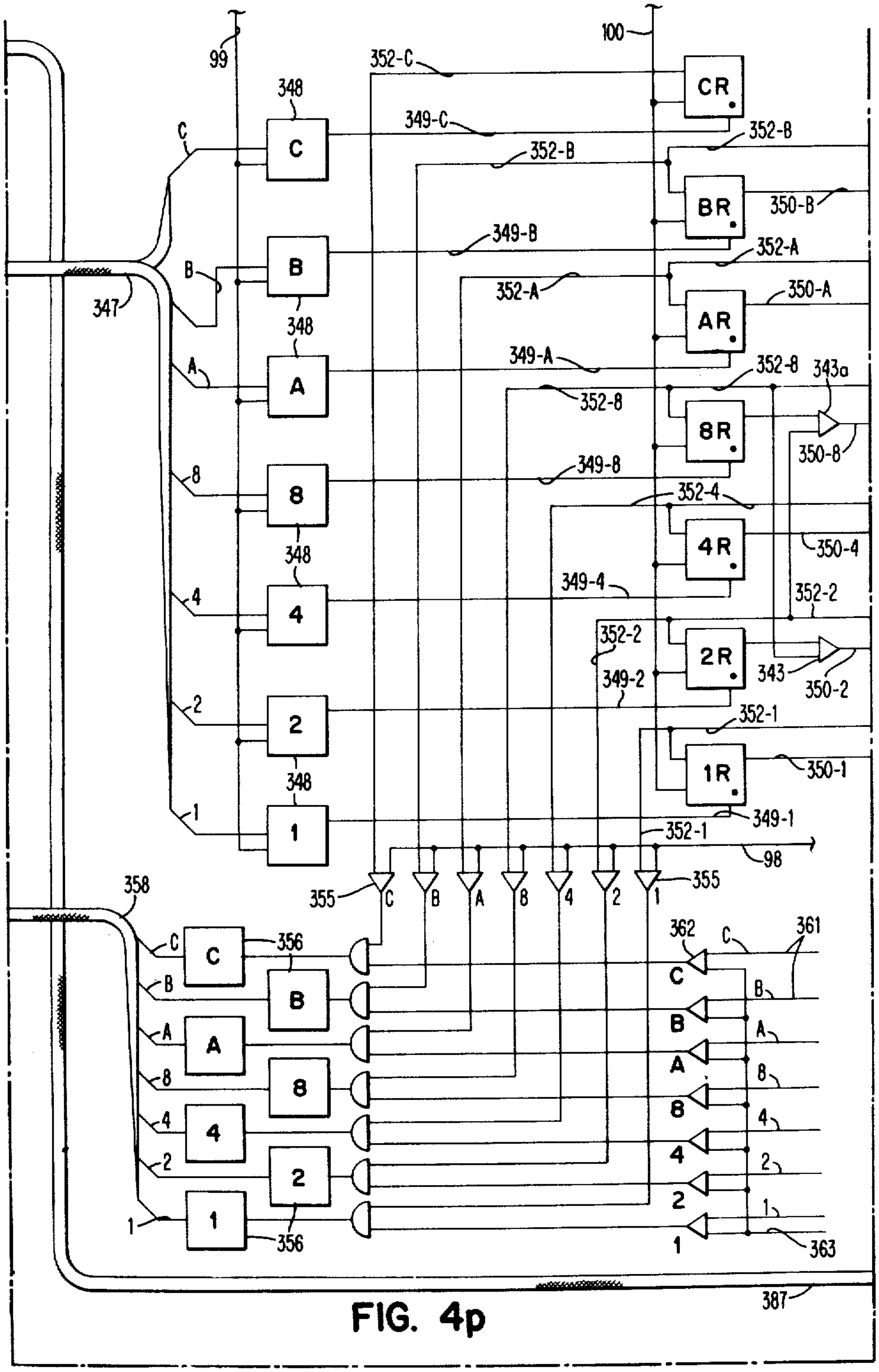
Figure 4Q:
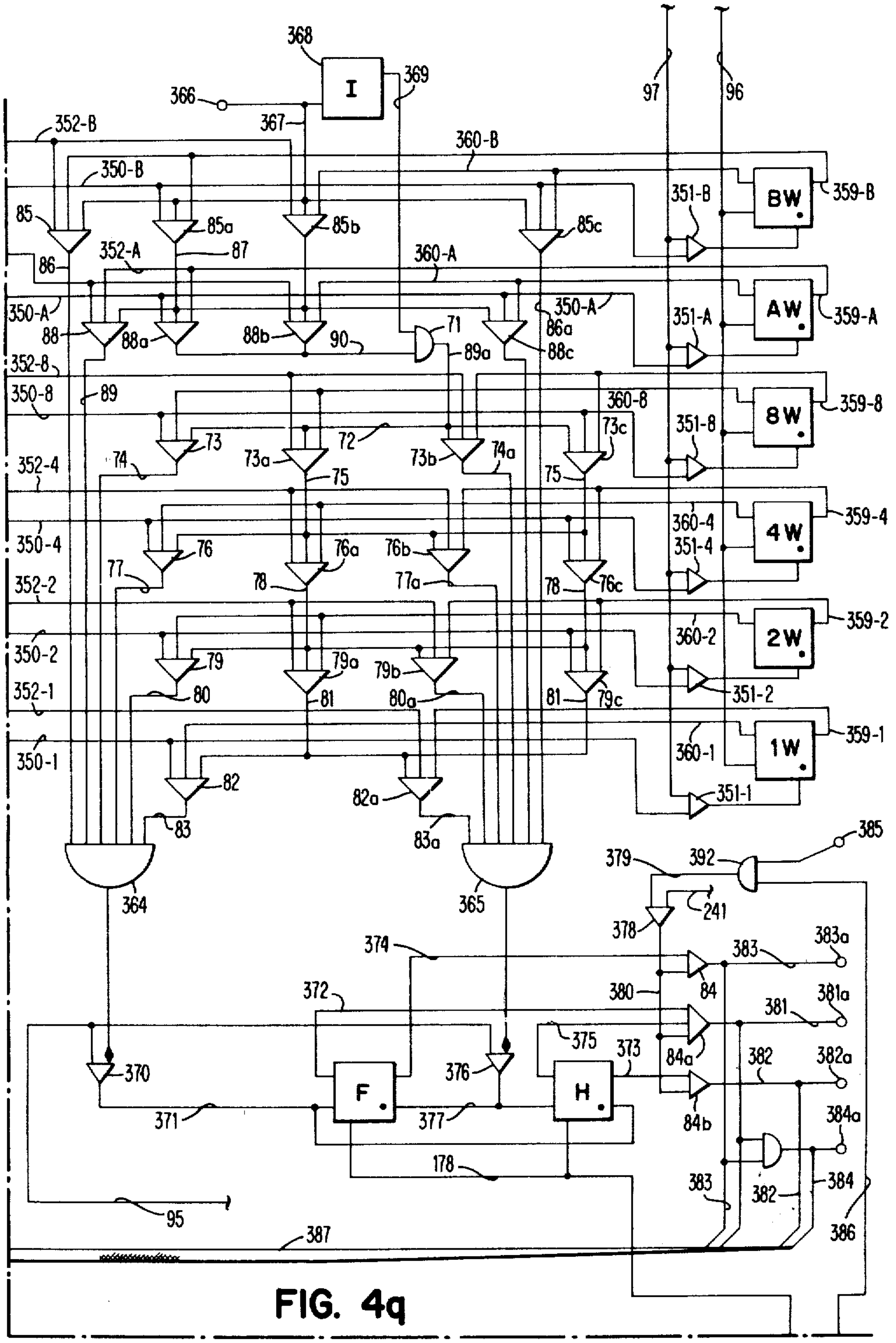

FIGURES 4*a* to 4*q* represent the general arrangement of the electronic circuits.

Figure 5:
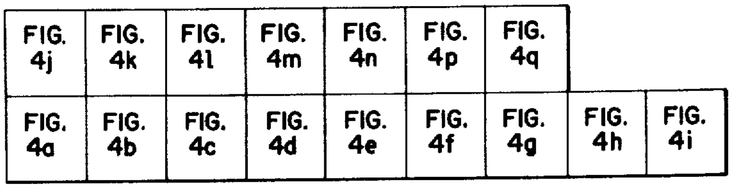

FIGURE 5 shows how FIGURES 4*a* through 4*q* fit together.

Figure 6:
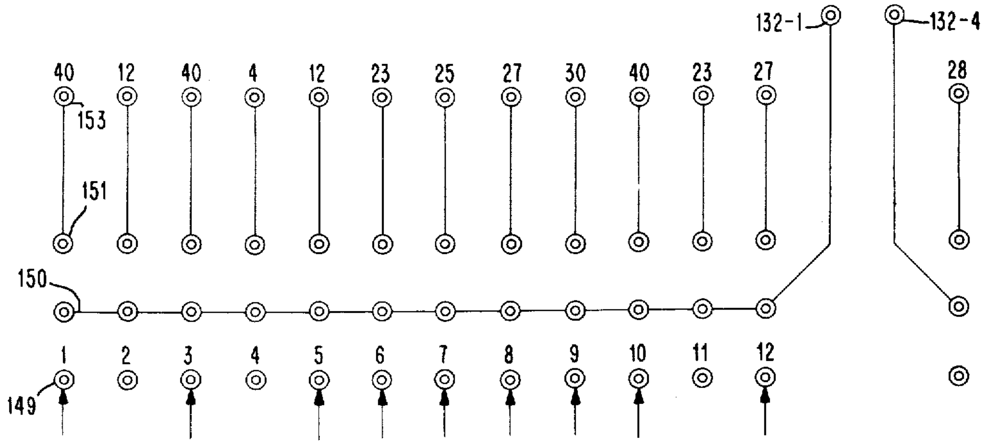

FIGURE 6 shows an example of a set of control hubs.

FIGURES 7 through 14 represent various component circuits and the symbols representing them in FIGURES 4*a* to 4*q*.

Figure 15:
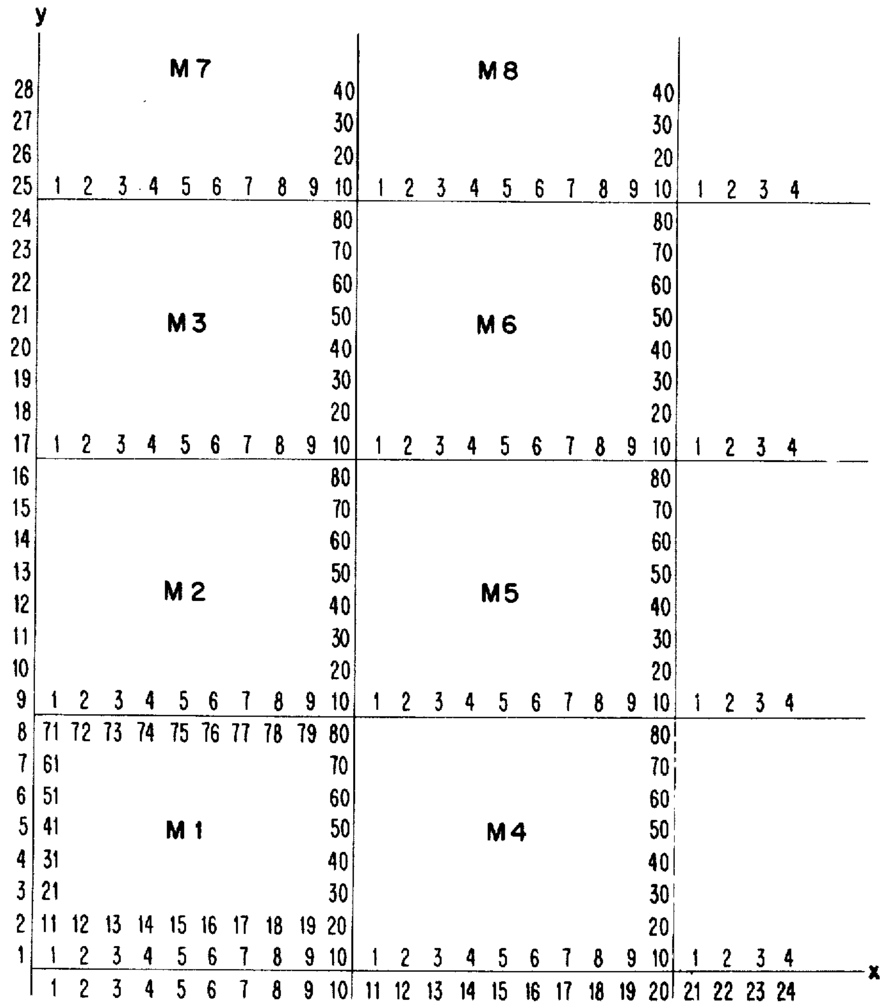

FIGURE 15 is an illustrative memory arrangement.

Figure 16:
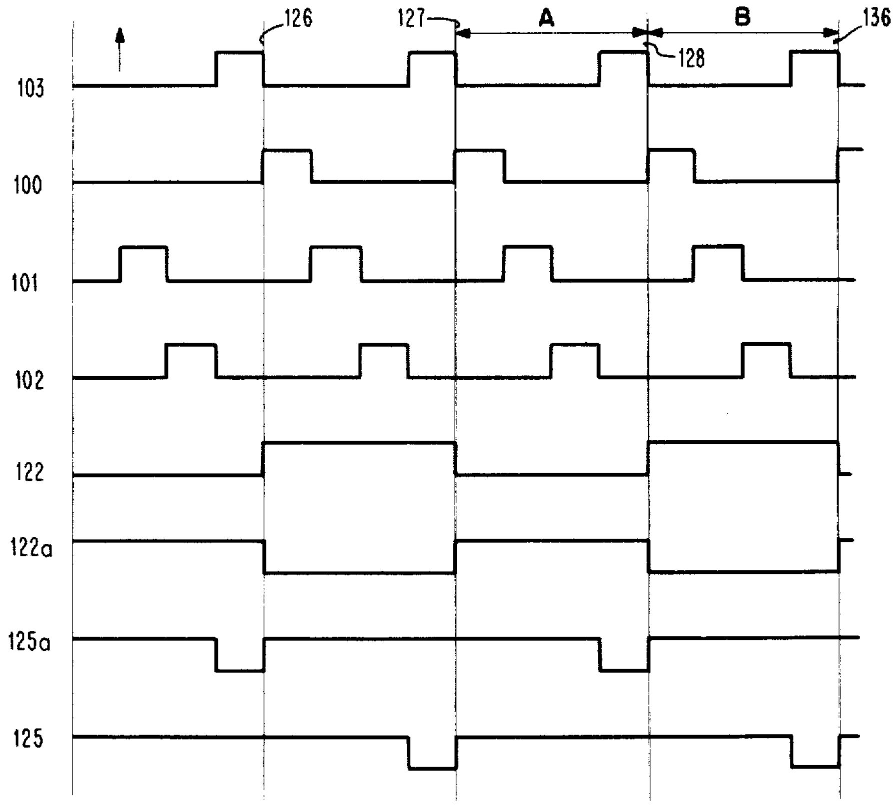

FIGURE 16 is the timing diagram of some pulses occurring in the machine of FIGURES 4*a* through 4*q*.

Figure 17:
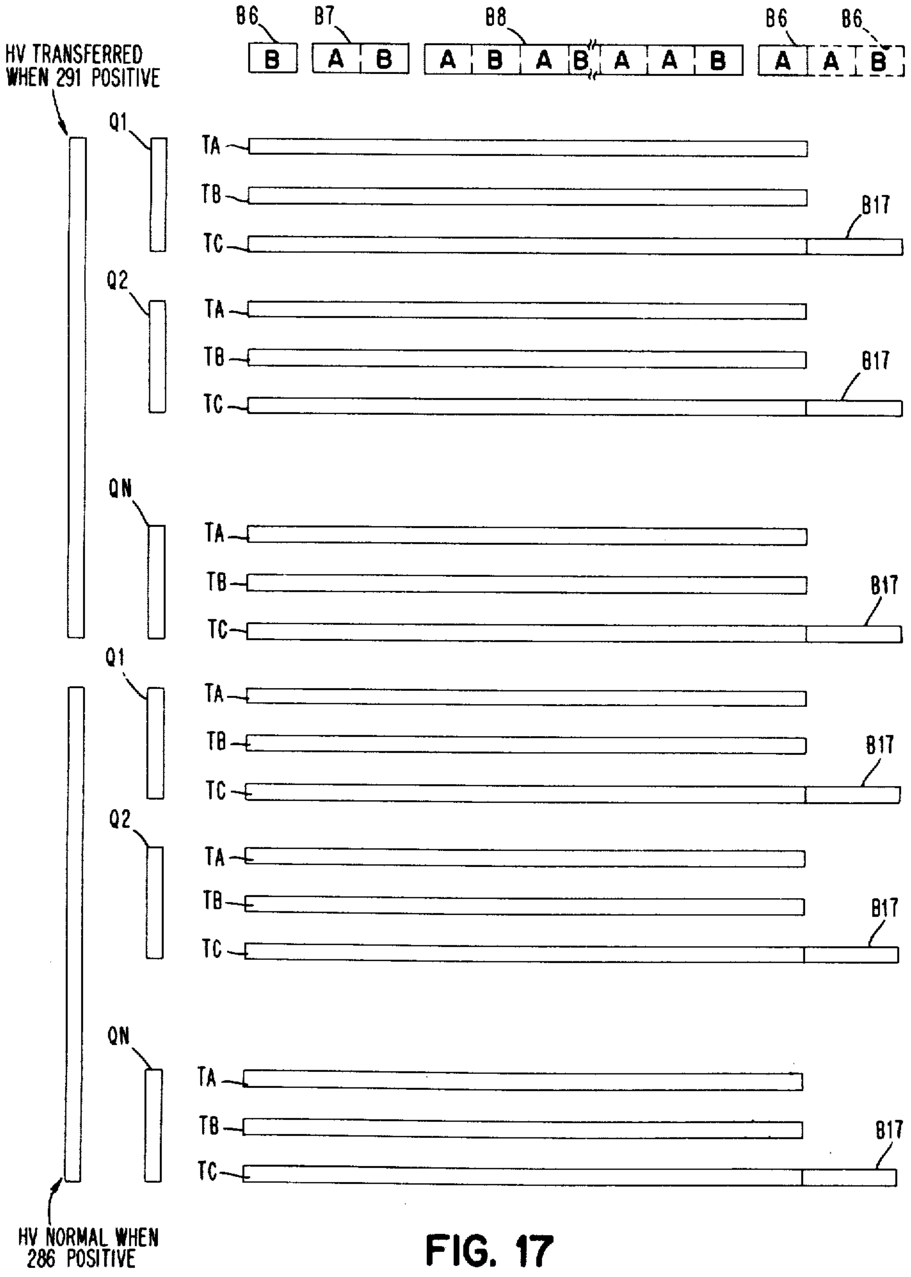

FIGURE 17 shows the time relations between the control times of some of the triggers of FIGURES 4*a* through 4*q*.

Figure 18:
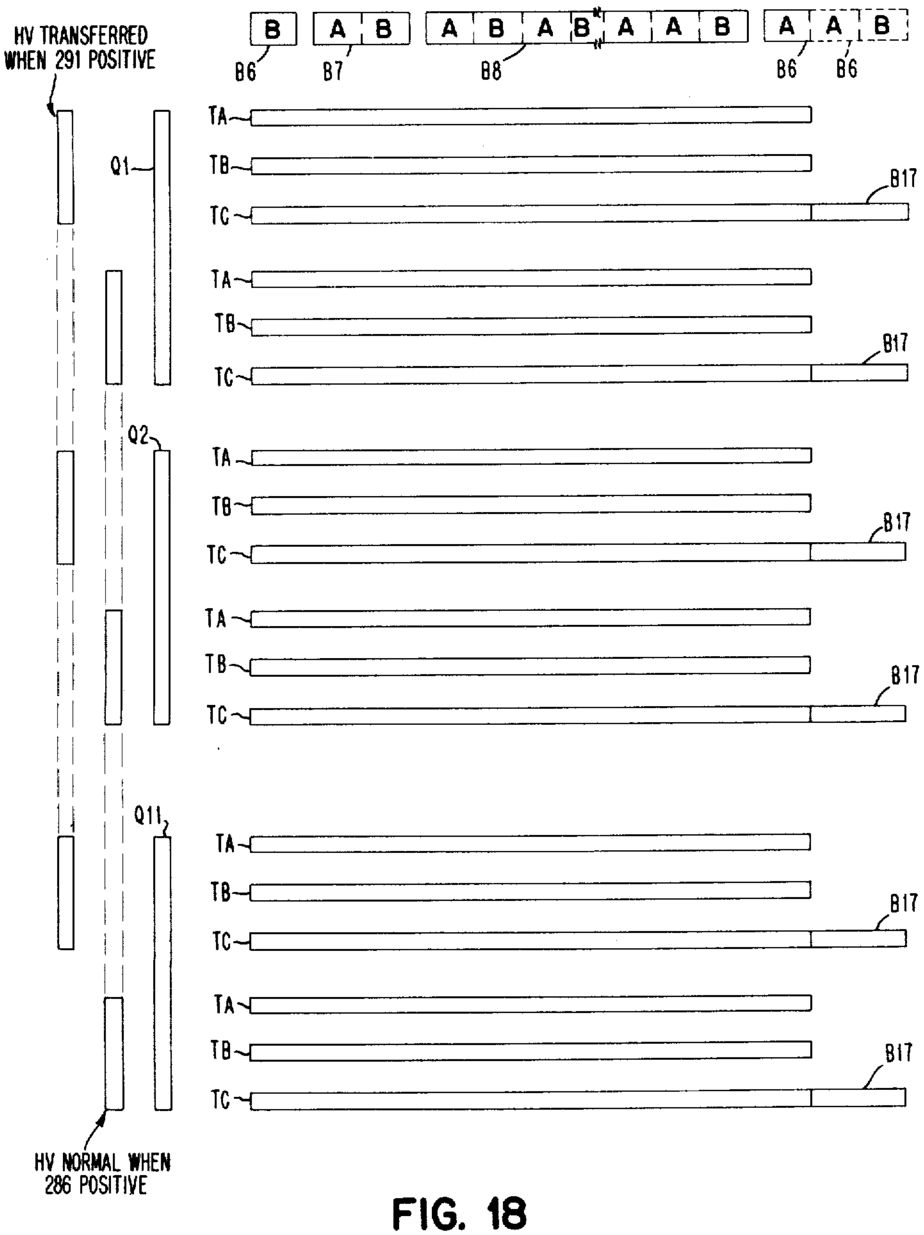

FIGURE 18 shows, for a second embodiment, the time relations between the control times of the same triggers.

Figure 19:
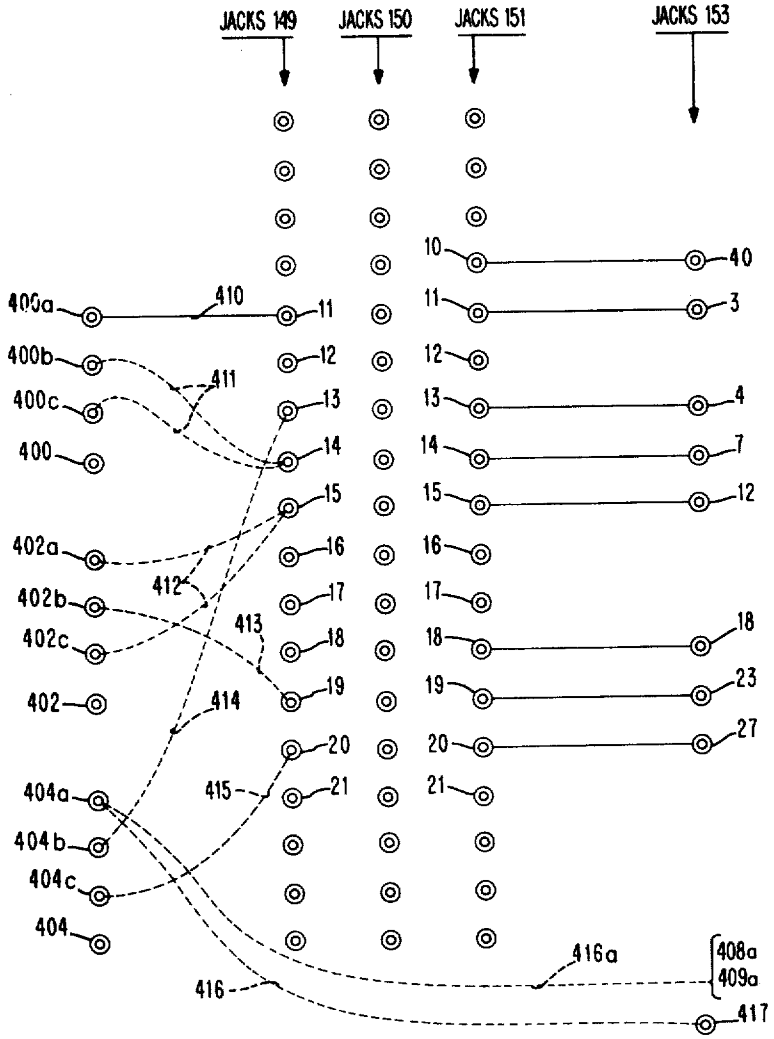

FIGURE 19 is another illustrative example of a set of control hubs.

Figure 20:
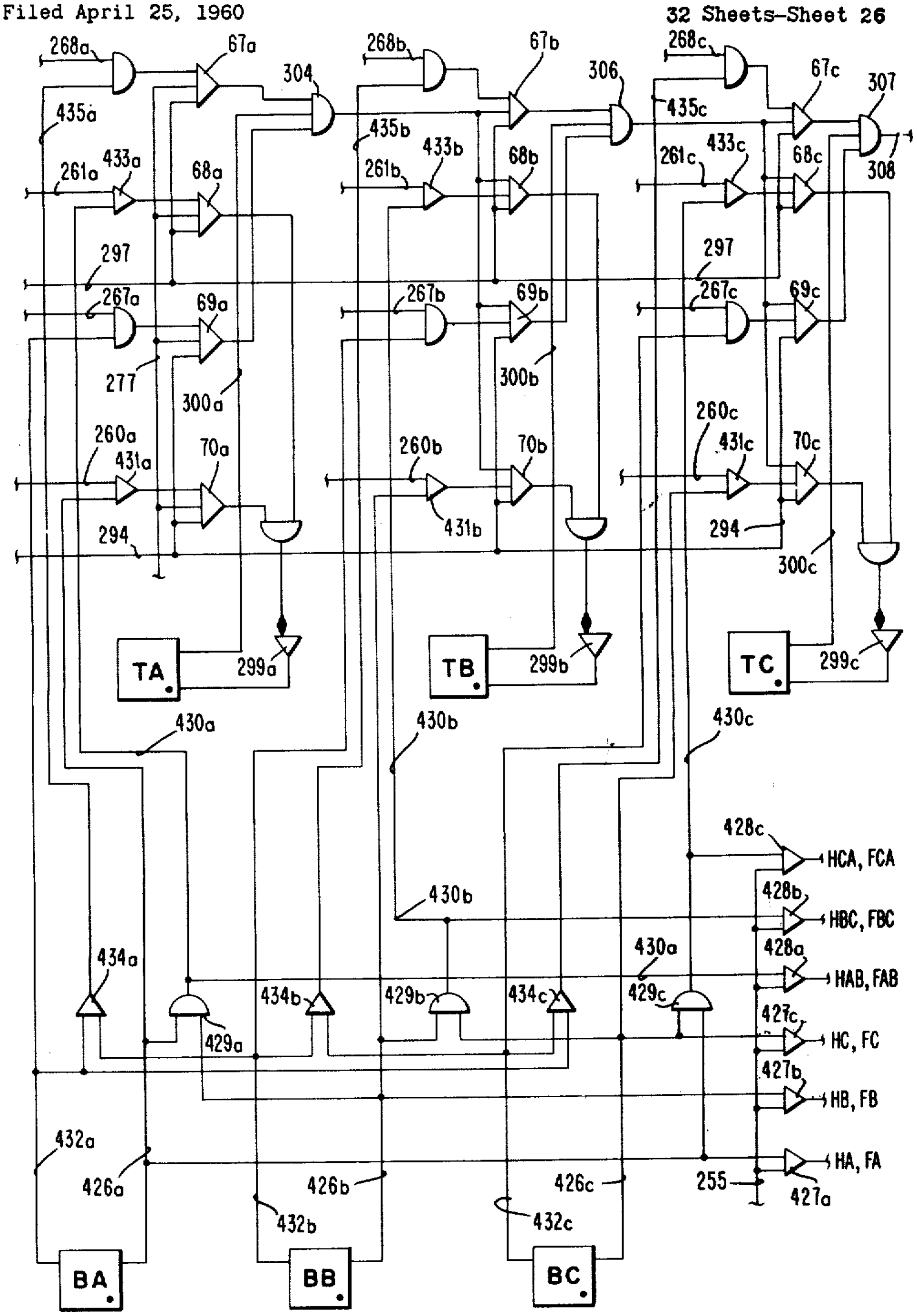

FIGURE 20 shows another embodiment of some of the circuits of FIGURES 4*a* to 4*q*.

FIGURES 21*a* through 21*d* are a schematic diagram of the relay circuits for a machine constructed in accordance with the present invention.

Figure 21A:
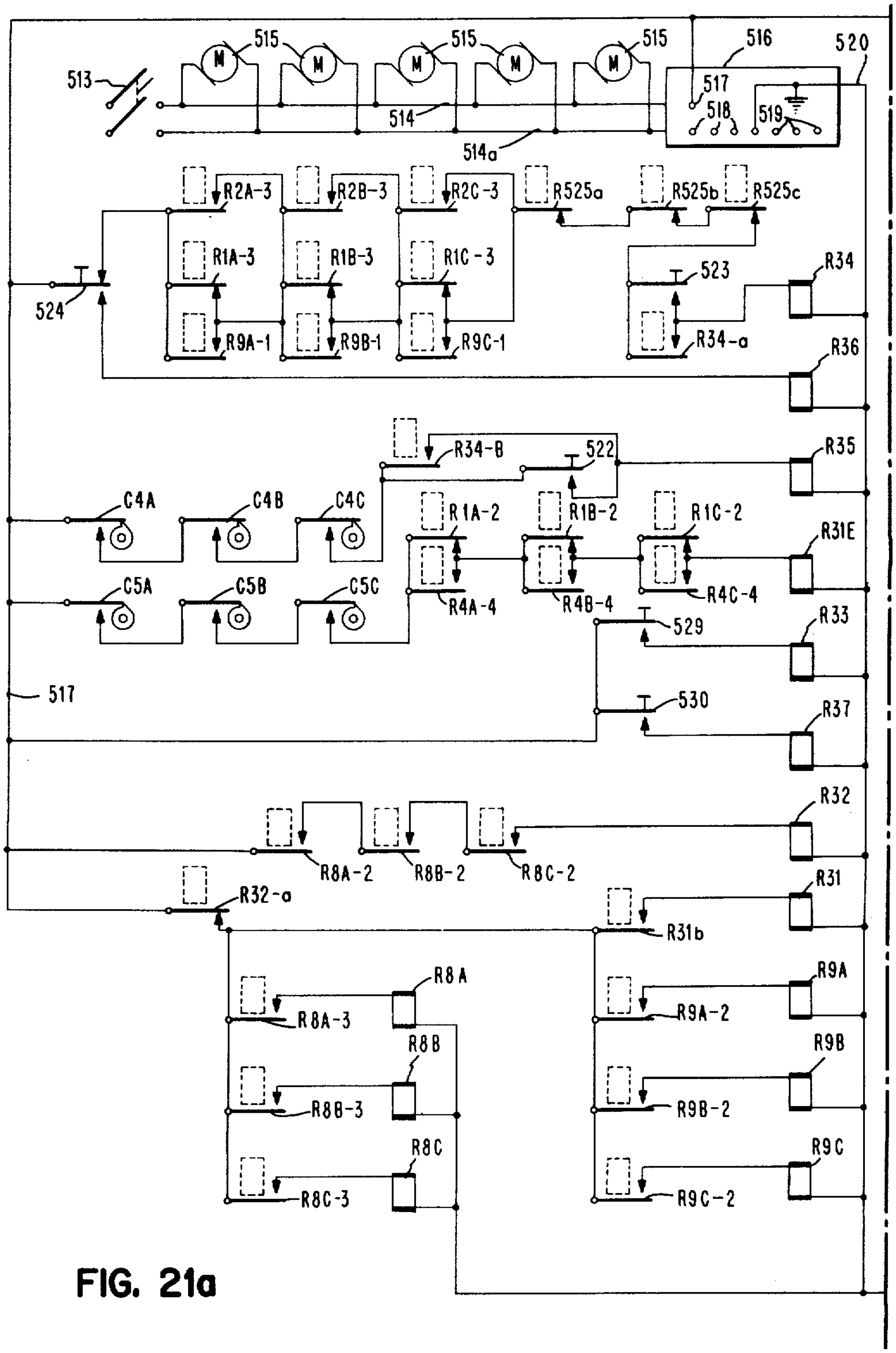
Figure 21B:
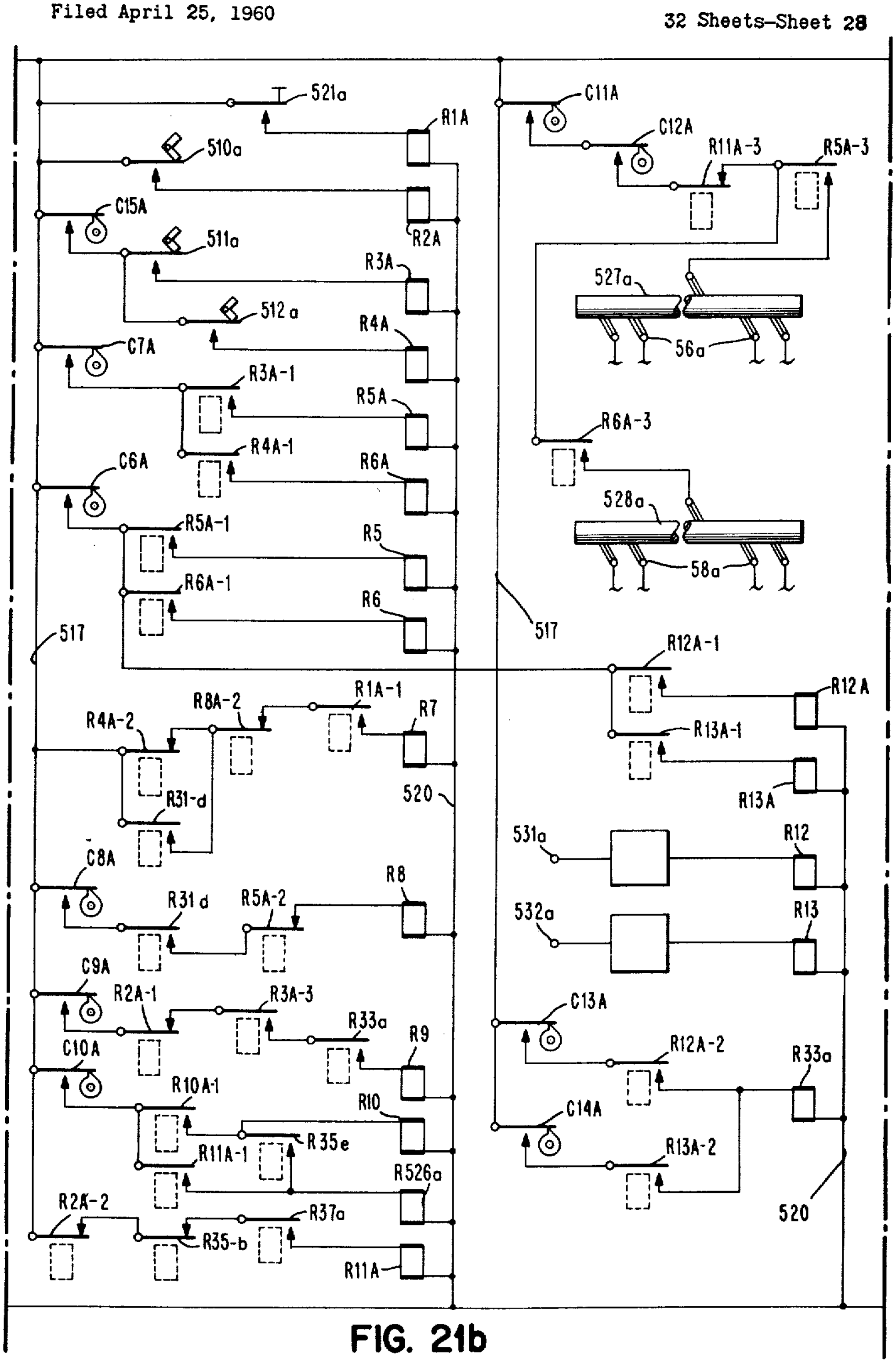
Figure 21C:
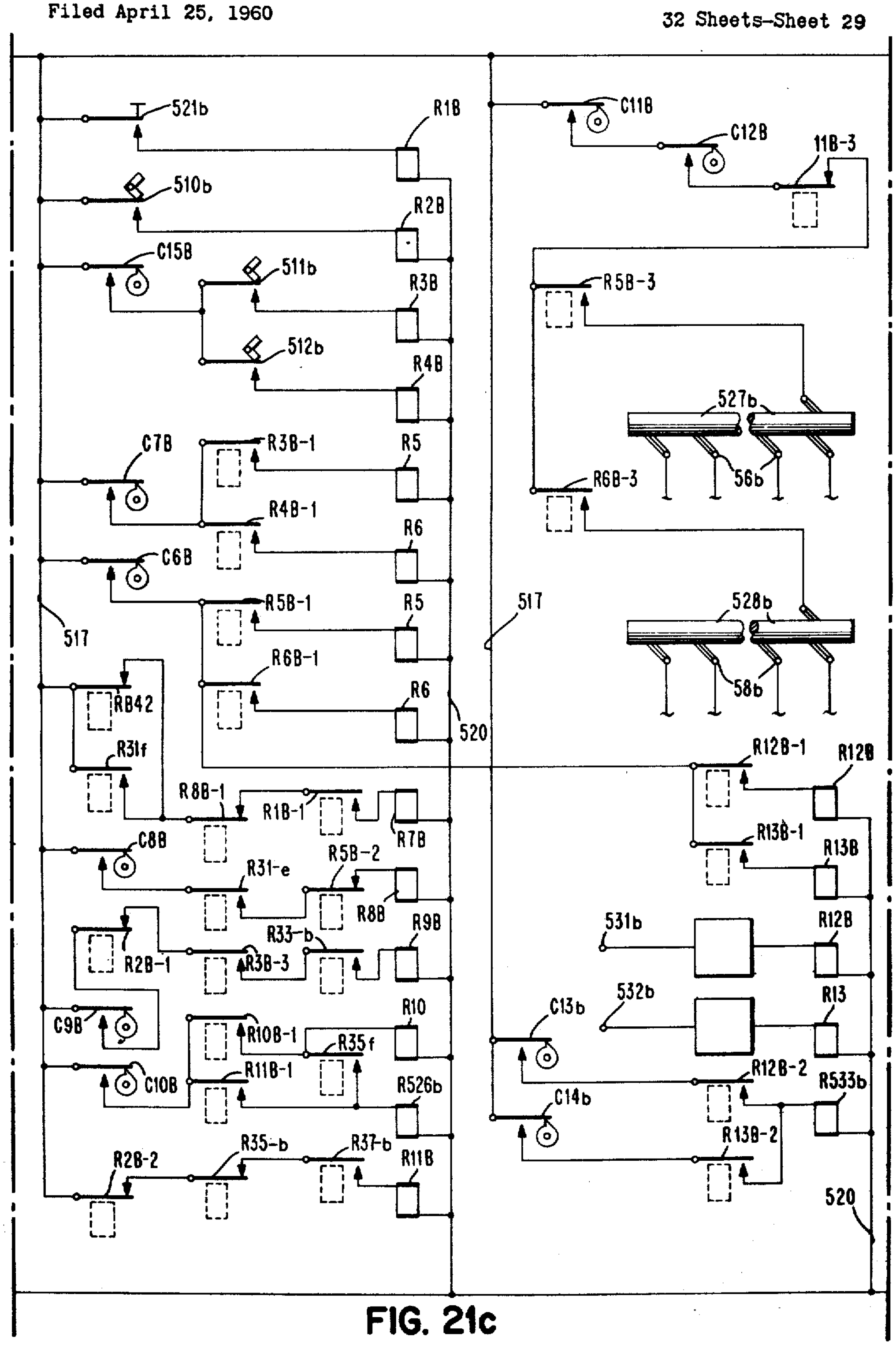
Figure 21D:
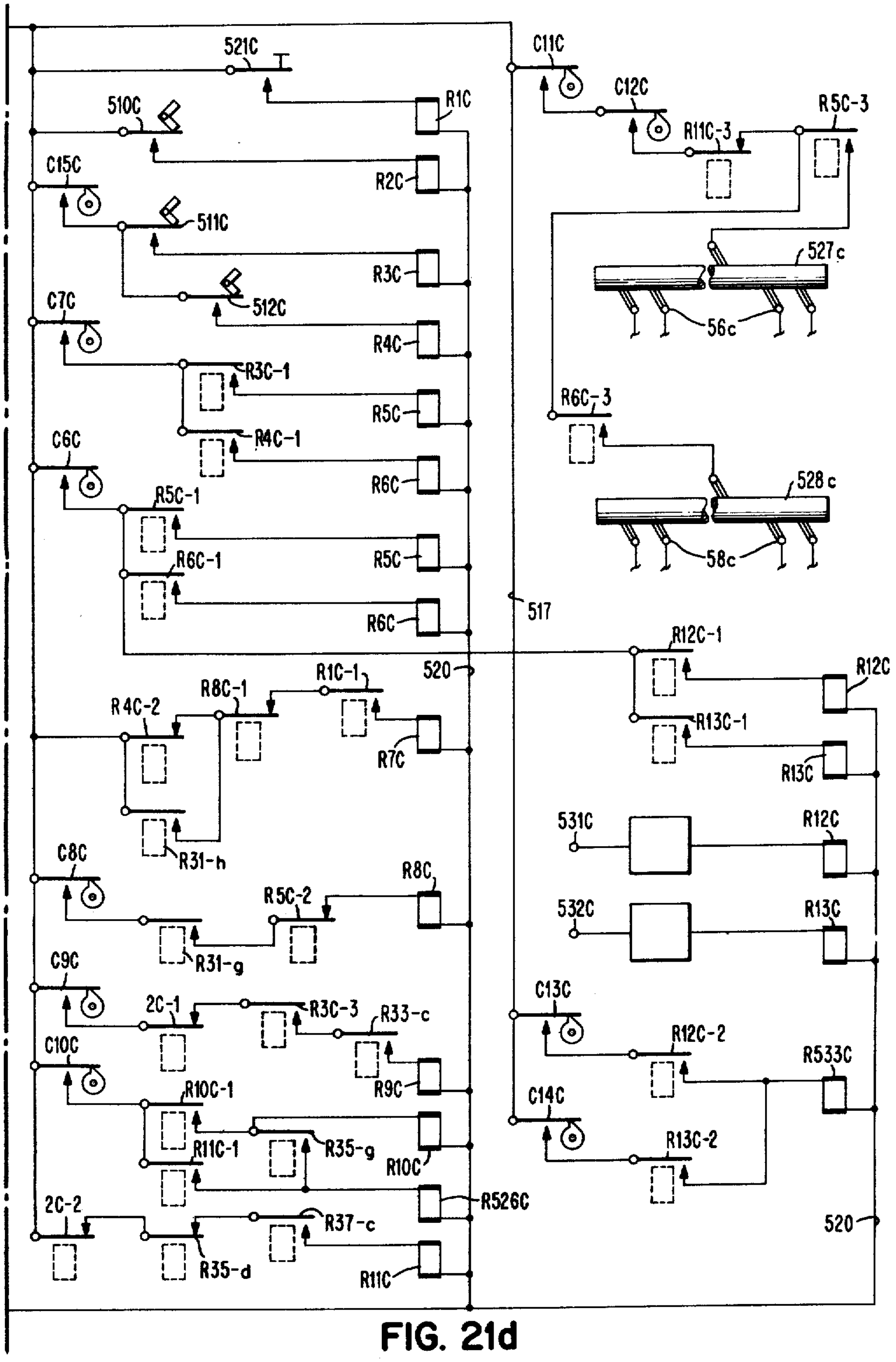
Figure 22:
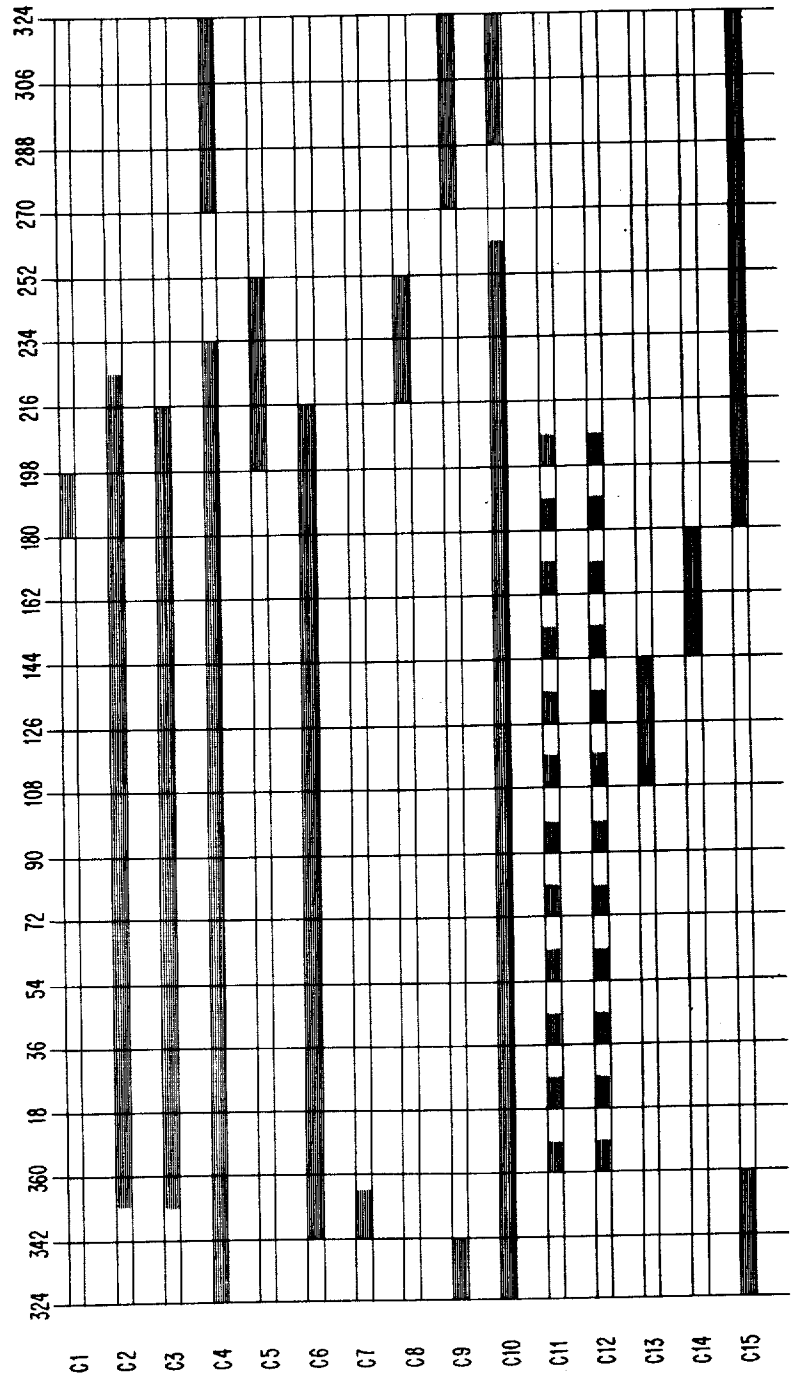

FIGURE 22 is a diagram showing the closing times of some of the mechanically controlled contacts of FIGURES 21*a* through 21*d*.

Figure 23:
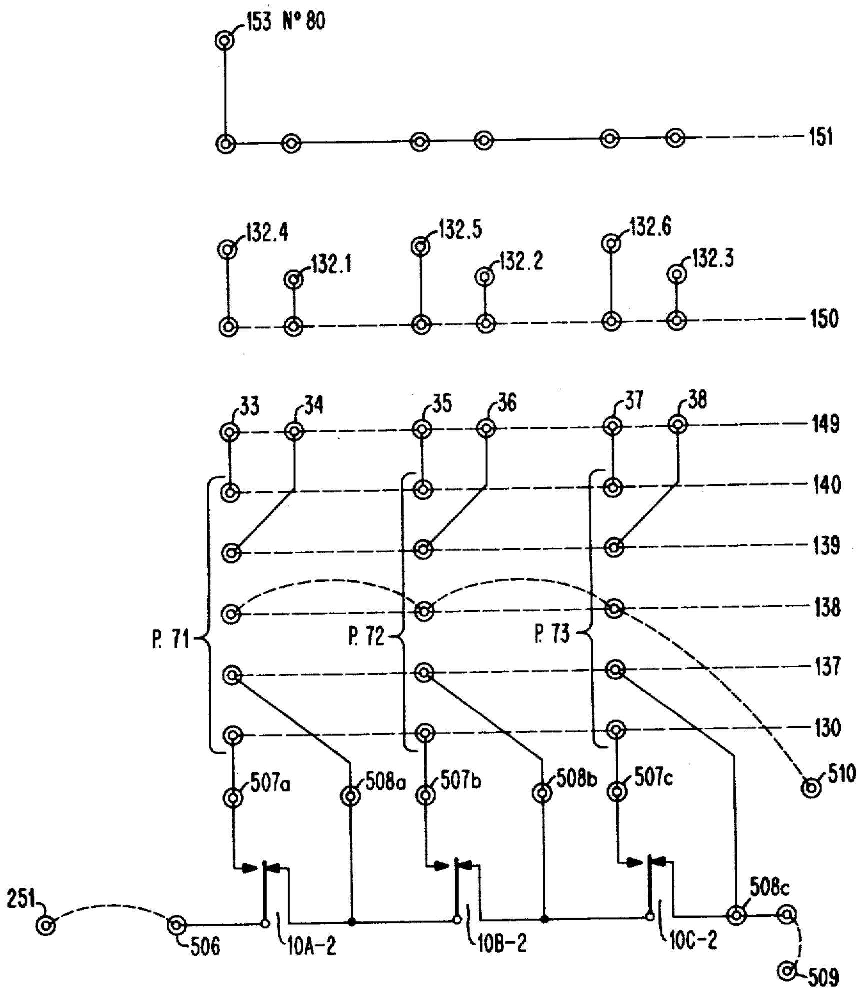

FIGURE 23 shows another illustrative set of control hubs.

Figure 1:
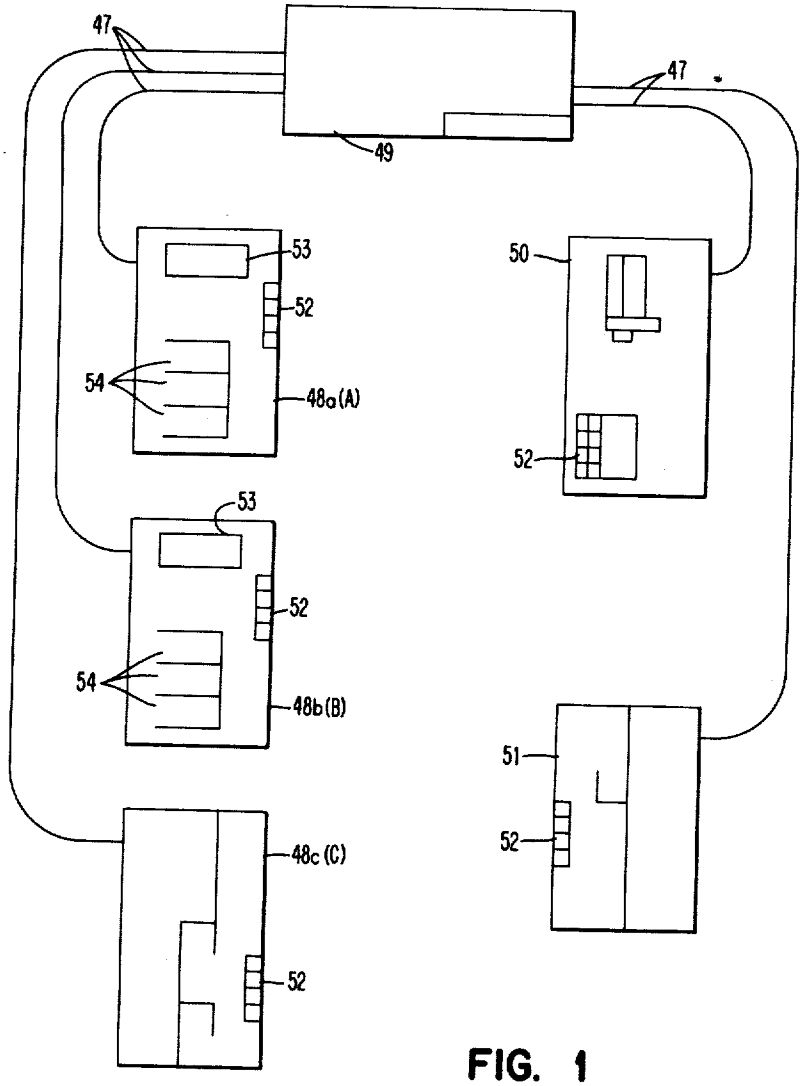
FIGURE 1 is a diagram of a physical layout of a machine constructed in accordance with the present invention.

Referring to FIGURE 1 a preferred embodiment of a machine constructed according to the invention is shown comprised of a series of distinct units, interconnected by means of wires 47 and particularly comprising: reading units 48*a*, 48*b*, 48*c*; computing unit 49; printing unit 50; and punching unit 51. Hereinafter, the card readers will be more simply designated by letters A, B and C. Control button and light indicator units 52 are used to control or to stop each one of the units or all of them. In case of an automatic stop, for example when the hopper of one of the card readers is empty, light indicators indicate which of the card readers has caused the machine to stop. It will be further remarked that there are provided, for each one of card readers 48*a* and 48*b*, a hopper 53 and stackers 54, very schematically represented here. With the purpose of simplification, it will be assumed, hereinafter that all card readers are identical.

Figure 3:
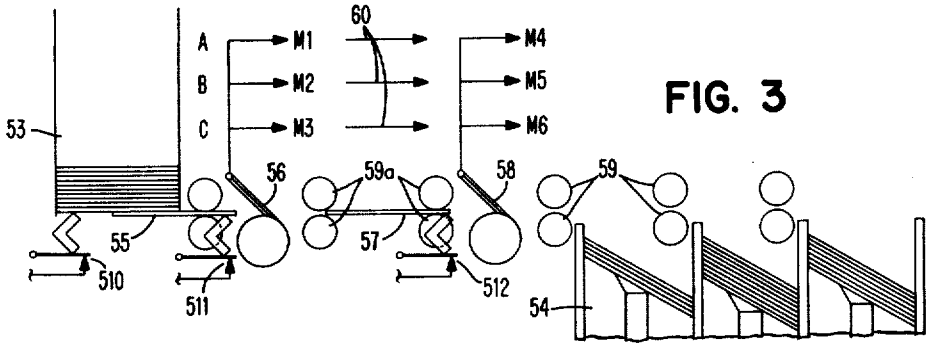
FIGURE 3 is a schematic view showing the card advance within the reading units of the machine of FIGURES 1 and 2.

Referring to FIGURE 3, the cards in the hopper close a contact 510. During successive cycles, the cards are first advanced to position 55, in front of so called "prescanning" brushes 56. They are then advanced past these brushes to be scanned, then they are advanced to position 57 in front of the "operation" brushes. They are then advanced past the latter brushes to be scanned again and then are directed towards one of the stackers 54. Rollers 59, 59*a* cause the cards to advance. They may all be depending upon one another, or some of them, namely rollers 59 may be assigned a continuous rotation. The cards are advanced as required, as is usual, and an Off time of variable length may occur between two consecutive moves. Contacts 511 and 512 are closed whenever a card is in position 55 or 57. Contact 510 opens when the last card in the hopper 53 is brought to position 55. Generally, contacts 510, 511, 512 indicate the advance state of the cards and also indicate whether the advance is correct.

Figure 2:
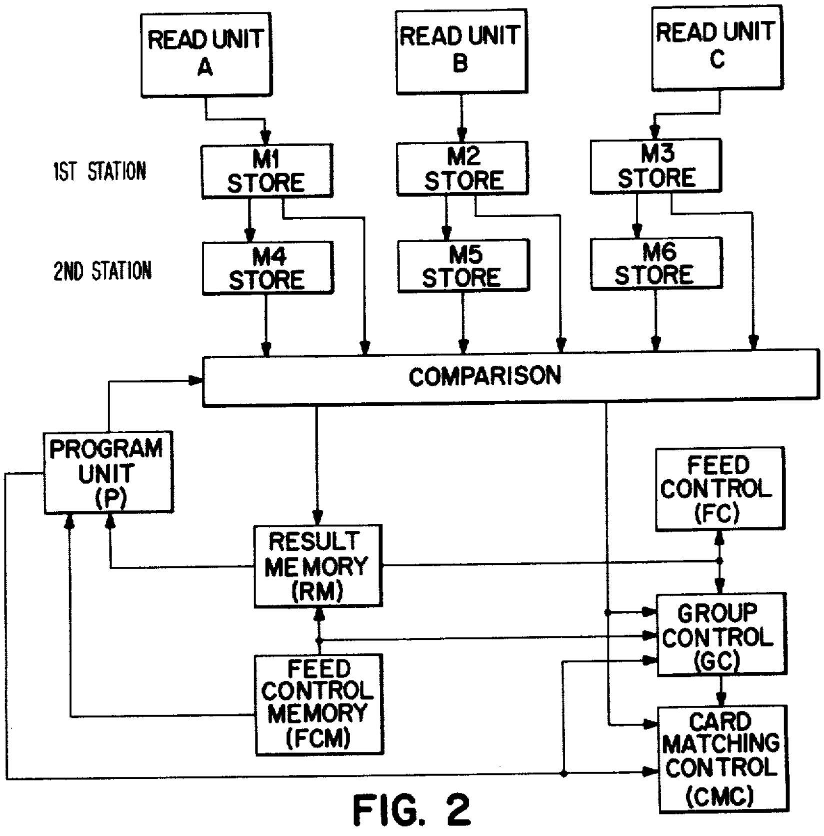
FIGURE 2 is a schematic diagram showing the relationship of the functional units of the machine of FIGURE 1.

Thus each card is advanced under brushes 56, then, during the following cycle, past brushes 58 at the time the following card is scanned by brushes 56. On its passage under brushes 56 each card is recorded in its whole in one of memories M1, M2, M3 (FIGURE 2) according to the correspondence of the row of brushes to one of card readers A, B or C. Similarly, each card advanced past brushes 58 may be entirely recorded in one of memories M4, M5, M6, according to the brush row corresponding to one of card readers A, B or C.

According to a preferred embodiment of the invention, the second recording may be replaced by a direct transfer from one of memories M1, M2 or M3 to the corresponding memory M4, M5 or M6, said transfer being performed immediately before the cards are advanced past brushes 56. The memory from which the transfer has been made is thus cleared and available for a new recording.

Before explaining how the card feed is automatically controlled by the recordings made in memories M1, M2, M3 some special circuits as well as various circuits relating to the operation of the computing unit will be described (FIGURES 4*a* to 24).

Figure 10:
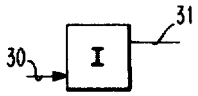
Figure 11:
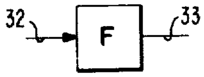
Figure 11A:
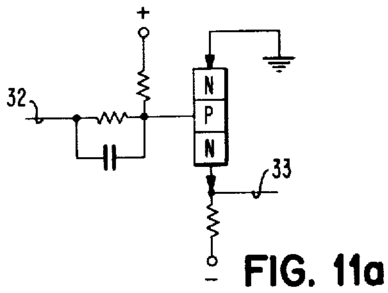

FIGURE 11*a* is a power circuit. FIGURE 11 is a symbolic representation of that same circuit. Input leads 32 and output leads 33 are always at the same potential. The circuit represented in FIGURE 11*a* is only needed for the simultaneous supply of several shunted circuits, or the feeding of a common output terminal with pulses from a number of different sources. As a general rule, the circuit will not be represented, but will usually be considered as included in the circuits of FIGURES 7, 8, 10, 12, 13 and 14.

Figure 7:
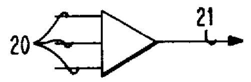
Figure 7A:
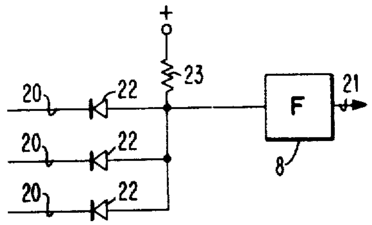

FIGURE 7*a* represents a coincidence circuit. The input leads 20 are supplied a voltage which is normally negative, but which, under some conditions, may turn positive. In the first case, the output lead 21 is subjected to a negative voltage since diodes 22 transmit the current and a significant voltage drop occurs in resistance 23. This happens particularly when one only of leads 20 is negative. On the contrary, if all leads 20 are simultaneously supplied a positive voltage, no current traverses diodes 22 so that resistance 23 is traversed only by the current flowing through lead 21. The corresponding voltage drop being relatively low, the potential of lead 21 is set to a positive value. The positive value of the potential indicates a coincidence between the input positive pulses. Any number of inputs may be provided (two, three . . . as the case may be).

The circuit of FIGURE 7*a* is symbolically represented as shown in FIGURE 7. As the case may be the output is effected directly or through a circuit similar to that represented in FIGURE 11.

Figure 8:
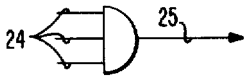
Figure 8A:
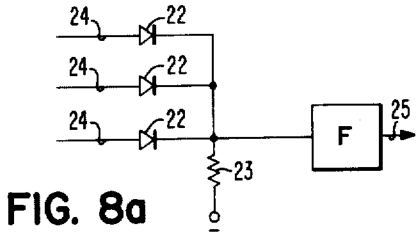

FIGURE 8 shows the symbol representing the "Or" circuit of FIGURE 8*a*. Output lead 25 is at a normally negative voltage, which turns immediately positive when one only of input leads 24 is itself positive. The circuit of FIGURE 8*a* will be seen in FIGURES 4*a* to 4*q* under its symbolic form. Reference to it will be generally omitted. The output may be delivered directly or through a circuit similar to that represented in FIGURE 11.

Figure 9:
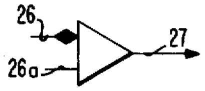
Figure 9A:
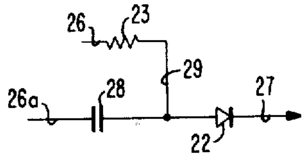

Similarly, FIGURE 9 represents the symbolic form of the circuit shown in FIGURE 9*a*. The latter is a coincidence circuit for transmitting very short positive pulses for controlling the triggers such as that represented in FIGURE 13. Inputs 26 and **26*a*** (FIGURE 9*a*) are normally negative and positive respectively: the first one is to receive positive pulses, the second one negative pulses. So long as input 26 is negative, the pulses applied to input **26*a* are inoperative because lead 29 is then at a negative potential and because diode 22 prevents the pulses from being transmitted. On the contrary, when input 26 is at a positive voltage, the potential of lead 29 sets itself to a positive value, thus permitting all positive pulses from input 26*a* to be transmitted. This occurs whenever the potential of input 26*a* returns to a positive value. Condenser 28 then transmits a positive pulse of a short duration, which momentarily increases the potential of lead 29. The circuits are arranged so that diode 22** allows the current to flow therethrough.

Figure 10A:
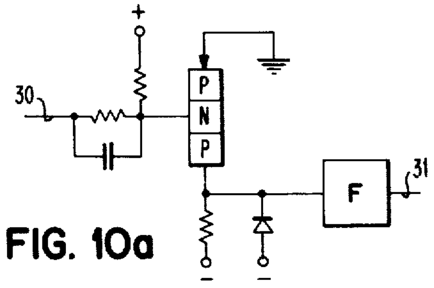

FIGURE 10 is the symbol representing the circuit of FIGURE 10*a*. The latter is an inverter. Output 31 is negative whenever the input is positive and conversely. A circuit similar to that represented in FIGURE 11 may possibly be inserted at the output thereof.

Figure 12:
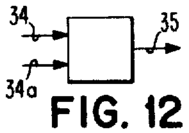
Figure 12B:
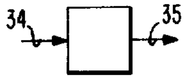
Figure 12A:
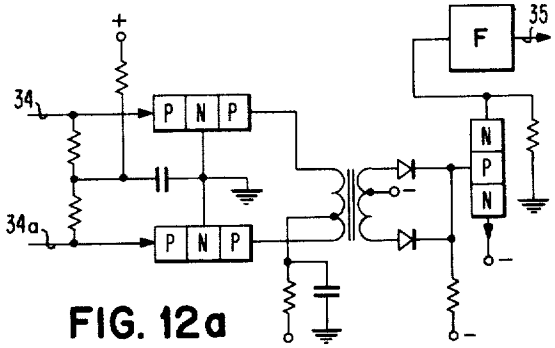

FIGURE 12*a* represents one of the amplifying circuits used in conjunction with magnetic core memories. The electromotive force, induced on the inversion of the magnetic force, is applied across input 34 and **34*a*. A positive pulse is collected on output 35**. The circuit is shown in FIGURES 4*a* to 4*q* under the symbolic forms represented in FIGURES 12 and 12*b*. In FIGURE 12*b*, the inputs have been merged with the purpose of simplification. A circuit similar to that represented in FIGURE 11 may be incorporated in the output circuit.

Figure 13:
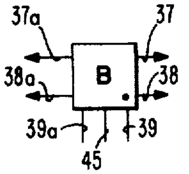
Figure 13A:
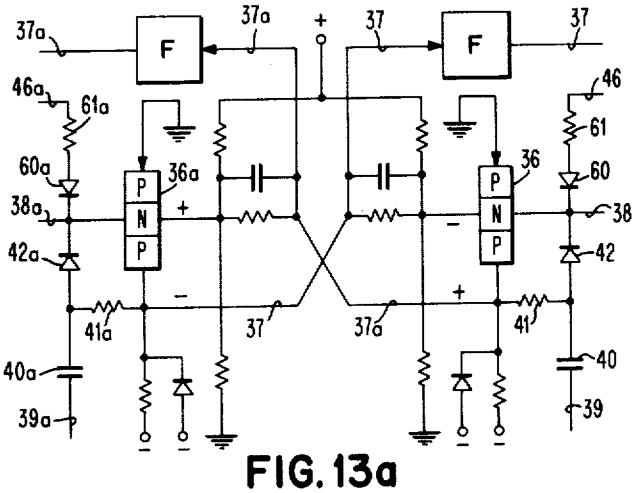

FIGURE 13*a* represents a transistor trigger. A first stable state of the circuit corresponds to transistor 36, for example, being conductive. In such a case, output 37 is set at a negative voltage, whereas output **37*a* is at a positive voltage. The trigger may be switched by a positive pulse applied to input 38. A positive pulse applied to input 38*a*** is inoperative. In most cases this positive pulse must be applied through a circuit of the type represented in FIGURES 9 and 9*a*.

This same trigger (FIGURE 13*a*) may be switched by a positive voltage applied to lead 39. Said voltage acts upon the circuit composed of condenser 40, resistance 41 and diode 42, which is nothing but the assembly of the component circuits of FIGURE 9*a*. It will be particularly noted that one end of resistance 41 depends upon output **37*a*, which is now assumed to be positive. A positive voltage applied to lead 39*a* is inoperative because the end of resistance 41*a* depends upon lead 37 which is assumed to be at a negative voltage. Generally, it is possible, if required, to apply several different pulses to one of leads 38 or 38*a*, or to provide the application to leads 39 and 39*a*** of positive voltages from various sources.

A second stable state of the trigger corresponds to transistor **36*a* being conductive. In such a case, output 37*a* is set at a negative voltage, whereas output 37 is then at a positive voltage. The trigger may be switched either by a positive pulse applied to lead 38*a*, or by a positive voltage applied to lead 39*a*. It is obvious that this switching causes the potentials of leads 37 and 37*a***, respectively, to be inverted.

The trigger of FIGURE 13*a* will be represented in leads 4*a* to 4*q* by the symbol shown in FIGURE 13, the reference letters being any one desired. The determination of the lead type will be made without any ambiquity according to their origin and according to whether they are applied to the right, or left portion of the square, or to the upper or lower portion theerof. A control signal 45 may also be applied in the midpoint of the lower part. Such a control signal indicates that a positive pulse simultaneously is applied to both inputs 38 and **38*a*. It was seen that only the pulse applied to the conducting side is operative, the time constants of the circuits are determined so that there occurs then but one switching. A point placed inside the square, on the right or on the left, indicates the normally conducting side. It was seen that in this case, the corresponding output is a negative voltage; on the other hand, circuits similar to that represented in FIGURE 11 may be inserted in the output circuits 37 and 37*a***.

In case it is desired to maintain a given trigger in a given state, there will be applied a permanent positive voltage to one of inputs 38 and **38*a*. A positive voltage applied for example to input 46 turns lead 38 positive, thus locking transistors 36. The result is a negative voltage in lead 37*a*, which turns transistor 36*a* conductive and causes a positive voltage to be applied to lead 37. In such a case, the pulses applied to input 38*a* are inoperative so to speak, because these pulses have a short duration and they may cause but a temporary modification of the conductive or nonconductive state of transistors 36 and 36*a***.

Positive voltages will not be differentiated by the inputs such as 39 and 40. The preferred input type will result from the logic of the circuits, according to whether any further switching is desired or not.

Figures 14, 14A:
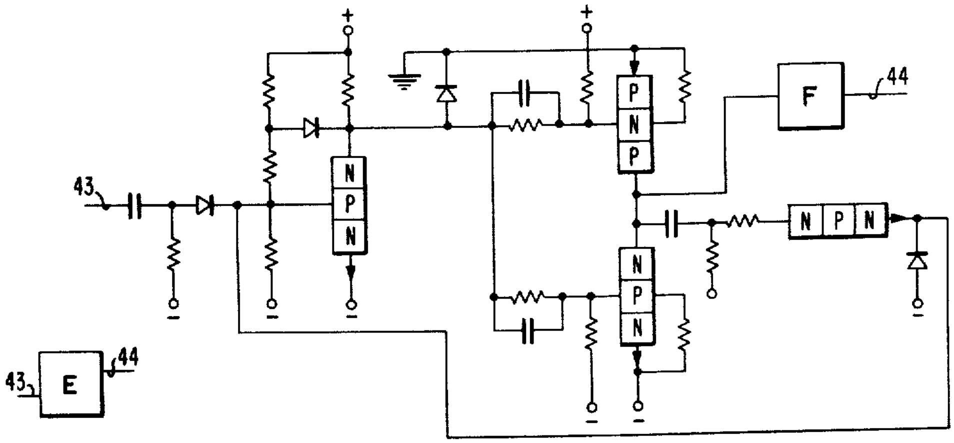

FIGURE 14 shows a pulse emitter. A positive voltage applied to lead 43 causes a positive pulse of a relatively short duration to be delivered on the output. The circuit of FIGURE 14 schematically represented under the form of the rectangle of FIGURE 11*a* with reference letter E will provide basic pulses which will condition the whole of the circuits, as will be explained now.

PULSE GENERATORS

The pulse generator is composed of four emitters **100*a*, 101*a*, 102*a*, 103*a*** (FIGURE 4*i*) operating as a closed circuit. These emitters have been described more in detail in FIGURE 14. When applied positive pulses on their input terminal 43, they deliver a positive pulse of a very short duration to leads 100, 101, 102, 103 (FIGURE 4*i*) respectively, and are timed as indicated in FIGURE 16.

Said pulse generator is automatically turned on as soon as one of triggers B11 to B16 (FIGURE 4*m*) is switched; it then remains on so long as the triggers have not all been reset.

Triggers B11 to B16 are normally conducting through their right side, as is indicated by the points placed inside the various blocks. In such a case, and as mentioned above with reference to the circuits of FIGURE 13, the output leads, such as 108, 109, 110 or 107, are at a negative voltage, and so is lead 117 from mixing circuit 112. The voltage of that lead is applied in particular to coincidence circuit 118 (FIGURE 4*i*) which is locked thereby. In parallel, lead 113 which is connected to negative terminal 106, through resistance 105, is also negative.

For any one of triggers B11 to B16 (FIGURE 4*m*) happening to be switched (it will be seen later how this is done) one of leads 108, 109, 110, or 107, is set to a positive voltage, which causes a positive voltage to appear in lead 117 and to keep the same value so long as those among triggers B11 to B16 which have been switched are not all reset. This voltage is particularly applied to condenser 104 (FIGURE 4*i*), to lead 113 and through mixing circuit 114, to lead 115, and finally to emitter **101*a*. The latter thus delivers a first pulse, which causes, a little later and successively, units 102*a*, 103*a* and 100*a* to emit pulses. The voltage of lead 117 is applied to coincidence circuit 118, thus favoring the transmission of pulses from lead 100**.

When emitter **100*a* begins operating, the pulse on lead 100 is transmitted by coincidence circuit 118 and applied again to emitter 101*a*, through mixing circuit 114**.

Emitter **101*a* also provides a second pulse, which in turn starts emitters 102*a*, 103*a*, 100*a*, then again 101*a***.

To sum up, the chain constituted by emitters **101*a*, 102*a*, 103*a*, 100*a*, provides a series of successive pulses, which is indefinitely repeated so long as the voltage applied to lead 117** is unchanged.

Lead 103 particularly feeds to inverter 119 which feeds to lead 120 and coincidence circuits 121 and **121*a*. Trigger B1 being initially restored as indicated by the dot placed within the square, output lead 122*a* is at a negative voltage, thus favoring coincidence circuit 121. The latter which is of the type described in FIGURE 9 thus transmits a first pulse which switches trigger B1. It is to be remarked that lead 120 is originally positive. It turns negative when emitter 103*a* is started, and it was seen that the coincidence circuit of FIGURE 9 transmits no pulse. When pulse 103 is interrupted, that is when lead 103 turns negative again, lead 120 turns positive and it was seen that the coincidence circuit of FIGURE 9 can transmit a pulse only then. The first switching of trigger B1 coincides with the end of first pulse 103 that is with vertical 126** in FIGURE 16.

Trigger B1 being switched as seen above, lead **122*a* is reset to a negative voltage, thus locking coincidence circuit 121*a*. Consequently, a switching pulse may be applied to the left side of trigger B1 at the end of the next pulse 103. The switching time corresponds in FIGURE 16 to vertical 127**.

Therefore lead **122*a* is reset to a positive voltage, thus favoring again coincidence circuit 121 and preparing a new switching of trigger B1**, etc.

Generally, trigger B1 is switched whenever lead 103 returns to a negative voltage. Leads 122 and **122*a*** are subjected to alternate voltages, alternatively positive and negative, as may be seen from FIGURE 16.

ADVANCE PULSES

A branch line of lead 103 connects to coincidence circuits 123 and **123*a*, which have for their other inputs leads 122 and 122*a* respectively. The output leads therefore are always negative, except when the positive voltages are applied simultaneously to both inputs of coincidence circuits 123 and 123*a*. These leads connect to inverters 124 and 124*a* respectively, which feed to leads 125 and 125*a*. These leads are always at a positive voltage, except when positive voltages are simultaneously applied to coincidence circuits 123 or 123*a*. The function of leads 125 and 125*a* is to switch the various triggers, as will be seen in detail later on. The circuits controlled from these leads are generally arranged so that the switching occur when leads 125 or 125*a* turn back to a positive voltage and therefore this switching coincides with the end of pulse 103**.

*Memories and scanning chains.*—In the embodiment being described the memories have been assumed to be magnetic core memories. It is known that the magnetic state of some substances, under some conditions, assumes two readily defined saturation states and that it is possible, by differentiating said states, to characterize the presence or the absence of a bit of information. It is understood that the use of such a memory is but illustrative of the invention. The adopted recording mode is a composite mode resulting from the association of binary elements 1, 2, 4, 8, and of auxiliary arguments A, B, C. Such a code requires seven magnetic cores per position. It lends itself to the numerical and alphabetical recordings, as well as to the recording of some special signs. Argument C may be an even or odd parity checking code, as desired. It will be inserted systematically in some cases, so that the number of arguments used for the recording of a digit or of a letter is for example always even. Thus digit 1 will be for example recorded as 1—C. Digit 6 will be recorded as 2—4 without C, whereas digit 7 will be recorded 1—2—4—C. It is well understood that the adopted recording code is not necessary for the invention, and is but illustrative.

The cores corresponding to a same position and the circuits interconnecting them will be conventionally referenced by digits or letters 1, 2, 4, 8, A, B, C, according to corresponding code argument. It is obvious that in that case, letters A and B have a quite different meaning from that they will be assigned in expressions such as time A, time B, scanning chain A, scanning chain B. This will cause no confusion since these letters will never be used singly.

As concerns the sign for the numerical factors, it will be recorded as an argument A if it is a minus sign. The absence of said argument will automatically indicate a positive sign. As a rule, for each memory area, the sign will be recorded in the less significant position. In some cases, the sign may assume any position (in the case for example of a factor directly recorded from a punched card, or when the perforation characterizing the sign of that factor is in some column of said card).

The memory locations may be as numerous as desired, ranging conveniently from a few units to a few tens. It is to be noted, though, that the invention has been specially conceived so as to lend itself to the adoption of high capacity memories.

Similarly, the memories may also be in any number.

For obvious reasons and to avoid indefinitely reproducing identical circuits, on the accompanying drawings, there have been represented but 6 memories (FIGURE 4*n*) referenced M1 to M6. Each memory has been symbolically represented by seven superposed blocks seen in perspective, each one corresponding to an argument of the code used.

By way of example each memory presents 80 distinct locations thus permitting the recording of 80 digits, alphabet letters or special characters. It will be noted that each memory is able, if required, to record all the information data stored in a punched card comprising eighty columns.

In each memory, the locations are grouped according to a coordinate system such as that represented in FIGURE 15. Location 1 to 10 of memory M1 for example are defined by coordinates:

$y=1, x=1, 2 \ldots 8, 9, 10.$

Similarly locations 11 to 20 are defined by coordinates:

$y=2 \quad x=1, 2 \ldots 8, 9, 10,$ whereas locations 71 to 80 are defined by coordinates:

$y=8 \quad x=1, 2 \ldots 8, 9, 10.$

This mode of definition is but illustrative and it would be possible to adopt, for example, any one of the following coordinate systems:

| | |
|---|---|
| $x=1$ to 9 | $y=1$ to 9 |
| $x=1$ to 12 | $y=1$ to 7 |
| $x=1$ to 16 | $y=1$ to 5 |
| $x=1$ to 80 | $y=1$ |

with, if desired, some blank locations if the coordinate system allows definition, in the whole, a number of memory locations higher than the effective location number.

The various locations of one memory will be numbered conventionally in the increasing order according to a continuous numeration system ranging for example between 1 and 80. The numeration mode corresponds to the present custom consisting in referencing the columns of a card by a continuous system of numbers increasing from left to right. It is to be noted that this numeration mode is exactly the reverse of that generally adopted to designate the various consecutive digits of a number. Thus number 248 will be recorded for example:

2 in location 14
4 in location 15
8 in location 16

When it will be desired to analyze and read out that number (for example, in order to add it to another number) it will be done digit by digit, beginning by the less significant ones.

Therefore, we shall study successively the scanning and read out of the digit stored in location 16, then that of the digit stored in position 15, etc. In other words, the various positions in one memory will be scanned in the order reverse to that of their numbers.

To allow free access to any position of any one of the memories, scanning chains are associated with these memories, the number of the scanning chains corresponding to the numbers of the addresses of the chosen operation type. A simple address operation would consist in performing the elementary adding operation $a+b=c$, by means of three distinct program steps, the first one controlling the transfer of factor A to an adding organ, the second one controlling the transfer of factor B, whereas the third one controls the storage of the addition result, the latter operation being indispensable to clear the adding organ and to allow it to be used again in another series of operations. Such an operating mode requires but one scanning chain since each program step controls but one factor.

A three address operation would allow the elementary addition operation $a+b=c$ in one single program step. It requires three scanning chains. For it is necessary to control simultaneously the extraction of factors A and B and the storage of the result of the addition.

In many cases, it is not advantageous to proceed in such a way, and in particular when said factor is immediately useless as soon as it has realized its function. In such a case, the result of the operation may be substituted. Thus one gets a double address operation type and the standard elementary operation: $A+B=B'$.

Factor B is an intermediate computation result which is determined only to facilitate the computation of B′ and which is erased as soon as it has fulfilled its function, i.e. precisely as soon as it has allowed the computation of B′. Two scanning chains are enough, in such a case, and it will be remarked further that these chains have perfectly differentiated functions: one chain controls the readout of factor A and its regeneration, and the second one controls the readout and erasing of factor B and its substitution by the result of operation, B′.

It is this double-address operation type which has been adopted in the embodiment which is being described: The scanning chains will be generally designated: chain A or chain B, according to whether they control the read out and regeneration of factor A or the read out of factor B and its replacement by the result of operation, B′.

The scanning chains are arranged in a way similar to that in which the various locations of one memory have been grouped, in rows and columns (refer to FIGURE 15). Chain A for example is subdivided into a unit chain allowing the memory to be scanned according to abscissa *x* and in a tens chain performing the same scanning according to ordinate *y*.

The unit chain is formed of triggers 1U to 10U (FIGURES 4*g* and 4*f*) out of which but the first two and the last two have been represented. To these triggers, there are associated memory locations 1 to 10 and those deriving therefrom by adding integer multiples of 10. The various memory locations being scanned in the order opposite to that of their numbers, such will be the advance of the unit chain, as will be seen later.

The tens chain is composed of triggers 0D to 7D (FIGURE 4*e*), out of which only the triggers quoted have been represented. To these triggers, there are associated respectively the first ten locations of a memory, then the ten next, and so on. As will be seen, the advance of the tens chain is also performed in the order opposite to that of their numbers, so that there are scanned first the memory locations bearing numbers 80 to 71, then locations bearing numbers 70 to 61, etc. Generally, the index number of the triggers controlling the scanning of a given location in the memories is immediately obtained by separating the two digits of that number from each other. Thus location 27 is controlled respectively by trigger 2D and 7U. One exception for the locations bearing a number multiple of 10, location 30 for instance is controlled by triggers 2D and 10U and not by triggers 3D and 0U.

To scanning chain A, there are associated further triggers 1M, 2M, 3M . . . (FIGURE 4*c*) permitting the characterization of the memory according to its number. Trigger 1M for example being switched, lead 217 is at a positive voltage, and such are leads 197 and 195 when coincidence circuit 194 allows the voltage to be equalized. Lead 195 connects to mixing circuits 323 and **323*a*, which respectively feed to leads 324 and 324*a*. Therefore, the latter will be positive, whenever coincidence circuit 194 allows the voltage to be equalized, i.e. whenever lead 188** is itself positive.

Lead 324 controls coincidence circuits 325 and **325*a*. Thus the latter may turn positive if anyone of leads 193 or 193*a* is positive, i.e. if any one of triggers 0D to 7D is switched (the circuits corresponding to triggers 1D to 6D). If trigger 7D for example is switched, lead 216 is positive, thus switching lead 193 to a positive voltage when lead 188 is itself positive. It has been seen that the voltage of lead 195** (FIGURE 4*c*) and leads 324 and 324*a* depended upon the voltage of that same lead 188. Leads 326 and 326*a* (FIGURE 4*e*) may be found again in FIGURE 4*n*. Lead 326 for example controls coincidence circuits 327 and 327*a*, units 328 and 328*a* and that among the leads of group 329 further referenced 7 or $Y=8$. Under the same conditions, lead 326*a* controls that among the leads of the same group which is further referenced 0 or $y=1$.

Similarly lead 324 (FIGURE 4*e*) controls coincidence circuits 330 (FIGURE 4*f*) 330*a*, 330*b*, (FIGURE 4*g*) 330*c* and the leads generally indexed 331. Thus the latter may turn also positive if any one of leads 191, 211, 332 (FIGURE 4*f*) or 332*a* is itself positive, i.e. if any one of triggers 1U to 10U is switched. Lead 213 (FIGURE 4*g*), for example, is positive if trigger 1U is switched, and so are lead 191, when lead 188 is itself positive, and that among leads 331 which is further referenced 1 (see also FIGURE 4*n*) which controls coincidence circuits 333, 333*a*, units 334 and 334*a*, as well as that among the leads of group 335 which is further referenced $x=1$.

Finally, the simultaneous switching of triggers 1M (FIGURE 4*c*), 7D (FIGURE 4*e*) and 1U (FIGURE 4*g*), for example, results in respectively controlling those among the leads of groups 335 and 328 which are further indexed $x=1$ and $y=8$ in further controlling the memory location where these leads intersect, i.e. location 71 in memory M1.

Similarly, it will be seen that, under some conditions, the switching of trigger 2M (FIGURE 4*c*) results (lead 188 positive) in turning lead 195*a* positive. A branch line of that lead connects to mixing circuit 323*a* and lead 324*a*, i.e. to the same lead as previously, which finally controls lead group 335 (FIGURE 4*n*). On the ohter hand, a second branch of lead 195*a* connects to mixing circuit 323*b* which in turn controls lead 336 (see also FIGURE 4*e*), lead group 337 as well as lead group 338 (FIGURE 4*n*). The circuits connecting the two latter lead groups have not been represented, but may appear after those connecting lead groups 326 (FIGURE 4*e*) and 329 (FIGURE 4*n*). Lead groups 335 and 338 intersect again in a memory area corresponding to the 80 locations of memory M2.

Similarly, it will be seen that the switching of trigger 3M (FIGURE 4*c*) generally controls memory M3 (FIGURE 4*n*), the connecting circuits having been but partially represented. Similarly an unshown trigger (FIGURE 4*c*) controls a fourth memory, etc.

Scanning chain B is arranged exactly as chain A. It comprises:

A units chain composed of triggers 11U to 20U (FIGURES 4*g* and 4*f*);

A tens chain composed of triggers 10D to 17D (FIGURE 2*e*).

Triggers 11M, 12M, 13M . . . (FIGURE 4*c*) are associated therewith.

It will be noted that all the references are the same as those used for chain A, systematically increased by 10. Trigger 12M for instance, causes a voltage to be applied to lead 195*a*, i.e. to the lead which is applied a voltage on the switching of trigger 2M, with the only difference that this voltage application coincides now with a positive voltage of lead 265. Under the same conditions, trigger 17D (FIGURE 4*e*) for example, causes the application of a voltage to lead 193, which is also controlled by trigger 7D, whereas trigger 11U (FIGURE 4*g*) causes the application of a voltage to lead 191. Generally speaking, chain B permits memories M1, M2, M3 . . . (FIGURE 4*n*) to be controlled in the same manner as did chain A, with the difference that this control now coincides with a positive voltage of lead 265.

GENERAL OPERATION PRINCIPLE

To make it easier to understand what follows, it is of interest to note the objectives, as well as the approach used to reach the objectives.

The main objective is to accommodate transfer operations, arithmetical operations, or else in comparing operations, said operations being effected between quantities stored in memories.

Let it be assumed, for example, that it is desired to add two factors. These factors, *a* and *b*, will be supposed stored respectively in areas A and B of some memories, and let us suppose that *b'* is their sum, and is to replace *b* at the end or in the course of the operation.

To simplify, it will be supposed that *a* and *b* are of the same scale (i.e. that they express a sum of units of the same range) and that they are respectively 321 and 8765.

In a first operation time, the first digit of *a*, namely 1, is read out.

During the second operation time, the first digit of *b*, that is 5, is read out, added to 1, which makes 6; then 5 is replaced by 6. At that moment, memory area *b* is storing quantity 8766 instead of 8765 as previously.

During a third operation time, the second digit of *a*, i.e. 2, is read out, then during a fourth operation time, the second digit of *b*, i.e. 6 is read out, added to 2, which gives 8, and 6 is replaced by 8. At that moment, memory area B contains quantity 8786 instead of 8766 previously, and 8765 originally.

During a fifth operation time, the third digit of *a*, namely 3, is extracted, then, during a sixth operation time, there occurs: the read out of the third digit of *b*, namely 7; the addition of 3 to 7, i.e. 10; the replacement of 7 by 0.

Memory area B contains at that moment 8086. The carry 1 is stored apart so as to be possibly recycled should the occasion arise.

During a seventh operation time, the fourth digit of *a*, namely 0, is read out. Particularly, area A is fictitiously completed by a series of zeros when the scanning of the corresponding area is completed.

During a second operation time, there occurs: the read out of the fourth digit of *b*, i.e. 8; the addition of that digit to the corresponding digit extracted from area A or replacing a preceding one therein, i.e. in the illustrative example $8+1=9$; the replacement of 8 by 9.

Memory area B, at that moment, stores 9086 which is the result of adding 321 to 8765.

From above, it is seen that the result of the addition is elaborated progressively, digit by digit, and that the operation method used is primarily characterized by the alternance of two operation times: First time—read out of a well determined digit of area A; Sectond time—read out of the correspondingly significant digit of area B. Addition of the digit with that previously read out from area A. Possible addition of a carry from the immediately lower order. Replacement by the result of the whole of these operations of the digit previously read out from area B.

The first operation time will be designated conventionally as time A, and the second one as time B.

As will be seen, the first operation time will be primarily characterized by a positive voltage applied to lead 122*a* (FIGURE 4*i*), as well as by various pulses controlled from that lead. Time A will extensively define any time corresponding to a positive voltage across lead 122*a*. The end of that time is indicated by leads 120 and 125*a* turning back positive, by the switching of trigger B1 caused by a pulse from coincidence circuit 121*a*, and by other switchings which will be discussed later and which are for preparing the following operations.

The second operation time is substantially characterized by a positive voltage across lead 122 as well as by various pulses controlled from that lead. Similarly and extensively, the name of time B will be given to any time corresponding to a positive voltage of leads 122. At the end of that time, leads 120 and 125 turn back positive, trigger B1 is switched by a pulse from coincidence circuit 121 and there occur additive switchings which will be discussed later, and which are primarily for preparing the following operations.

It is to be pointed out that the latter pulses indicate the end of the operations relating to digits of a well determined order.

POSITIONMENT AND ADVANCEMENT OF THE SCANNING CHAINS

Chain A and chain B are positioned in a way which will be described later. It has been explained how the various memory locations are made to correspond and which are the various combinations possibly provided by the tens and units chains. For memory location 72, for example, triggers 7D (FIGURE 4*e*) and 2U (FIGURE 4*g*) are switched in chain A, or 17D and 12U in Chain B. Generally, there may be established a correspondence table indicating for each of the 80 memory positions the corresponding trigger combinations. Under these conditions, the scanning chains are positioned in a location of the memories when the combination of the corresponding triggers are switched. The circuits connecting the 80 hubs 153 (FIGURE 4*d*) and the coincidence circuits generally referenced 203 and 204 (FIGURES 4*g* and 4*e*) meet that positioning requirement. This will be seen hereinafter.

Chain A being positioned, for example in location 72 (triggers switched: 7D and 2U), it will be advanced, as will be seen later, at the end of each time A whenever the voltage of lead 181 (FIGURES 4*e* to 4*i*) is positive anew. The lead 103 reverts to its negative state at the same time. A first switching pulse is provided on the switching of trigger B7 (FIGURE 4*h*), and it will be assumed that this pulse has switched specifically triggers 7D and 2U (see above).

Therefore, leads 216 (FIGURE 4*e*) and 339 (FIGURE 4*g*) are positive. Lead 188 being itself positive (the reason why will be seen later), coincidence circuit 190*a* is favored on its two inputs, thus causing lead 190*a* to become positive and still favoring coincidence circuit 212. The latter, when receiving a pulse from a branch line of lead 181 delivers a switching pulse from lead 340 to the left side of trigger 2U, thus restoring it to its initial state, and to the right side of trigger 1U, thus switching it. The switched triggers are then 7D and 1U, which correspond to memory location bearing number 71.

During the following time A, leads 213 and 191 are positive. Consequently, at the end of that time, an advance pulse is transmitted by coincidence circuit 212*a* and lead 340*a*, and applied to the left side of trigger 1U and to the right side of trigger 10U (FIGURE 4*f*). Trigger 1U is thus restored, whereas trigger 10U is switched. In parallel with this positive voltage of lead 213 (FIGURE 4*g*) is applied to mixing circuit 209 (FIGURE 4*e*) to lead 210 and to coincidence circuit 215*a*.

Lead 188 is always positive during time A, trigger 7D is switched, and leads 216 and 193 are also positive. This positive voltage is applied to another input of coincidence circuit 215*a*. Generally the latter voltage is inoperative, except when trigger 1U (FIGURE 4*g*) is itself switched. The voltage of lead 213 is applied to coincidence circuit 215*a* (FIGURE 4*e*), as has just been explained. In such a case, the latter also transmits an advance pulse, which results in restoring trigger 7D to its initial state, and in switching trigger 6D (not shown). Under these conditions, the triggers switched at the end of the given time are respectively triggers 6D and 10U (FIGURE 4*f*) which correspond to the memory location bearing number 70.

At the end of the succeeding times A, triggers 9U, 8U, 7U . . . 2U, 1U, are successively switched, whereas triggers 10U, 9U . . . are successively restored to their initial state. The result is the successive control of trigger combinations 6D—9U, 6D—8U . . . 6D—2U, 6D—1U, respectively corresponding to the memory locations bearing numbers 69, 68 . . . 62, 61. The trigger combinations controlled are 5D—10U, 5D—9U . . . corresponding to the memory locations bearing numbers 60, 59. Generally all the trigger combinations corresponding to a systematic scanning of the various locations of one memory are controlled successively, the scanning being effected in an order reserve to that of their numbers.

The scanning chains are generally disposed in a ring. Therefore it is necessary to interrupt the scanning operations when location 1 is reached in order to avoid the operations being resumed in location 80. The trigger combination corresponding to that position is 0D 1U. These triggers are assumed switched, leads 213 and 216*a* (FIGURES 4*g* and 4*f*) are positive as are leads 191 and 193*a* during the following time A. A branch line of these leads connects to coincidence circuit 341 (FIGURE 4*g*) which is thus simultaneously favored on both inputs, thus turning lead 342 positive. The result thereof will be described hereafter; it locks the scanning chain advance, and simultaneously causes it to be de-energized.

The operation of chain B is quite similar to that of chain A, except that it is effected during times B under the control of the voltage of lead 265 (FIGURES 4*c* to 4*h*).

GENERAL PROGRAMS

The main programs are developed under conditions which will be specified later on, under the control of triggers B11 to B16 (FIGURE 4*m*). These programs define a group of functions or a series of function groups which must necessarily occur according to a predetermined order. Some of the above mentioned triggers may be simultaneously controlled. They are then operated successively, in the order according to which they have been mentioned. Triggers B2 and B3 are associated with the preceding ones; they assume operations which will be specified later.

As will be seen later, trigger B11 is systematically controlled on each card feed, independently from the head to which the card is fed. It is provided to control the whole of the operations relating to the comparison of the indices of the newly fed card and those of the previously fed cards.

Triggers B12, B13, B14, are selectively controlled on the card feeding whenever the feed is made to a specific head. They control the whole of the operations relating to the feeding of a new card (computation or related operations).

Trigger B15 is picked up on sequence breaks; it controls the whole of the operations which are to be effected at that moment. As will be seen, the circuits are arranged so as to control trigger B15 either when there is a sequence break in any one of the heads, or when the sequence break occurs simultaneously in two or more heads or in all of them. It is known that usually a number of sequence break types are contemplated and each of these types is materialized in a series of special circuits. In the here described embodiment, there has been provided but one type of sequence break, for simplification, and to avoid indefinitely reproducing identical circuits. Several types of sequence breaks are contemplated; a corresponding series of triggers are provided and arranged as are B12, B13, B14 with corresponding controls.

The chosen embodiment further comprises a trigger B16 systematically controlled on each card feed, as trigger B11. This trigger is used to control the memory-to-memory transfers which must necessarily occur before any new card feed.

As will be seen, the operation of the machine which is now to be described implies a series of operations bearing, for each card reader, all the information stored in two adjacent cards. These operations suppose that the information stored in the cards have been recorded previously, and the recording may be effected in two quite distinct ways.

A card newly fed in reader A may be recorded into memory M1 for example, and the card previously fed may be rerecorded into another memory, for instance memory M4. This mode requires that two cards should be recorded simultaneously. It is disadvantageous in that it requires relatively elaborated circuits and in that the operation is relatively slow. The recording of a card requires in particular, 12 consecutive memory scannings; it is necessary to perform 24 scannings as a whole if it is desired to record two cards directly and simultaneously.

Another process consists, before feeding a new card, in extracting all the information data contained in the previously fed card (which are still stored in the memory where they have been recorded, M1 for example), and in transferring them to another memory, for example M4. The latter operation is advantageous in that it requires but one memory scanning instead of 12, when a direct recording is desired.

To make it easier to understand what follows, it will be assumed that the cards are recorded in the following way:

(1) From reader A to memory M1, then to memory M4;

(2) From reader B to memory M2, then to memory M5;

(3) From reader C to memory M3, then to memory M6.

These assignments are shown in FIGURE 3. The cards going through reader A, for example, are recorded in memory M1 when they pass in front of brushes 58. Similarly, the cards going through reader B are recorded in memory M2 then in memory M5, the cards going through reader C are recorded in memory M3, then in memory M6. The direct recording into memories M4, M5, M6, may be replaced by a direct recording from the corresponding memory M1, M2, M3. This is indicated by arrows 60.

As concerns the way in which the programs controlled from triggers B11 to B16 are started, let it be remembered first that any card feed control results in starting some mechanisms and particularly in operating the various cam-controlled contacts. FIGURE 22 indicates how the closing times of these contacts are timed. These times are sampled according to a degree graduation. There has been arbitrarily chosen, for the beginning of the index graduation, the moment when the card reading starts. Moreover, it was assumed that, on each stoppage, the feeding unit mechanisms are locked in location 324 of the index. This results in the cam contacts, the closing times of which are adjacent to this index position, closing during the stop time of the feeding unit.

The cam contacts have been referenced (FIGURE 22) from C1 to C15. The same symbols may be found again in FIGURES 21*a* and 21*d*, as well as in FIGURE 4*m*; however, they will be followed with letters A, B or C, in order to differentiate the various reading heads. This corresponds to an embodiment of the invention comprising three identical card reading devices, generally referenced A, B and C.

Let it be supposed that one card only is fed, said feeding being performed in any one of heads A, B or C, for example to head A. All the cams of the corresponding series will be operated for a cycle, and will cause the following results (see FIGURE 4*m*).

Lead 142 is normally at a positive voltage. It is connected to positive terminal 144 through resistance 145. The operation of cam contact C2A results in connecting this lead to negative terminal 146, thus bringing that lead to a negative voltage and therefore locking coincidence circuits 175 and 147. Said locking lasts during all the time when contact C2A is closed, i.e. in fact during all the card reading time. The development of the programs controlled from triggers B11 and B16 is thus delayed up to the time when the cards have been completely and integrally read.

Whereas contact C2A is still closed, cam C14 closes its contact, thus applying a positive voltage to hub 148, lead 152 and lead 154. Similarly, the card feed in heads B and C operates cams C1B and C1C respectively, thus causing positive voltages to be applied to one of leads 152*a* or 152*b*, to one of hubs 148*a*, and to lead 154.

The positive voltage of lead 154 is applied on to the left side of trigger B11, and to mixing circuit 156, lead 157 and the right side of trigger B16. Is causes these two triggers to switch immediately in the already described way (refer to FIGURE 13*a* and to the corresponding part of the description).

Hubs 148, 148*a*, 148*b* must be selectively connected to hubs 158, 158*a*, 158*b*, in the order, according to which of the various card programs are developed in the case when it is contemplated to feed simultaneously 2 or 3 cards (or several cards if the card readers are more than 3). For example, for the development of the programs, it may be contemplated, to adopt the following order:

(1) Program corresponding to the card fed in reader C;

(2) Program coresponding to the card fed in reader B;

(3) Program corresponding to the card fed in reader A.

In such a case, the connections should be the following:

(1) Hub 148*b* to hub 158;

(2) Hub 148*a* to hub 158*a*;

(3) Hub 148 to hub 158*b*.

Let it be mentioned that it is possible, if required, to connect two of hubs 148, 148*a*, 148*b* to the same hub 158, 158*a*, 158*b*, or still to connect all three of them to the same hub.

Let it be supposed that the connections are:

(1) Hub 148 to hub 158;

(2) Hub 148*a* to hub 158*a*;

(3) Hub 148*b* to hub 158*b*.

The positive voltage of hub 148 is thus applied to the right side of trigger B12, thus causing the switching of that trigger.

Trigger B16 may be switched on the transfer of contact R35–*a*. Condenser 160 is normally connected to the positive terminal 144, through resistance 159 and contact R35–*a*. The latter being transferred, a positive pulse is applied to contact R31–*a*, then to lead 157 and to the right side of trigger B16 switching it thereby.

Contact R32–*d* (normally closed) opens, as will be seen, only in the exceptional case when cards advancing within the card readers are to be removed and when it is desired that this removal should eliminate all the controls effected from contacts C1A, C1B, C1C and hubs 148, 148*a*, 148*b*.

GENERAL CONTROL CIRCUITS

With some of triggers B11 to B16 switched, it is necessary to cause the pulse generator to start; to cause the starting of each program step (and, at the same time, the just completed program to be cut off); to position the scanning chains; and to excute actually said program, etc.

The first operation is effected through the application of a positive voltage to lead 117 (FIGURE 4*i*). The following operations are made under the control of triggers B6 to B10 (FIGURES 4*h* and 4*i*), the specific functions of which are respectively:

B6—starting of each program step and switching off of the previously operated step;

B7—positionment of the scanning chains controlling memory areas A and B in the locations of said areas corresponding to the less significant order;

B8—checking of the arithmetical operation;

B9—various checkings relating to the less significant digits;

B10—checking of the running out of the digits of memory area A.

As will be seen, triggers B6 to B9 are switched because of pulses controlled from lead 125 and which are coincident with the switching pulse provided by coincidence circuit 121, i.e. with the end of a time B. It will be the same for the restoration of trigger B10.

These triggers (B6 to B10) control one another and as a rule, constitute a ring; however, there exist cases when one or more of these triggers may be switched simutaneously. To understand the circuits, it is advantageous to know these cases from now and to know how the various operations are related to one another.

Trigger B6 is always switched at the beginning of an operation or at the beginning of a program and restored at the end of each program.

As concerns triggers B7 to B10, the sequence order of the switchings and the time during which these triggers remain switched are variable according to the amplitude of the scanning areas A and B. This order as well as the switching time in the cases for which the scanning of areas A and B correspond to 4 and 6 digits respectively is as follows:

B7
B8—B9
B8 only, during three consecutive periods
B8—B10 during two consecutive periods
B6

STARTING A PROGRAM STEP

Let it be assumed that trigger B12 is switched (FIGURE 4*m*) trigger B11 is Off, and triggers B13 to B16 being in any state (switched or not). Lead 109 is then positive, as is lead 117 from mixing circuit 112. The latter lead runs particularly to FIGURE 4*i*, where it operates the pulse generator (assembly composed of emitters 100*a*, 101*a*, 102*a*, 103*a*) in the already described way. It has been seen that there occurred successive switchings of trigger B1, which resulted in positive voltages being applied to leads 122 and 122*a* alternately. It has been seen also that leads 125 and 125*a* delivered parallelly and alternately a series of advance pulses. A branch line of lead 125 connects to coincidence circuit 161 (FIGURE 4*m*).

It has been seen further that the potential of lead 142 was initially negative. The potential returns to a positive value on the opening of cam contact C2A. Trigger B3 being restored as mentioned, lead 174 is also positive. Coincidence circuit 175 thus applies a positive voltage to lead 177 and to one of the inputs of coincidence circuit 147. Lead 117 being itself positive, coincidence circuit 147 is favored at its two inputs thus causing a positive voltage across lead 162, which connects to coincidence circuit 161. On the application of the advance pulse (from lead 125), trigger B2 is switched, thus bringing the voltage of lead 116 to a positive value.

It is obvious that there elapses more or less time between the starting of the pulse distributor (by the positive voltage of lead 109), and the switching of trigger B2. Lead 125 may thus distribute a great number of advance pulses which will be operative to switch trigger B2 only when the voltage of lead 142 is positive. Lead 116 connects coincidence circuits 163, 164, 165 and 166. The first one is used to restore trigger B2 and to cause trigger B3 to be switched. The second one, 164, has for its second input a branch line of lead 117 which is now positive. Therefore the voltage of lead 168 connected therewith is also positive. The result of it will be discussed later. The third one, 165, has for its second input lead 108 which is now negative; therefore it remains locked. The fourth one, 166, has for its second input lead 167 which is positive. The result is a positive voltage across output lead 169, which is applied respectively to coincidence circuits 171 and 172. The latter is locked, because of the present state of trigger B12, whereas the first one is already favored on its second input because lead 109 is positive. Therefore the hub 129 will also be positive.

Trigger B6 (FIGURE 4*i*) being originally restored, as has been explained, output lead 111 is at a positive voltage. This lead connects to coincidence circuit 143 which has for its second input a branch of lead 125. Lead 310 is now positive because of the present state of trigger B17 (FIGURE 4*b*). A switching pulse results therefrom and is applied to lead 173 (FIGURE 4*i*) and transmitted to the left side of trigger B6 and to the right side of trigger B7 (FIGURE 4*b*). The result is that both triggers are switched, which happens as soon as lead 125 delivers its first advance pulse, i.e. sensibly before trigger B2 is switched (FIGURE 4*m*).

The voltage of lead 11 (FIGURE 4*i*) thus goes negative. The voltage of lead 128 is positive, as well as that of lead 134, because of the existence of mixing circuit 133.

Later there occurs:

(1) The switching of triggers B8 and B9 (FIGURE 4*h* and 4*i*) and the restoration of trigger B7, as will be explained later;

(2) The restoration of B9;

(3) The switching of B2 (FIGURE 4*m*) as has been seen.

Lead 168 thus goes positive, causing, as will be explained later:

(1) The switching of trigger B10 (FIGURE 4*h*);

(2) The switching of trigger B6 (FIGURE 4*i*) and the restoration of all the triggers.

Trigger B6, therefore is switched, the voltage of lead 128 becomes negative, thus making the voltage of lead 134 dependent upon that of lead 125*a*.

It is to be pointed out that trigger B6 is switched when the voltage of lead 125 is positive again, i.e. at the end of time B. This trigger will remain switched until the end of the following time B. During that time interval, lead 125*a* will transmit an advance pulse.

Let it be supposed that there is a connection between hub 129 (FIGURE 4*m*) and hub 130 (FIGURE 4*h*) for controlling the program step from trigger P1. The first one is positive, as has been seen, as is the second one, because of the just mentioned connection. Coincidence circuit 131 is thus favored. Lead 134 has the same voltage as lead 125*a* (FIGURE 4*i*), thus an advance pulse is transmitted at the end of time A, which results in switching trigger P1 (FIGURE 4*h*). The voltage of lead 135 thus goes positive, making hubs 137 and 138 positive through diodes 141. Hubs 139 and 140 will also go positive alternately as leads 122 and 122*a* are themselves positive.

The advance pulse transmitted by lead 134 is also applied to coincidence circuit 163 (FIGURE 4*m*) which, as seen above, is already favored on its second input. This causes triggers B2 and B3 to be switched which controls lead 168, and hub 129 so that a new control signal cannot momentarily be applied to trigger P1 (FIGURE 4*h*). At the same time, the voltage of lead 174 (FIGURE 4*m*) has become also negative, thus making leads 177 and 162 negative, and inhibiting momentarily any new control signal to trigger B2.

This being performed, trigger B6 (FIGURE 4*i*) is restored to its original state at the end of time B through a switching pulse from lead 125 transmitted through coincidence circuit 143 and lead 173. The same pulse also causes trigger B7 to be switched (FIGURE 4*h*) and and the voltage of lead 111 (FIGURE 4*i*) to go negative. The voltage of lead 128 goes positive, as well as that of lead 134, which cannot any longer transmit the advance pulses from lead 125*a*. At the same time lead 178 (FIG- URE 4*h*) goes positive because of the switching of trigger B7, thus providing the results which will now be analyzed.

SWITCHING TIME OF TRIGGER B7, POSITIONING OF THE SCANNING CHAINS

Trigger B7 is switched under the action of a pulse from lead 125 (FIGURE 4*i*), i.e. at the end of time B. This trigger remains switched during the following A and B times to be restored at the end of the latter time.

Lead 178 (FIGURE 4*h*) is positive, thus favoring coincidence circuits 192 and 234. At the same time, lead 180 is negative (the reason of it will be seen later on). Inverter 183 delivers a positive voltage on lead 182 to coincidence circuit 192. Lead 176 which is the output therefrom is therefore at a positive voltage also.

It has been seen that trigger P1 had been switched, making hubs 137 to 140 positive under certain conditions. Hubs 137 and 138 will be used respectively to control the operation type and to control the following program step. It will be supposed that the operation which is to be effected is an addition. Hub 139 is used to control the memory area, when the latter is controlled to subtract, whereas hub 140 acts in a similar way for the memory controlled to extract and replace. Connections must be made as follows:

(1) Hub 139 to one of hubs 149, for example hub **149*b***;

(2) Hub **150*b* to one of hubs 132** (FIGURE 4*c*); for example hub 132–1, of the memory area controlled to extract, corresponding to memory 1;

(3) Hub **151*b*** (FIGURE 4*h*) to one of hubs 153 (FIGURE 4*d*), for example, to that of these hubs further referenced 71, if the less significant digit of the quantity to be read out is in location 71;

(4) Hub 140 (FIGURE 4*h*) to one of hubs 149, for example, hub **149*b*** (not shown);

(5) Hub **150*p*** to one of hubs (FIGURE 4*c*), for example, hub 132–2 if the memory area controlled to extract and replace corresponds to memory 2;

(6) Hub **151*p*** (FIGURE 4*h*) to one of hubs 153 (FIGURE 4*d*) for example, to that further referenced 71, if the less significant digit to be extracted is in location 71 (the same digit as above has been used in order to simplify the disclosure and to avoid integrally describing a multitude of similar circuits);

(7) Hub 137 (FIGURE 4*h*) to one of the hubs for defining the nature of the operation, in particular to the hub provided to define a control to add, if the operation is to be an addition (this hub has not been represented);

(8) Hub 138 to one of the hubs for controlling triggers P2 to P*n*, hub **130*a*** for example, if the following program step is to be that controlled from trigger P2.

It will be noted that the outputs from hubs 139 and 140 are dependent upon coincidence circuits 170 and 239, which have for their inputs respectively, lead 135 which is now positive, and a branch line of leads **122*a* and 122. Hub 139, therefore, is positive whenever lead 122*a* is positive, whereas hub 140 conforms to the potential of lead 122**. The results are the following:

(1) *Time A*.—Lead **122*a*** (FIGURES 4*i* and 4*h*) is positive, as are hub 139, hub **149*b* (because of one of the above mentioned connections), hubs 150*b* and 151*b* by way of coincidence circuit 179*b*, and because lead 176 is itself positive), hub 132–1** (FIGURE 4*c*) and the hub 153 (FIGURE 4*d*) bearing number 71.

The positive voltage of hub 132–1 favors in particular coincidence circuit 200 which has for its second input a branch line of lead **176*a*. The latter is now positive; it is connected from coincidence circuit 184** (FIGURE 4*d*) which has for one input a branch line of lead 176, which is positive and for a second input lead 185 which is also positive (it will be explained why later). This results in a positive voltage being applied to the right side of trigger 1M (FIGURE 4*c*) which is switched thereby, as has been explained (refer to the description of FIGURES 13 and 13*a*).

At the same time, the positive voltage of the jack 153 bearing number 71 causes a positive voltage to be applied to the leads of groups 201 and 202 which are further referenced 1 and 7 respectively. Lead 201–1 goes through FIGURES 4*e* and 4*f* and reaches in particular coincidence circuit 203 (FIGURE 4*g*). Lead 202–7 (FIGURE 4*d*) particularly connects to coincidence circuit 204 (FIGURE 4*e*). It has been seen that lead 176 (FIGURE 4*h*) was positive. This lead particularly connects to:

(1) Coincidence circuit 203 (FIGURE 4*g*) which will permit the control of trigger 1U;

(2) Coincidence circuit 204 (FIGURE 4*e*) which will permit trigger 7D to be controlled.

Lead **125*a*** (FIGURE 4*i*) particularly connects to mixing circuit 186 which has for its second input a branch line of lead 180 (see also FIGURE 4*h*). The latter being negative, as seen above, lead 181 which connects to mixing circuit 186 will conform to the voltage of lead **125*a***. As has been seen, the latter is provided to transmit switching pulses occurring at the end of time A.

It has been seen that coincidence circuit 203 (FIGURE 4*g*) was favored on both its inputs. The output lead is thus at a positive voltage, as is lead 211 which connects to coincidence circuit 212. The latter, since supplied on its second input with the voltage of lead 181, will transmit a first switching pulse which is applied to the left side of trigger 2U and to the right side of trigger 1U. It does not operate trigger 2U, since this trigger is already conducting through its right side. On the contrary, trigger 1U is switched, thus rendering lead 213 positive.

It may be seen that the voltage of lead **193*a*** (FIGURE 4*e*) is also positive, and consequently, a second switching pulse is emitted, transmitted by coincidence circuit 215 which results in switching trigger 7D. Lead 210 is then positive since lead 176 is positive.

As will be seen, triggers 1U and 7D control the memory location bearing number 71. Triggers IU and 7D have been switched at the end of a time A. The corresponding memory location will be scanned during the following time A under the control of trigger B8 (FIGURE 4*h*).

(2) *Time B*:—Lead 122 (FIGURE 4*i*) is positive as are hub 140 (FIGURE 4*h*), hub **149*p* (not shown) (because of one of the above mentioned connections), hub 150*p*, not shown, hub 151*p* also not shown (because of the presence of coincidence circuit 179*p*, not shown, and since lead 176 is positive) hub 132–2** (FIGURE 4*c*) and that of hubs 153 (FIGURE 4*d*) bearing number 71 (also because of above mentioned connections).

One lead of each group 201 and 202 is thus made positive, namely lead 7 of group 202 and lead 1 of group 201. These leads are the same as those which were supplied a voltage at time A; however, the results are not similar, because it is now a time B. Coincidence circuits 204 (FIGURE 4*e*) and 203 (FIGURE 4*g*) are favored and leads **193*a*** (FIGURE 4*e*) and 211 (FIGURE 4*g*) are supplied a voltage because lead 176 is still positive. The switching pulse is no longer provided by lead 181, but by lead 187, as will be seen. The voltage of lead **125*a* is unchanged during a time B so that only the circuits controlled from lead 125 may provide switching pulses. The latter lead connects particularly to mixing circuit 189 which receives on its second input the voltage of lead 180 (which is now negative). Lead 187 thus conforms to the voltage of lead 125. Lead 187 connects in particular to coincidence circuit 212*a*** (FIGURE 4*g*), which is already favored on its second input, since lead 211 is positive. The result is, at the end of the considered time, a pulse causing trigger 11U to be switched. Lead 187 also connects to coincidence circuit **215*a*** (FIGURE 4*e*), the second input of which is also favored, since leads **193*a*** and 210a are positive. The result is a second pulse causing trigger 17D to be switched. The scanning chain formed by triggers 11U to 20U (FIGURES 4*g* to 4*f*) and 10D to 17D (FIGURE 4*e*) is thus started so that a second memory location bearing number 71 may be scanned.

It has been seen that hub 132–2 (FIGURE 4*c*) has been applied a positive voltage. Coincidence circuit 196 is thus favored. Lead 176a being itself positive, the result is the application of a positive voltage to the right side of trigger 12M, which is thereby switched.

At the end of time B, trigger B7 is restored to its initial state (FIGURE 4*h*) and triggers B8 and B9 are supplied with a control signal (see also FIGURE 4*i*). This is obtained through coincidence circuit 234 which receives on its second input the voltage of lead 125. It then delivers a switching pulse at the end of time B which is transmitted to lead 198 and applied to the left side of trigger B7, and to the right side of triggers B8 and B9. Trigger B7 is then restored to its initial state, whereas triggers B8 and B9 are switched.

SWITCHING OF TRIGGERS B8 AND B9

Trigger B8 (FIGURE 4*h*) controls the arithmetical operations. It also controls various related operations as will be seen later. It remains switched up to the running out of the factors. Trigger B9 (FIGURE 4*i*) more particularly controls the operations relating to the digit of the units in the case when this digit should comprise an element characterizing the sign of the factors. Lead 269 is then positive (when trigger B9 is switched); however, the circuits connected therewith have not been represented.

Let us examine again the already given example $a+b=b'$, with $a=321$, and $b=8765$, where the result of the operation replacing $b$.

Hereinbefore, it was assumed that the unit digit of factors $a$ and $b$ was in location 71 of memories 1 and 2 respectively, but it will be assumed hereafter that these factors are respectively in locations 72 and 75 of memory 1 for factor $a$ and 72 to 77 of memory 2 for factor $b$, the scanning chains being originally positioned in locations 75 and 77 respectively. This implies that chain A has started from location 75 (triggers switched are 7D and 5U) and that chain B has been started from location 77 (triggers switched are 17D and 17U). However, as triggers 5U and 17U have not been represented, the circuits will be described for memory location 71 (triggers switched, 7D and 1U or 17D and 11U). The extraction of factor $a$ will be assumed to be controlled by chain A, whereas the extraction of factor $b$ and its replacement by the result of the addition will be controlled by chain B.

*Time A—Chain A Is in Location 75*

(In the description of the circuits, it will be assumed that chain A is in position 71.)

Lead 122a is in positive. Trigger B8 (FIGURE 4*h*) is switched, thus lead 272 is positive. Coincidence circuit 205 also is favored on its two inputs, thus causing lead 188 to go positive. The latter goes through FIGURES 4*g* to 4*c* and particularly connects to coincidence circuits 190 (FIGURE 4*g*), 206 (FIGURE 4*e*) and 194 (FIGURE 4*c*).

Trigger 1M being switched, coincidence circuit 194 is favored on both its inputs, so that leads 197, 195, 324 and 324a are positive (see also FIGURES 4*d* to 4*g*).

Trigger 7D (FIGURE 4*e*) is also switched, thus making leads 216, 193 positive (because coincidence circuit 206 is favored on both its inputs) and making 326 positive because coincidence circuit 325 is also favored on both its inputs. Coincidence circuits 327 (FIGURE 4*n*) and 327a are thus favored. The results will be analyzed later. If chain A is assumed to be in position 71, trigger 1U (FIGURE 4*g*) is switched, thus applying a positive voltage to leads 213, 191 (because coincidence circuit 190 is favored on both its inputs) and to that of group 331 which is further referenced 1, because coincidence circuit 330c is also favored on both its inputs. Coincidence circuits 333 (FIGURE 4*n*) and 333a are also favored. The results will be noted later.

A branch line of lead 272 (FIGURE 4*h*) connects to coincidence circuits 219, FIGURE 4*i*, and 220 which have as second inputs leads 101 and 103 respectively. As already seen, these leads will periodically go positive, as is shown in the diagram of FIGURE 16, as will leads 99 and 98 which are the output lines of coincidence circuits 219 and 220. Also lead 97, which is the output line of coincidence circuit 207 will go positive. The latter is supplied by leads 98 and 122a, which are now positive.

The results from the application of all these voltages will be analyzed later. Now it will be simply pointed out that the application of all these voltages causes the quantity stored in the memory location which it is desired to address to be read out and re-recorded. This quantity is sensed, or inserted into an adding organ during these operations.

Let it be supposed now that chain A is in location 75; circuits similar to those already described and only partially represented cause the location storing the unit digit, 1 (after the quoted example) to be scanned. Let it be noted that some of triggers R (FIGURE 4*p*) are switched, and restored practically immediately, whereas other triggers W (FIGURE 4*q*) are also switched, but are restored only at the end of time B. This will be explained in detail later.

Lead 180 (FIGURE 4*h*) being negative, lead 181 (FIGURE 4*i*) conforms to the voltage of lead 125a. The result is, at the end of time A, an advance pulse which brings chain A to position 74. This advance is made in a way similar to that already described.

As has been already explained, at the end of time A, trigger B1 is switched (FIGURE 4*i*) and lead 122a returns to the negative potential. At the same time, lead 122 is brought to a positive voltage.

*Time B—Chain B in Position 77*

Lead 122 is positive. Coincidence circuit 208 (FIGURE 4*h*) is favored on both its inputs, thus applying a positive voltage to lead 265. This lead particularly connects to coincidence circuits 214 (FIGURE 4*c*), 206a (FIGURE 4*e*) and 190a (FIGURE 4*g*) if chain B is assumed to be in position 71.

Trigger 12M (FIGURE 4*c*) being switched, lead 218 is at a positive voltage as are leads 195a, 336, and 324a (see also FIGURES 4*d*, 4*e* and 4*g*). Trigger 17D being also switched, lead 193 is positive as is one of the leads of group 337, because coincidence circuit 325b is favored simultaneously on both its inputs. Leads 337 are connected to leads 338 (FIGURE 4*n*) by means of circuits similar to choose connecting leads 326 and 329. Trigger 11U (FIGURE 4*g*) being also switched (if it is supposed that chain B is in position 71), lead 191 is also positive and causes the lead 331 further referenced 1 to be positive.

If it is supposed now that chain B is in position 77, the application of a voltage to lead 265 (FIGURE 4*h*) causes voltages to be applied to some of the leads of groups 337 and 331 (FIGURE 4*e*), which causes location 77 of memory M2 to be scanned, i.e. the location storing factor $b$ unit digit, 5. This scanning is performed due to the voltages applied to leads 98 and 99 (FIGURE 4*i*) as will be seen later. At the same time, the addition with the digit read out during the preceding time is performed, as well as the re-recording of the result of that addition.

Since lead 180 (FIGURE 4*h*) is at a negative voltage, lead 187 (FIGURE 4*i*) conforms to the voltage of lead 125. The result is, at the end of time B, an advance pulse acting in the already described way and resulting in bringing chain A to position 76.

The voltage of lead 125 is also applied to coincidence circuit 270, which delivers a switching pulse which restores trigger B9 to its original state.

*Time A—Chain A in Location 74*

Lead 188 (FIGURE 4*h*) is supplied a positive voltage which causes the second digit of factor *a*, namely, 2, to be scanned. At the end of that time, chain A is advanced to position 73.

*Time B—Chain B in Position 76*

Lead 265 is supplied a positive voltage which causes the second digit of factor *b*, namely 6, to be read out. At the same time that digit is added to the preceding digit, possibly taking into account the carry from the immediately lower order, and the result of the addition, namely 8, is re-recorded instead of digit 6. At the end of that time, chain B is advanced to position 75.

*Time A—Chain A in Position 73*

*Time B—Chain B in Position 75*

Successively:
The third digit of factor *a* is scanned, namely 3; chain A is advanced to location 72;
The third digit of factor *b*, namely 7, is scanned;
These two digits are added, which gives 10;
Zero is recorded instead of 7;
Chain B is advanced to position 74.

*Time A—Chain A in Position 72*

The fourth and last digit of factor *a*, i.e. 0, is scanned. Further, it is necessary to interrupt the advance of chain A and to de-energize it simultaneously; this result is obtained in the following way:

Hub 139 (FIGURE 4*h*) is assumed to be connected to hub 149*b*, a connection must be made between hub 151*a* and that of hubs 153 (FIGURE 4*d*) bearing number 71. Leads 122*a* (FIGURE 4*h*) and 272 are at a positive voltage, as are hub 139, hub 149*b*, hub 151*a* (because coincidence circuit 279 is simultaneously favored on both its inputs) and that of hubs 153 (FIGURE 4*d*) which is also referenced 71. Leads 201–1 and 202–7 are thus made positive. It may be noted that this is the case at each time A, as soon as trigged B8 is switched; however, these voltages are operative only when chain A is in position 72. Triggers 7D (FIGURE 4*e*) and 2U (FIGURE 4*g*) are then switched.

Trigger 7D is switched and lead 216 is positive. Lead 188 (time A) and consequently lead 193 are also positive. The latter connects in particular to coincidence circuit 221 which has for its second input a branch line of lead 202–7. The lead which constitutes its output is therefore supplied a positive voltage as well as lead 222, diode 223 permitting the equalization of the voltages.

Trigger 2U (FIGURE 4*g*) is also switched and leads 339 and 211 are positive. The latter feeds coincidence circuit 224 which has for its second input a branch line of lead 201–1. The lead therefrom is thus positive as is lead 225, diode 223*a* permitting the voltages to be equalized.

Leads 222 and 225 feed to coincidence circuit 226. The latter being favored on both its inputs, lead 227 is at a positive voltage, and so is lead 180 (FIGURE 4*h*) from mixing circuit 228. The positive voltage of lead 180 is applied to mixing circuit 186 (FIGURE 4*i*) and through lead 181. Thus the latter is kept at a positive voltage, so that the advance pulses from lead 125*a* cannot be transmitted and preventing therefore any new advance of chain A.

The positive voltage of lead 180 is also applied to inverter 183 (FIGURE 4*h*) which makes lead 182 negative. The latter connects to mixing circuit 229 (FIGURE 4*i*) which has for its second input a branch line of lead 125*a*, and to mixing circuit 231, which is also fed by lead 125. The latter is always positive during a time A as is lead 232, which is the output line of mixing circuit 231. On the contrary, lead 230 from mixing circuit 229 conforms to the voltage of lead 125*a*, which allows various switching pulses to be transmitted at the end of time A.

A branch line of lead 230 connects to trigger B10 (FIGURE 4*h*) which therefore will be switched. A second branch line connects to coincidence circuit 233, which receives on its second input positive lead 232. Lead 235 from coincidence circuit 233 is therefore positive or negative according to the voltage of lead 230, thus permitting the same switching pulses to be transmitted.

A first branch line of lead 235 connects to coincidence circuit 236 (FIGURE 4*g*) which has, for its second input a branch line of postive lead 339 (because trigger 2U is now switched). Consequently a switching pulse is applied to trigger 2U in order to restore it to its original state.

A second branch line of lead 235 reaches coincidence circuit 237 (FIGURE 4*e*) which has for its second input a branch line of positive lead 216. The result is the application of a second switching pulse which restores trigger 7D to its original state. Chain A is thus completely de-energized. It may be noted that trigger 1M (FIGURE 4*c*) remains switched, however the circuits are arranged in such a way that the switching of trigger 1M is inoperative when chain A is de-energized.

It may be noted that the connection which has been assumed to exist between hub 151*a* (FIGURE 4*h*) and that of hubs 153 (FIGURE 4*d*) which bears number 71 is inoperative if chain A is initially started in position 71 or in a lower position, for example, in position 30. In such a case, the de-energization of chain A occurs in one of the following ways:

(1) On the de-energization of chain B; this will be seen later.

(2) When chain A has come to position 1.

In the latter case, triggers 0D (FIGURE 4*e*) and 1U (FIGURE 4*g*) are switched, thus applying a positive voltage to leads 193*a* (FIGURE 4*e*) and 191 (FIGURE 4*g*). These two leads feed coincidence circuit 341. Lead 342 therefrom is therefore positive and so is lead 180 (FIGURE 4*h*). The results are those already described (de-energization of chain A).

*Time B—Chain B in Position 74*

Chain A is de-energized, as has just been seen. The operations relating to the last digit of factor *a* (0 in the case of the example) are not completed so far, because this digit must be added to the digit of the same order in factor *b*. All these operations are performed during the presently described time. In particular:

The fourth digit of factor *b*, that is 8, is scanned.
This digit is added to the digit of the same significance of factor *a*, account being taken of a possible carry from the next lower order, i.e., 9.
Nine is re-recorded instead of 8.
Chain B is advanced to position 73.

*Time A*

Chain A is de-energized. Trigger B10 (FIGURE 4*h*) is switched. This trigger is used to complete fictitiously factor *a* by a series of zeros. The corresponding circuits have not been represented.

*Time B—Chain B in Position 73*

The fifth digit of factor *b* is scanned and added fictitiously to 0, so as to permit a possible carry to be added. At the end of that time, chain B is advanced to position 72.

*Time A—Chain A is De-energized*

The sixth and last digit of factor *b* is scanned and added fictitiously to 0, so that the carries may be added. Parallelly the scanning of factor *b* being completed, it is necessary to de-energize chain B and to cause the operations to go on. It was assumed above that hub 140 (FIGURE 4*h*) was connected to a hub 149*p*, unshown. Hub 151*p*–1 is still connected to the hub 153 which bears number 71 (FIGURE 4*c*), if it is desired that the scanning operations controlled from chain B should be interrupted as soon as this chain comes to position 72. In a way quite similar to that previously described, voltages are applied to leads 222 (FIGURE 4*e*), 225 and 227 (FIGURE 4*g*); however this positive voltage is applied during time B, since hub 140 is now acting as the emitter (FIGURE 4*h*). As previously, this results in a positive voltage being applied to lead 180 (FIGURE 4*h*) at the same time, lead 182 goes negative.

The positive voltage of lead 180 is applied to mixing circuit 189 (FIGURE 4*i*) and therethrough to lead 187, thus preventing a new pulse for advancing chain B from being transmitted. The negative voltage of lead 182 is applied to mixing circuits 229 and 231. The first of which is also supplied through a branch line of lead 125*a*, which is now positive. It gates through a positive voltage from lead 230. Circuit 231 receives a branch line of lead 125. Lead 232 therefrom conforms to the voltage of lead 125, thus insuring the transmission of various switching pulses. This particularly results in the restoration of triggers 17D (FIGURE 4*e*) and 12U (FIGURE 4*g*) which takes place in a way similar to that already described.

Lead 230 (FIGURE 4*h*) is positive, thus the voltage variations of lead 232 are applied as a whole to lead 235, thus restoring chain A, if not already restored. Lead 232 also connects to coincidence circuits 305 and 274. Circuit 305, already favored on its second input, transmits a switching pulse to restore trigger B10 to its initial state. Circuit 274, also favored on its second input because lead 272 is positive, transmits a switching pulse on lead 238 and restores trigger B8 to its original state. At the same time, the state of trigger B6 (FIGURE 4*i*) is switched, which causes a positive voltage to be applied to lead 111 and a negative voltage to be applied to lead 128.

SWITCHING TIME OF TRIGGER B6

The switching of trigger B6 indicates the end of a program stage. This trigger is switched at the end of a time B and remains switched during the following times A and B.

Lead 122*a* being initially positive, coincidence circuit 240 is favored on both its inputs, and delivers a positive voltage on lead 241. This voltage is particularly applied to the left side of triggers 1M (FIGURE 4*c*) 2M, 3M, 11M, 12M, 13M . . . and restores these triggers. Said restoration is performed in the already described way.

On the other hand, an advance pulse is transmitted through lead 134 at the end of time A, as was already explained. This pulse is particularly applied to coincidence circuit 242 (FIGURE 4*h*) thus restoring trigger P1. That same pulse may be applied also to coincidence circuit 131*a*, if it is desired that the program step controlled by trigger P2 should follow that controlled by trigger P1. In such a case, it is necessary to interconnect hubs 138 and 130*a*.

PROGRAM END

In the case when the program step which has just been developed is the last one of the series; hub 138 (FIGURE 4*h*) and the corresponding hub of the last program stage which has just been developed, must be connected to hub 243 (FIGURE 4*m*).

It has been seen that hub 138 (FIGURE 4*h*) or its correspondent, was positive, as soon as a trigger such as P1 was switched. This hub remains On during the development of the corresponding program step, and particularly during that part of the switching time of trigger B6, up to the end of time A. If it is assumed that this hub is connected to hub 243 (FIGURE 4*m*), the latter therefore is positive as are leads 244 and 245. The latter connect to coincidence circuits 246 and 247 thus favoring them. The advance pulse is transmitted thereto by lead 134 (see also FIGURE 4*i*) and triggers B12 and B3 are restored to their original state. The voltage of lead 174 returns to a positive value, which makes it possible to apply another control signal to trigger B2 if lead 117 is positive, i.e. if any one of triggers B13 to B16 is switched.

If it is assumed, for example, that trigger B13 is switched, a positive voltage will appear on hub 129*a*, thus permitting the control of a new series of program steps. The corresponding circuits will not be described; they are identical or similar to those already described when it was assumed that trigger B12 was switched. It will be observed that when lead 169 is brought to a positive voltage, so will be lead 169*a* and hub 129*a* since lead 109*a* is positive at that moment.

The end of that new series of program steps will be characterized by a positive voltage at hub 243*a* and a pulse which will restore trigger B13 to its original state.

There may possibly be performed:

(1) A third series of program steps controlled from hub 129*b*;

(2) A fourth series of program steps controlled from hub 250;

(3) A fifth series of program steps controlled from hub 250*a*, not shown, etc.;

(4) A last series of program steps controlled from hub 251.

These series of program steps are developed only if the triggers controlling them have been controlled themselves.

ARITHMETICAL OPERATIONS

The arithmetical operations relating to the addition of two digits will now be described with more details. The operations relating to the addition of two numbers comprising any number of digits are but a repetition of the elementary operations which will be presently described.

It will be assumed that the operation performed is of the type $a+b=b'$, $a$ and $b$ having as respective values 7 and 5, for example. Also, it will be assumed that $a$ is stored in location 71 of memory 1, so that triggers 1M (FIGURE 4*c*), 7D (FIGURE 4*e*) and 1U (FIGURE 4*g*) must be considered as switched. Similarly, $b$ will be assumed stored in location 71 of memory 2 so that triggers 12M, (FIGURE 4*c*), 17D (FIGURE 4*e*) and 11U (FIGURE 4*g*) are also to be assumed as switched.

The arithmetical operations are generally controlled by trigger B8 (FIGURE 4*h*). It should be assumed that trigger B9 (FIGURE 4*i*) also is switched. Of course, there are cases when other triggers might be switched, such as B10 (FIGURE 4*h*) or some others, also not shown.

*Time A*.—Lead 122*a* is positive, as is lead 272, a branch line of which feeds to coincidence circuits 219 and 220 (FIGURE 4*i*). Coincidence circuit 205 (FIGURE 4*h*), favored on both its inputs, gates a positive voltage through, which is applied to lead 188 (FIGURES 4*c* to 4*h*).

Triggers 1M, 7D and 1U being switched (see FIGURES 4*c*, 4*e* and 4*g*), leads 217, 216, and 213 are positive and so are, as has been seen, leads 195, 324, 324*a*, 193, 326, 191, and 331–1. Leads 326 and 331–1 connect to coincidence circuits 327, 327*a* and 333, and 333*a* respectively (FIGURE 4*n*).

The operations will develop in three times according whether they coincide with a positive voltage of leads 100 (FIGURE 4*i*), 101 or 103.

(A) RESULTS FROM THE OCCURRENCE OF PULSE 100

Lead 100 is positive. Lead 122*a* also being positive, coincidence circuit 252 is favored on both its inputs and delivers a positive voltage on lead 96.

The positive voltage of lead 100 is applied to the left side of triggers 1R, 2R, 4R, 8R, AR, BR, and CR (FIGURE 4*p*) so that all the triggers which might happen to be switched are restored. This restoration is made in the already described way.

The positive voltage of lead 96 is similarly applied to the left side of triggers 1W, 2W, 4W, 8W, AW, BW, (FIGURE 4*q*) so that all among these triggers which might be switched are restored.

(B) RESULTS FROM THE OCCURRENCE OF PULSE 101

The voltage of lead 111 is applied through coincidence circuit 219, already favored on its second input because lead 272 is positive, and thence through lead 99 (see also FIGURES 4*n* and 4*p*), coincidence circuits 327 and 333, already favored also on their second inputs, to units 328 and 334. These units are emitters capable of delivering current of a particular amplitude and especially insufficient to change the magnetic state of a magnetic core if that current operates by itself. The current supplied by unit 328 scans all memory locations corresponding to ordinate $y=8$. Similarly, the current provided by unit 334 scans all memory locations corresponding to abscissa $x=1$. As mentioned above, these currents are not sufficient to change the magnetic state of the cores, however, they will be cumulative in the memory location having the following coordinates $x=1$, $y=8$.

In the latter case, it is known that the currents are arranged so that all the cores are in the same magnetic state, and in particular to switch all the cores which are in a different magnetic state. The first one will conventionally be called Off state and the second one On state. The core rows conventionally represent (according to the given example with that code type) digits 1, 2, 4, 8, and the auxiliary arguments A, B and C. Consequently, if digit 7 is recorded in the location scanned in the memory, cores 1, 2 and 4 are in the On state, whereas core 8 is in the Off state. The cores corresponding to the auxiliary argument will be left until later.

When the cores are switched Off, there appears an induced current in leads 347 and which finally operates amplifiers 348 (FIGURE 4*p*). The latter have been described in detail in FIGURE 12*a*. They are operated only if lead 99 is positive which is precisely the case. They have been assigned subscript 1, 2, 4, 8, A, B and C which relates to code elements which they represent. Some leads 349 are thus brought to a positive voltage (leads L, 2, 4, in the described example) which is applied to triggers 1R, 2R, 4R, 8R, AR, BR and CR (the prefix corresponding to the code elements) triggers 1R, 2R and 4R are thus switched. Corresponding leads 350 thus are positive and favor some of coincidence circuits 351 (FIGURE 4*q*). Parallelly some of leads 352 (FIGURE 4*p*) are negative.

Let it be mentioned that there has been selected a code type so that perforation 0 is recorded by means of combination 2—8, so as to associate thereto a positive recording, and so that the presence of a zero and the absence of a perforation may be differentiated later. When a zero is recorded, the cores which are On are cores 2 and 2 which will afterwards cause triggers 2R and 8R (FIGURE 4*p*) to be switched (FIGURE 4*p*). This switching is quite similar to that just described. In such a case it is necessary that leads 350–2 and 350–8 should not be brought to a positive voltage, and this is obtained through coincidence circuits 343 and 343*a*. These are locked when triggers 2R and 8R are switched simultaneously.

(C) RESULTS FROM THE OCCURRENCE OF PULSE 103 (FIGURE 4I)

Lead 98 is positive. So is lead 97 because coincidence circuit 207 is already favored on its second input. This voltage is applied to the second input of coincidence circuit 351 (FIGURE 4*q*) and thence to some of triggers 1W, 2W, 4W and 8W which are switched thereby. The switched triggers are 1W, 2W and 4W in the described example (extraction of a 7).

The voltage of lead 98 is applied to coincidence circuits 355 (FIGURE 4*p*). Some of leads 352 being also positive (the leads further referenced 8, A, B and C in the described example) a positive voltage is applied to some of the emitters further referenced 8, A, B and C. These emitters are identical to emitters 328 and 334 (FIGURE 4*n*).

The voltage of lead 98 is also applied to coincidence circuits 327*a* and 333*a*, already favored on their second input. It results in the actuation of current emitters 328*a* and 334*a*. These emitters are identical to emitters 328 and 334; however, they are wired so that the current flows now in the direction opposite to the previous current flow. Emitters 328*a* and 334*a* deliver a current which, if single, is not sufficient to modify the magnetic state of a core. Let it be supposed that emitters 328 and 334 deliver each a current $-\frac{1}{2}$, and that emitters 328*a* and 334*a* deliver each a current $+\frac{1}{2}$. These two currents will respectively scan all the memory locations corresponding to ordinate $y=8$ and to abscissa $x=1$. Their magnetic effects will be cumulative at the memory location having for its coordinates $x=1$, $y=8$ which tends to turn On all the cores in that location.

It has been seen that a positive voltage was applied also to those of emitters 356 (FIGURE 4*p*) further referenced 8, A, B, C. These emitters deliver a current $+\frac{1}{2}$ in all the magnetic cores of all the memories corresponding to a same code argument 8 in the memory location having for its coordinates $x=1$, $y=8$ and is finally energized by currents $+\frac{1}{2}$, $+\frac{1}{2}$ and $-\frac{1}{2}$, i.e. by a resulting current $+\frac{1}{2}$ which is not sufficient to switch the core's magnetic state. Similarly, as concerns the cores corresponding to arguments A, B and C. Therefore, only the cores 1, 2 and 4 will be switched to the On state, thus restoring the considered location to its initial state (recording of a 7).

The parity element (or non-parity element), as well as the way it is controlled and recorded will not be discussed further.

*Time B.*—Lead 122 is now positive. It was assumed that the digit to be extracted was a 5, stored in location 71 of memory 2 and that triggers 12M (FIGURE 4*c*), 17D (FIGURE 4*e*) and 11U (FIGURE 4*g*) were switched. The operation is developed again in three times, the first one corresponding to lead 100 being positive (FIGURE 4*i*), the second one to lead 101 being positive, and the third one to lead 103 being positive.

(A) RESULTS FROM THE OCCURRENCE OF A PULSE 100

Lead 100 is positive. Lead 96 is negative because lead 122*a* is itself negative and locks coincidence circuit 252. The voltage of lead 100 is applied to triggers 1R, 2R, 4R, 8R, AR, BR, CR (FIGURE 4*p*) thus restoring all the triggers that happen to be switched. Triggers 1W, 2W, 4W, 8W, AW, BW (FIGURE 4*q*) retain their state.

(B) RESULTS FROM THE OCCURRENCE OF PULSE 101

A five is read out in a way quite similar to that which has already been described, thus switching triggers 1R and 4R (FIGURE 4*p*) and possibly AR in the case when the corresponding quantity should correspond to a sign. Leads 350–1 and 350–4 therefore are positive.

Leads 350–1, 2, 4, 8, from triggers 1R to 8R and leads 358–1, 2, 4, 8 (FIGURE 4*q*) from triggers 1W to 8W are connected to the input of an adder (not shown) of a known type, which adds the inserted digits, and according to the result of that addition, brings some of leads 361 (FIGURE 4*p*) to a negative voltage. In the described example, sum 7+5 is equal to 12, so that only the lead 361 further referenced 2 will become negative. Parallelly, the carry is preserved, to be added during the addition of the following digits.

(C) RESULTS FROM THE OCCURRENCE OF A PULSE 103

The circuits have been represented but partially, their details form no part of the present invention. The addition result (i.e. 2 in the described example) is re-recorded by means of a positive voltage applied to lead 363 (FIGURE 4*p*). The latter connects to coincidence circuits 362 which have for their other inputs leads 361. A positive voltage is therefore applied to emitters 356, with the exception however of that referenced 2 (because the corresponding one of leads 361 is negative). Therefore all these emitters will deliver a current —½ which will be deducted from the current emitted by emitters 328*a* and 334*a* (FIGURE 4*n*) or by homologous emitters. Under these conditions, only the core coresponding to arguments code 2 will be switched On, whereas the cores which are previously in that state were those corresponding to code arguments 1 and 4 (recorded digit 5).

It may be remarked that the circuits of FIGURE 4*i* have been arranged so as to make lead 98 position. That lead connects to coincidence circuits 355 (FIGURE 4*p*) which have for their second inputs leads 352 from triggers 1R, 2R, 4R, 8R, AR, BR and CR. In such a case, the quantity which had been read out when pulse 101 occurred is re-recorded. As will be seen, this operating mode corresponds to the operations which are to be effected when it is desired to compare two factors, for example the comparison of the indices contained in two different circuits 355 must become negative, when an addition is performed; however, the corresponding circuits have not been represented, in order not to overload the figures. The circuits controlled from that lead have not been represented. All the explanations given above concerning the way an addition is performed have been provided only to show the general working of the circuits. The latter is preserved during the related operations necessary to the operation of the device which is more particularly the object of the invention, so as to use the same circuit elements for several purposes and also to use, as far as is possible, the circuit elements which else would be useless.

MEMORY SPLITTING

It has already been seen how the memories were disposed, how the scanning chains, the program steps were arranged and controlled. A few more details will be given as to the way generally, the memories are split and how any split area may be addressed. It will be described for a memory of any type, for example, for memory M1, and assuming that this memory records its factors directly from a punched card by means of any one of the known reading processes.

It will be supposed that the card reader is fed with cards of various types suitably classified, and comprising for example name cards, address cards and operation cards, etc. For example, it will be supposed that these cards are punched in the following way and recorded into memory M1, position by position:

(1) Name card:
  Columns 5 to 12—account number
  Columns 13 to 40—trade name
(2) Operation card:
  Columns 1 to 4—operation date
  Columns 5 to 12—account number
  Columns 13 to 23—operation wording
  Columns 24 to 27—date of the operation
  Columns 28 to 30—code corresponding to the preceding date
  Columns 31 to 40—amount of the operation It will be seen that in each case it is necessary to address well determined areas of a one memory, and that the access must be related to the nature of the quantities recorded in that memory.

FIGURE 6 represents an example of the access connections. It will be recalled that these connections are generally made by connecting some of hubs 139 and 140 (figure 4*h*) to some of hubs 149 and in similarly connecting some of hubs 150 and 151 respectively to some of hubs 132 (FIGURE 4*c*) or 153 (FIGURE 4*d*). In FIGURE 6, on the left, some of the just mentioned references have been noted. Hubs 149 have been numbered 1, 2, 3, 4. Hubs 150 and 151 associated with the first ones have been represented as above. The shown hubs 153 correspond to no logical order, but essentially refer to the nature of the connections. The reference numbers have been quoted in each case. Reference 40 for example, appears three times, which means that the corresponding hub 153 in fact receives three connections; hubs 139 and 140 (FIGURE 4*h*) or homologous hubs corresponding to any one of the program steps must be connected in the following way (FIGURE 6):

(1) To hub 149–10 to address the area storing the amount of the operation (locations 31 to 40);

(2) Hub 149–9 to address the date code (positions 28 to 30);

(3) Hub 149–8 to address the area storing the month of the operation date (positions 26 and 27);

(4) To hub 149–7 to address the area storing the day of the month of same date (positions 24 and 25);

(5) To hub 149–6 to address the operation code (positions 13 to 23);

(6) To hub 149–5 to address the account number (position 5 to 12);

(7) To hub 149–3 to address the name or trade name (locations 13 to 40).

No connection has been provided to the input of hub 149–2; the output connection to hub 153–12 is a scanning end connection. The latter connection may be eliminated in case of a transfer to an area of another memory but having the same ampltiude. It has been seen, according to the adopted notation conventions, that the de-energization of scanning chain B is automatically followed by that of scanning chain A, whether there is or not a connection limiting the scanning field.

The same connection to hub 149–3 would have been replaced by a connection to hub 149–6 associated with a selector for moving the connection with hubs 153 further referenced 23 to 40. In such a case, the scanning starts in location 40. The scanning is stopped by the first connection immediately to the left, i.e. by the connection with hub 153–12.

Finally, a connection to hub 141–1 allows the first forty memory locations to be transferred together whatever may be their content. It is well understood that the various controls should be associated with the type of card, which may be done in a known way, by means of selectors.

As concerns hubs 150, they are all interrelated and connected to hub 132–1 (FIGURE 4*c*).

After the above, the connections to be made to address any area of any memory and to increase or decrease at will this area will be determined.

COMPARISON OF TWO NUMERICAL FACTORS

The numerical factors are compared in a way which will be now described. The general process of the arithmetical operations has been explained. During a first time (time A) a positive pulse applied to lead 99 (FIGURES 4*i*, 4*n* and 4*p*) causes a given location of one of the memories to be scanned, according to the quantity recorded in that location, some of the triggers followed with suffixes R and W (FIGURES 4*p* and 4*q*) are switched, the first ones being restored at the end of the same time, whereas the second ones (triggers with suffix W) remain switched during the whole following time.

During a second time (time B), a positive pulse applied to lead 99 causes another memory location to be scanned, and causes some of the triggers with suffix R (FIGURE 4*p*) to be switched.

Two quantities are compared at the end of that time, whereas triggers 1W, 2W, 4W, 8W . . . (FIGURE 4*q*) still store the quantity read out during time A, triggers 1R, 2R, 4R, 8R . . . (FIGURE 4*p*) preserving, on the other hand, the quantity read out during time B. Some of the leads generally referenced 350, 352, 359, (FIGURE 4*q*) and 360 are positive, thus automatically starting circuits of the comparison device. As will be seen, a positive voltage will be collected on lead 364 if the quantity read out during time B is greater than that read out during time A. Similarly, a positive voltage will appear on lead 365 if the quantity read out during time B was less than that read out during time A. Also, a positive voltage may appear if the two quantities are equal, however, this possibility has not been contemplated because the general arrangement of the circuits makes it useless.

Before analyzing the mechanism, let it be recalled how digits 0 to 9 are recorded in triggers 1R, 2R, 4R, 8R (FIGURE 4*p*) and 1W, 2W, 4W, 8W (FIGURE 4*q*):

| Digit Recorded | Switched Triggers | |
|---|---|---|
| | R Series | W Series |
| 0 | 8R—2R | None |
| 1 | 1R | 1W |
| 2 | 2R | 2W |
| 3 | 2R—1R | 2W—1W |
| 4 | 4R | 4W |
| 5 | 4R—1R | 4W—1W |
| 6 | 4R—2R | 4W—2W |
| 7 | 4R—2R—1R | 4W—2W—1W |
| 8 | 8R | 8W |
| 9 | 8R—1R | 8W—1W |

Apart from digit 0, it is seen that the result of the comparison is obtained by comparing first the state of the triggers with prefix 8, then by comparing the state of the triggers with prefix 4, etc.

Thus for digits 6 and 4, respectively recorded in the triggers of the R and W series, the comparison provides:

Triggers 8R and 8W reset in both cases;
Triggers 4R and 4W switched in both cases;
Only trigger 2R is switched, thus indicating that the quantity recorded in the triggers of series R is greater.

Let it be mentioned, for the numerical comparison, that no positive voltage must be applied to hub 366 (FIGURE 4*q*). The voltage at that hub is negative and so is the voltage of lead 367 connected to that hub. Inverter 368 returns a positive voltage which is applied through lead 369, mixing circuit 71, lead 72, to coincidence circuits 73, 73*a*, 73*b* and 73*c*. Four cases are to be contemplated (refer also to FIGURE 4*p*):

(1) Trigger 8R is switched, whereas trigger 8W is Off (it will be supposed that trigger 2R is also Off) leads 350–8 and 360–8 are positive. Coincidence circuit 73 is favored simultaneously on its three inputs, thus applying a positive voltage to leads 74 and 364, which indicates that the quantity recorded in the triggers of the R series is the greater. After the above table, this quantity is 8 or 9, whereas the quantity recorded in the triggers of the W series reached 7 at the utmost.

(2) Trigger 8W is switched, whereas trigger 8R is off. Leads 352–8 and 359–8 are positive. Coincidence circuit 73*b* is favored simultaneously on its three inputs, thus applying a positive voltage to leads 74*a* and 365, and indicating thereby that the quantity recorded in the triggers of the W series is the greater.

(3) Triggers 8R and 9W are both switched; leads 350–8 and 359–8 are positive. Coincidence circuits 73*c* is favored simultaneously on its three inputs, thus applying a positive voltage to lead 75.

(4) Triggers 8R and 8W are both off. Leads 352–8 and 360–8 are positive. Coincidence circuit 73*a* is favored simultaneously on its three inputs, thus applying a positive voltage to lead 75. This positive voltage of lead 75 indicates that triggers 8R, 8W are equal and that the result of the comparison will be obtained but by extending the comparison to triggers 4R—4W first, then triggers 2R—2W and triggers 1R—1W.

The positive voltage of lead 75 is applied to coincidence circuits 76, 76*a*, 76*b* and 76*c*. It may be shown that the results are the following:

(1) A positive voltage across leads 77 and 364 if trigger 4R only is switched;

(2) A positive voltage across leads 77*a* and 365 if trigger 4W only is switched;

(3) A positive voltage across lead 78 if they are equal, i.e. if both of them are off or if both of them are switched.

In the latter case, the comparison must be extended to trigger stage 2R—2W, which is obtained due to the positive voltage of lead 78, which favors coincidence circuits 79, 79*a*, 79*b*, 79*c*. Similarly it will be easily shown that the results are:

(1) A positive voltage across leads 80 and 364, if trigger 2R only is switched;

(2) A positive voltage across leads 80*a* and 365, if trigger 2W only is switched;

(3) A positive voltage across lead 81 if equal, i.e. if triggers 2R—2W are both off, or both switched.

In the latter case, the comparison must be once more extended to trigger stage 1R, 1W, which is done because of the positive voltage of lead 81, which causes coincidence circuits 82 and 82*a* to be favored. The result is:

(1) A positive voltage across leads 83 and 364, if trigger 1R only is switched;

(2) A positive voltage across leads 83*a* and 365, if trigger 1W only is switched.

No positive voltage appears in case of an equality, i.e. if both triggers 1R—1W are switched off. However, corresponding circuits may easily be added, if needed.

Finally, it is seen that one scans first the state of triggers 8R—8W, and that this scanning is successively extended to triggers 4R—4W, then to triggers 2R—2W, 1R—1W, if the scanning has provided no positive result, i.e. in case of an equality, if there is an inequality, there is obtained: either a positive voltage across lead 364, thus indicating that it is the quantity recorded into triggers W which is the greater.

In the first case, coincidence circuit 370 is favored; when the voltage of lead 95 (see also FIGURE 4*i*) goes positive at the end of time B, a switching pulse is applied, through lead 371 to the right side of trigger F and to the left side of trigger H. Trigger F is restored to its initial state (unless already done), whereas trigger H is switched. Leads 372 and 373 are supplied with a positive voltage, whereas leads 374 and 375 are supplied a negative voltage.

In the second case (lead 365 positive) coincidence circuit 376 is favored. When lead 95 goes positive, a switching pulse is applied to lead 377 and transmitted on one hand to the right side of trigger F, and on the other hand to the left side of trigger H. The latter trigger is restored to its initial state (unless already done) whereas trigger F is switched. The voltage across leads 374 and 375 goes positive, whereas that across leads 372 and 373 goes negative.

Let us refer now to the whole of the operations such as they develop effectively on the comparison of two numerical factors. It will be assumed that these operations concern the comparison of a first factor A equal to 87352 with a second factor B equal to 87361, recorded in some areas of some memories. Neither these areas nor the corresponding memories will be specified. For a better understanding of the circuits, it will suffice to know that these factors are scanned digit by digit beginning with that to the right, and these digits are finally recorded in the triggers of the W series for one of the factors, and in the triggers of the R series for the second factor. The result of the comparison is inverted, if the function of the factors is reversed so that it will be specified that the factor, the digits of which will be finally recorded into the triggers of the W series, is factor A, namely 87352. The digits of factor B are assumed to be recorded into the triggers of the R series.

It will be further supposed that the comparison is controlled from any one of the triggers of the P series (FIGURE 4*h*) for example trigger P1. It was seen that this trigger has been switched by a pulse provided by lead 134, during the switching time of trigger B6 (FIGURE 4*i*). Lead 111 is then positive. Then, trigger B7 is switched (FIGURE 4*h*), and it was seen that, at that moment, the scanning chains (FIGURES 4*e*, 4*f* and 4*g*) are positioned, whereas those among triggers 1M, 2M, 3M . . . 11M, 12M, 13M . . . (FIGURE 4*c*) corresponding to the memories to be scanned are switched. Lead 178 (FIGURE 4*h*) being positive, also triggers F and H are restored (FIGURE 4*q*) in case one of these triggers should not be in its initial state. This restoration is effected in the way which has been explained because of the voltage of lead 178. As may be seen, a branch line of that lead connects to the left side of triggers F and H. The switching time of trigger B7 (FIGURE 4*h*) is followed with the switching time of trigger B8, and it was seen that it is during that time that the arithmetical operations were performed. The various memory locations are then scanned one after the other, whereas the corresponding quantities were recorded into triggers R and W (FIGURES 4*p* and 4*q*). It was explained how each memory location was scanned, how triggers R and W were controlled, how the quantities were re-recorded into the memories. This will therefore not be explained again. It will only be assumed that triggers R and W successively receive the various required digits and the operations occurring at that moment are analyzed. However, it will be reminded that triggers R record on each time A and B, and that they control particularly the re-recording; triggers W record only during time A. The comparison operations are performed during times B, and when triggers R and W store two quantities from different sources.

(a) *Comparison of the unit digits.*—This comparison is performed when trigger B8 is switched, at the end of the first time B. From the example, triggers W store digit 2 (switched trigger 2W), triggers R, digit 1 (switched trigger 1R). From the description of FIGURE 4*q* it may be seen that lead 365 is positive, thus causing trigger F to be switched when the control pulse provided by lead 95 occurs. Lead 374, in particular, is at a positive voltage.

(b) *Comparison of the tens digits.*—This comparison is performed at the end of the second time B. After the example, trigger W stores digit 5 (switched triggers 4W and 1W); the triggers R, digit 6 (switched triggers 4R and 2R). Lead 364 is positive, which causes, on the appearance of the control pulse provided by lead 95, trigger H to be switched and trigger F to be restored to its original state. The voltage across lead 374 returns to a negative value, whereas that of lead 373 becomes positive.

(c) *Comparison of the hundreds digits.*—This comparison is performed at the end of the third time B. In the described example triggers R and W store digit 3 (switched triggers 2R and 1R, 2W and 1W). Leads 364 and 365 are both negative, so that there occurs no pulse changing the state of triggers F and H.

(d) *Comparison of the hundreds digits.*—This comparison is performed at the end of the fourth time B. In the chosen example, triggers R and W store digit 7 (switched triggers 4R, 2R and 1R, 4W, 2W and 1W). Leads 364 and 365 are both negative, so that there occurs no pulse changing the state of triggers F and H.

(e) *Comparison of the ten thousands digit.*—This comparison is performed at the end of the fifth time B. In the selected example triggers R and W store digit 8 (switched triggers 8R and 8W). Leads 364 and 365 are again both negative, so that the state of triggers F and H remains unchanged. It was seen that trigger H had been switched during the comparison of the tens.

(f) *Comparison of still more significant digits.*—There is no reason to suppose that the memory scanning is completed, and that said scanning does not extend to higher order digits, for example up to the hundreds of millions. The scanning areas must be identical for both factors (unless one of the factors is systematically provided with a series of zeroes on the left of its significant digits).

(g) *End of the scanning.*—The end of the scanning must be signalled in the above mentioned way, by means of connections made between hubs generally referenced 151 (FIGURE 4*h*) and 153 (FIGURE 4*d*) unless the scanning is desired to be performed up to memory location bearing number 1. In any case, the end of the scanning is marked by a positive voltage applied to lead 180 (FIGURE 4*h*) with the already described results: restoration of trigger B8 to its original state and switching of trigger B6 (FIGURE 4*i*). The latter keeps switched during the time period composed of a time A and of a time B. It was seen that trigger B6 particularly controlled the pulses provided by lead 134 and the advance of the program unit; in the considered case restoration of trigger P1 (FIGURE 4*h*) and switching of any one of triggers P2 to P*n*, or of the triggers of FIGURE 4*m*, according to the interconnections between hubs 137 (FIGURE 4*h*) it was seen that the program is changed at the end of time A.

Before the program is changed, the following operations take place: lead **122*a*** (FIGURE 4*i*) being positive (time A), coincidence circuit 240 is favored on both its inputs, causing a positive voltage to be applied to lead 241. This lead connects to coincidence circuit 378 (FIGURE 4*q*), so that there appears a positive voltage on lead 380, if lead 379 is itself positive. It results in favoring coincidence circuits 84, **84*a* and 84*b*, which have for their other inputs leads 372 to 375 from triggers F and H. According to the state of the triggers, some of leads 381 to 384 and some of hubs 381*a* to 384*a*** are thus applied a positive voltage. They are:

(1) Lead 381 and **381*a*** if triggers F and H are in their original state, i.e. equal;

(2) Lead 382 and hub **382*a*** if trigger H is switched, i.e. if factor B is the greater of the two factors being compared;

(3) Lead 383 and hub **383*a*** if trigger F is switched, i.e. if factor A is the greater of the two factors being compared;

(4) Lead 384 and hub **384*a***, if either of the two triggers F or H is switched, i.e. for an unequality.

These voltages fully indicate the result of the comparison. They appear only if lead 379 is supplied a positive voltage, i.e. if lead 386 or hub 385 were supplied a positive voltage. If the comparison is controlled from any trigger of the P series (FIGURE 4*h*), the latter result is obtained by making a connection between hub 385 and 138 or any of the homologous hubs.

COMPARISON OF TWO ALPHABETICAL CHARACTERS OR TWO CHARACTERS COMPRISING BOTH DIGITS AND LETTERS

This comparison will be assumed to be also controlled from trigger P1 (FIGURE 4*h*), hub 138 being connected to hub 385 (FIGURE 4*q*) and to hub 366. It was seen that the voltage of hub 138 (FIGURE 4*b*) was set to a positive value at the time when trigger P1 was switched, and that this voltage remained at that same value during all the switching time of that trigger. It is the same in particular for hub 366 (FIGURE 4*q*).

The comparison of the information comprising both digits and letters is arbitrary to a certain extent, in that it is necessary to arbitrarily assign a relative value to a letter compared to a digit. To such a problem there will be but an arbitrary solution. This problem may be extended to other arguments than the letters of the alphabet and the various digits, for example to the punctuation and to some special characters, with the only provision that these new elements are assigned a perfectly defined recording code. In such a case, the classification of the various arguments one with respect to the other also is arbitrary. The selected recording code comprises 6 elements on the whole (namely: bits 1, 2, 4, 8, and auxiliary bits A and B); and permits a total of 64 combinations permitting the recording of digits, alphabet letters and a number of special characters; however, for obvious reasons of simplification, it will be kept hereinafter to digits and letters. A general classification is chosen comprising, in the increasing order, letters A to Z of the alphabet, then digits 0 to 9.

It is possible to adopt the reverse classification, or any other classification, provided the circuits are adjusted accordingly.

The selected recording mode for the alphabet is the following:

| | | | | | |
|---|---|---|---|---|---|
| A | 1AB | J | 1B | S | 2A |
| B | 2AB | K | 2B | T | 3A |
| C | 3AB | L | 3B | U | 4A |
| D | 4AB | M | 4B | V | 5A |
| E | 5AB | N | 5B | W | 6A |
| F | 6AB | O | 6B | X | 7A |
| G | 7AB | P | 7B | Y | 8A |
| H | 8AB | Q | 8B | Z | 9A |
| I | 9AB | R | 9B | | |

Digits 1 to 9 are recorded in the usual way by means of binary argument 1—2—4—8. It may be remarked that the selected classification leads to assign a low value to any character comprising an argument B, and in case of an equality to any character comprising an argument A.

Hub 366 is at a positive voltage as is lead 367, which connects to coincidence circuits 85, **85*a*, 85*b*, 85*c*. Lead 369 is negative, so that the voltage of lead 72 from mixing circuit 71 is now related to that of lead 90**. This voltage depends upon the result of the comparison between the auxiliary arguments A and B. As concerns the comparison of argument B, four cases follow:

(1) Trigger BR is switched, whereas trigger BW is Off. Leads 350–B and 360–B are positive. Coincidence circuit **85*c* is favored on its three inputs, and therefore delivers a positive voltage onto leads 86*a* and 365**, thus indicating that the quantity recorded into the triggers of the W series is the greater. That is actually so after the adopted classification, if this quantity is for example a digit.

(2) Trigger BW is switched whereas trigger BR is off. Leads 352–B and 359–B are positive. Coincidence circuit 85 is favored on its three inputs and therefore delivers a positive voltage onto leads 86 and 364, indicating thereby that the quantity recorded into the triggers of the R series is the greater.

(3) Triggers BR and BW are both switched. Leads 350–B and 359–B are positive. Coincidence circuit **85*a* has its three inputs favored simultaneously and delivers a postive voltage onto lead 87**.

(4) Triggers BR and BW are both off. Leads 352–B and 360–B are positive. Coincidence circuit **85*b* is favored simultaneously on its three inputs and therefore delivers a positive voltage on lead 87**.

The latter voltage indicates that triggers BR and BW are equal, and that the operations must be extended to triggers AR and AW. This voltage is applied to coincidence circuits 88, **88*a*, 88*b*, 88*c***. It may be seen that the results are:

(1) A positive voltage across leads **89*a* and 365** if only trigger AR is switched;

(2) A positive voltage across leads 89 and 364 if trigger AW only is switched;

(3) A positive voltage across lead 90 in case of an equality, i.e. if triggers AR and AW are either both off or both switched.

In the latter case, the comparison must be extended to triggers 8R, 8W, which is performed in the way previously explained: the voltage of lead 90 is applied to lead 72, which favors coincidence circuits 73, **73*a*, 73*b*, 73*c*** . . .

Finally, a positive voltage appears on one of leads 364 or 365 according whether the quantity recorded in the triggers of the R series is greater than that recorded into the triggers of the W series or conversely. This results in switching one of the triggers F or H when there occurs a positive voltage on lead 95, and simultaneously with that switching, the second trigger is turned off if needed. At the end of the program switching time of trigger B6—FIGURE 4*i*—and when lead 241 turns positive, voltages are applied on leads 381 to 384, as well as on hubs **381*a* to 384*a*** and complete the operations.

COMPARISON OF THE INDICES FROM THE VARIOUS CARD READERS

It has been seen that the invention is generally applicable to a machine directly fed with a number of different series of recording cards. The embodiment being described relates to a machine, or an arrangement of machines comprising three card readers by means of three different series of recording cards. It is logical to suppose at first that these cards are classified according to some order, which is the same for all series; however, it is not known at first how these card sets are arranged; the cards corresponding to some classes may be missing, so that it is necessary to compare systematically the indices of the various cards. The comparisons to be performed are of two different types according whether they are effected within a same series of cards or between different series. If the various series of cards are generally designated A, B, C, the comparisons to be performed may be:

(1) Either of the type: AA′, BB′, CC′ (sequence comparisons);

(2) Or of the type: AB, BC and CA (inter-series comparisons).

It will be recalled that the various card readers comprise at least two reading stations, the first one being provided for a previous scanning of the cards, whereas the second one is used as an operation station. Each card is advanced first past the pre-scanning station, then past the operation station. An index, or an index area corresponding to a readout performed by the pre-scanning station will be generally designated by A, B or C. Similarly, the primed letters A′, B′ or C′ will designate an index of an index area corresponding to a readout performed by the operation station. . Thus, terms AB′, BB′, CC′ or AB, BC or CA comparisons may be explained by themselves: comparison BB′ for example is a comparison operation concerning two indices or index areas corresponding to readouts performed respectively by the pre-scanning and operation stations of card reader B. Similarly, comparison BC, for example, is a comparison of two indices of index areas corresponding to a readout performed respectively by means of the pre-scanning stations of card readers B and C.

The indices are not necessarily stored in adjacent card areas, so that one is led to repeat the whole of the comparisons of each type, for each area.

As will be seen, the whole of these operations are performed under the control of triggers HV (FIGURE 4*b*), TA, TB, TC and Q1, Q2 . . . QN. Trigger HV controls the general comparison type: sequence comparison or inter-series comparison operations relating to the indices corresponding to a given card reader. Tirgger TA, for example, particularly controls the comparisons of types AA′, or AB, trigger TB controls the comparisons of types BB′ or BC, trigger TC then controls comparisons of types CC′ and CA. On the other hand, triggers Q1, Q2 . . . QN, control the various index areas. It is to be pointed out that these areas should be classified according to their importance, and that they must be distributed in that order between triggers Q1 to QN, trigger Q1 is provided to correspond always to the more important area.

Triggers HV, TA, TB, TC and Q1 to QN cooperate to define an assembly of 6N comparison programs, i.e. for example 30 programs, if N is equal to 5. The sequence order for these programs to be performed is at first unimportant. Means have been provided to perform the whole of the sequence comparisons, then all the inter-series comparisons. Similarly for each comparison type, there has been provided means to perform first the comparison operations corresponding to the scanning area defined by trigger Q1, then all the comparisons corresponding to the scanning area defined by trigger Q2 . . . . It is obvious that this order may be changed without departing from the spirit of the invention, provided the circuits are adjusted accordingly.

Thus, as will be seen, the comparisons of each type develop until an inequality is detected. Thus various automatic arrangements act to eliminate the whole of the comparisons still to be performed (or at least to eliminate the greater part of the corresponding operations). Similarly, means have been provided to restart the whole of the 6N comparison programs; it will be seen, that by a series of relatively simple arrangements, it is possible to limit oneself in all cases, to the only comparisons wherein the indices of the newly fed card interfere. It is obvious that all other comparisons are in fact but a loss of time: as there has been no change in the factors, there is no change in the results. Among comparisons AA', BB', CC', AB, BC and CA, the feeding of a card of the A series, for example, causes a change but in comparisons AA', AB and CA.

As will be seen, the general purpose of the 6N comparison operations controlled from triggers HV, TA, TB, TC and Q1 to QN is to cause some of triggers HA, HB, HC, FA, FB, FC (FIGURE 4*a*) or HAB, HBC, HCA, FAB, FBC, FCA (FIGURE 4*j*) to switch, so that these operations are interrupted as soon as the corresponding purpose is reached. The latter triggers are designed to record and store the general result of the comparison operations of each type, the triggers assigned to that effect being respectively:

(1) HA, FA for the comparisons of type AA';
(2) HB, FB for the comparisons of type BB';
(3) HC, FC for the comparisons of type CC';
(4) HAB, FAB, for the comparisons of type AB;
(5) HBC, FBC, for the comparisons of type BC;
(6) HCA, FCA, for the comparisons of type CA.

COMPARISON CONTROL

The comparison operations are placed under the general control of trigger B11 (FIGURE 4*m*). As has already been explained, this trigger is controlled systematically on each card feed, by means of a positive voltage provided by any one of cams C1A, C1B or C1C. It parallelly results in the control of trigger B16, as well as in the control of some of triggers B12, B13 and B14, according to how hubs 148, **148*a*, and 148*b* have been connected to hubs 158, 158*a* and 158*b***.

As soon as trigger B11 is switched, lead 108 is set to a positive voltage as is lead 117. The latter causes the pulse generator, which, as seen, is composed of emitters **100*a*, 101*a*, 102*a* and 103*a*** (FIGURE 4*i*) to be energized. Switching pulses are then applied alternately to each side of trigger B1, thereby alternately applying positive voltages to leads 122 and **122*a*. At the same time leads 125 and 125*a* alternately emit other switching pulses, which cause, in particular, trigger B6 to be switched (so as to switch trigger B6 and to apply a positive voltage to lead 128**), then trigger B7 (FIGURE 4*h*), then trigger B8 and trigger B7 is restored to its initial state. Trigger B8 remains switched during a certain time until contacts C2A, C2B, C2C (FIGURE 4*m*) happen to open. It has been seen that these contacts were provided to neutralize all the circuits until the completion of the card read out.

Contacts C2A, C2B, C2C open, the voltage across lead 142 goes positive, as does the voltage of leads 177 and 162 because leads 174 and 117 are positive themselves. This results in switching trigger B2, when there occurs a first advance pulse which is transmitted by lead 125. Thus, the voltage across lead 116 goes positive as does the voltage of leads 168 and 253, because leads 117 and 108 are positive and the coincidence circuits are simultaneously favored on both their inputs.

Trigger B2 will remain switched during a time A, a time B and again during the following time A. The results thereof are the following:

*First time A.*—Trigger B8 (FIGURE 4*h*) being switched, lead 272 is positive, as is lead 98 (FIGURE 4*i*) when pulse 103 appears (because coincidence circuit 220 is favored simultaneously on both its inputs). At the same time, lead 97 is positive because coincidence circuit 207 also is favored on both its inputs (lead **122*a*** is always positive during a time A).

A branch line of lead 97 connects to coincidence circuit 254 (FIGURE 4*b*). The latter has, for its second input, a branch line of positive lead 253 (see also FIGURE 4*m*). Thus it transmits a positive voltage which is applied, through lead 255 to the right side of trigger HV, thereby switching it immediately. Lead 291 thus goes positive, whereas lead 286 becomes negative.

The voltage of lead 255 is also applied to the left sides of triggers HA, HB, HC, FA, FB, FC (FIGURE 4*a*) and HAB, HBC, HCA, FAB, FBC, FCA (FIGURE 4*j*). This restores all those among these triggers which happened to be switched.

If it is assumed first that contacts 7A–1, 7B–1, 7C–1 (FIGURE 4*a*) are all open, the output generally bearing references 256, 257, 258, 259 (see also FIGURE 4*j*) are all set to a positive voltage, so that a positive voltage is applied to leads **260*a*, 260*b*, 260*c*, and leads 261*a*, 261*b*, 261*c*. The outputs referenced generally 262, 263, 264, 266, on the contrary are negative, as are leads 267*a*, 267*b*, 267*c*, and leads 268*a*, 268*b*, 268*c***.

Contacts 7A–1, 7B–1, 7C–1 are connected to positive terminal **144*a* respectively to leads 271*a*, 271*b*, 271*c*, to resistances 273 and to negative terminal 146*a*. Leads 271*a*, 271*b*, 271*c***, are further connected to the right side of the following triggers (see also FIGURE 4*j*).

FA, HAB, FCA, for lead **271*a***;
FB, HBC, GAB, for lead **271*b***;
FC, HCA, FBC, for lead **271*c***.

When these contacts are open, leads **271*a*, 271*b*, 271*c*, are negative, so that there is no result. If one of these contacts is kept closed, positive voltage is applied to the right side of some triggers so that these triggers conduct through their left side so as to counter the restoration performed by the positive voltage applied to lead 255. For example, if contact 7A–1 is maintained closed, triggers FA, HAB and FCA are switched, thus applying a positive voltage to leads 263*a*, 267*a*** (FIGURE 4*a*), **264*a*, 268*a*, 266*c* and 268*c*** (FIGURE 4*j*). It will be seen later under which conditions contact 7A–1, 7B–1, and 7C–1, are maintained open or closed. However, it may be mentioned for now that these contacts are constantly maintained closed whenever the corresponding card reader is not used.

*Time B.*—The positive voltage of lead 168 (FIGURE 4*m*) is applied to mixing circuit 288 (FIGURE 4*h*), to lead 180 and to inverter 183, thus applying particularly a negative voltage of lead 182. The results are those already described: restoration of the scanning chains (if that has not already been done); switching of trigger B6 (FIGURE 4*i*) and voltage inversion in leads 11 and 128; and resetting of the trigger to its initial state.

*Second time A.*—Lead 11 is positive, as well as lead 241. The result is the restoration of all those of triggers 1M, 2M, 3M . . . 11M, 12M, 13M (FIGURE 4*c*) which happen to be switched. Lead 128 (FIGURE 4*i*) is negative, which makes it possible that switching pulses may be applied to lead 134 from 125*a*.

*Switching of triggers Q1 and TA.*—Lead 253 (FIGURE 4*m*) is positive, as are leads 276 (FIGURE 4*b*) and 277, mixing circuits 278 and 280 permitting the voltages to be equalized. Coincidence circuit 281 is favored thereby. Triggers B17 and QN being restored as mentioned on the figure by dots within the squares, outputs 282 and 283 placed on the right are negative. Coincidence circuit 284 is locked on both its inputs so that the voltage across lead 285 is negative. Trigger HV being switched (because of the positive voltage from lead 255), output 291 is set to a positive voltage and output 286 is negative. The latter output feeds in particular to coincidence circuit 287 which has also, for its second input, negative lead 285. Thus said coincidence circuit is locked which causes a negative voltage to be applied to lead 288. This lead connects in particular to mixing circuit 289 which receives on its second input a branch line of lead 134. Lead 288 being negative, lead 290 from mixing circuit 289 conforms to the voltage of lead 134. This causes the occurrence of various switching pulses, occurring, as has been seen, at the end of time A, and particularly switching trigger Q1. A branch line of lead 290 connects to coincidence circuit 281.

Trigger QN being restored, as mentioned, left output 292 is positive. It has been seen that the right output of trigger HV is also positive. Therefore coincidence circuit 293 is favored on both its inputs, and delivers a positive voltage on lead 294 which favors coincidence circuits 69*a*, 69*b*, 69*c* and 70*a*, 70*b*, 70*c*; lead 283 is negative, and coincidence circuit 295 is locked. Mixing circuit 296 being fed on both its inputs by a negative voltage (lead 286 and the output of coincidence circuit 295), the voltage of lead 297 is negative so that coincidence circuits 68*a*, 68*b*, 68*c* and 67*a*, 67*b*, 67*c* are locked. Coincidence circuits 67*a*, 68*a*, 69*a* and 70*a* are connected to a branch line of positive lead 277. This provides no result for the first two, because they are locked by the negative voltage of lead 297. The two others are respectively connected to a branch line of leads 267*a* and 260*a*.

Let it be assumed that contacts 7A–1, 7B–1, 7C–1 (FIGURE 4*a*) are all open. Triggers HA, HB, HC, FA, FB, FC, are all restored so that their right side is conducting, and that their left output is positive. Leads 256*a* and 257*a* particularly are positive, so that coincidence circuit 298*a* applies a positive voltage to lead 260*a*. Outputs 262*a* and 263*a* are negative as is lead 267*a*. Coincidence circuit 69*a* (FIGURE 4*b*) is locked, whereas coincidence circuit 70*a*, which is favored simultaneously on its three inputs, transmits a positive voltage which is applied successively to leads 66 and 66*a* and to coincidence circuit 299*a*. As the latter receives on its second input the voltage of lead 290 which, as seen, conforms to the voltage of lead 134, a switching pulse is applied at the end of the considered time to the left side of trigger TA, thus switching it and making lead 300*a* positive.

CASE WHEN SOME OF CONTACTS 7A–1, 7B–1, 7C–1 (FIGURE 4*a*) ARE MAINTAINED CLOSED

It may be remarked first that if contacts 7B–1, 7C–1 are retained open, this has no particular result at the present time. It results in the application of a positive voltage to the right side of triggers FB or FC, so that these triggers are conducting on their left side. The restoration operation performed under the control of the positive voltage of lead 255 is inoperative. Right outputs 263*b* and 263*c* are positive as are leads 267*b* or 267*c*. The result is the application of a positive voltage to one input of coincidence circuits 69*b* and 69*c* (FIGURE 4*b*), however they do not gate any signal since leads 65*a* and 64*a* are negative.

If contact 7A–1 (FIGURE 4*a*) is maintained closed trigger FA is constantly conducting on its left side. Output 257*a* is negative, whereas output 263*a* is positive. Therefore, there is a positive voltage across lead 267*a*. Parallelly, lead 260*a* is set to a negative voltage. Coincidence circuit 70*a* (FIGURE 4*b*) is locked, because of the negative voltage across lead 260*a*, which causes coincidence circuit 299*a* to be locked and makes it impossible to switch trigger TA. Coincidence circuit 69*a* is favored simultaneously at its three inputs, and delivers a positive voltage to leads 65 and 65*a*. A positive voltage is thus applied to one of coincidence circuits 69*b* and 70*b* which have for their second inputs a branch line of lead 294, now positive. Consequently, one of coincidence circuits 69*b* or 70*b* is favored according to the voltage state of leads 260*b* or 267*b*, i.e. according to the state of trigger FB (FIGURE 4*a*) and contact 7B–1.

If contact 7B–1 is open, the restoration pulse applied to trigger FB through lead 255 causes the right side to become conductive, so that leads 257*b* and 260*b* are positive and coincidence circuit 70*b* (FIGURE 4*b*) is favored. Leads 63 and 63*a* are positive so that coincidence circuit 299*b* is favored. The latter receiving on its second input, the voltage of lead 290 and results in the application of a switching pulses to trigger TB, which is thereby switched. Lead 300*b* thus goes positive.

If contact 7B–1 (FIGURE 4*a*) is maintained closed, a positive voltage is applied to the right side of trigger FB which makes its left side conducting. In such a case, output 263*b* is positive, and consequently lead 267*b* is positive, and coincidence circuit 69*b* (FIGURE 4*b*) is favored. Leads 64 and 64*a* are positive, and favor one input of coincidence circuits 69*c* and 70*c*. They have for their second input a branch line of lead 294, now positive, and for other inputs leads 260*c* and 267*c*. Therefore coincidence circuit 69*c* or 70*c* is favored according to the voltage state of these leads, i.e. according to the state of trigger FC (FIGURE 4*a*). The latter actually depends upon the state of contact 7C–1. This contact should be assumed open, so that trigger FC is restored under the action of the positive voltage which has been applied to lead 255. In such a case, the left output is positive, as is lead 260*c*. Coincidence circuit 70*c* (FIGURE 4*b*) is then favored on its three inputs and delivers a positive voltage to leads 62 and 62*a*, and therefore coincidence circuit 299*c* is favored. As the latter receives on its second input the voltage of lead 290, a switching pulse is applied to the right side of trigger TC, thereby switching that trigger, and making lead 300*c* positive.

The exact conditions wherein contacts 7A–1, 7B–1, 7C–1 (FIGURE 4*a*) are maintained open or closed will be seen later. However, it may be stated that, as there are three card readers, one may use either all the card readers or only two of them, or any one of them. This depends upon the exact nature of the work the machine is to perform. Operations requiring three card readers, operations requiring two card readers only, or operations requiring but one single card reader may be performed. In the event only two, or one, card readers are required, it is obviously advantageous to select freely these card readers, with the only provision that this free selection does not require too elaborate a circuitry. In such a case, it is obvious that the partial use of the card readers simplifies greatly the comparison operations. As was seen, an operation requiring the three card readers A, B and C requires that six comparisons, AA′, BB′, CC′, AB, BC, CA should be performed. An operation requiring but two card readers (for example card readers A and B) will require three series of comparison operations: AA′, BB′, AB. An operation requiring one card reader, for example card reader A, requires only operation comparison series AA′.

Contacts 7A-1, 7B–1, 7C–1 have for one of their functions to eliminate automatically some comparison operations. These contacts must be kept off in case the corresponding card reader is not used. As will be seen, the comparisons of type AA' are controlled by trigger TA (FIGURE 4*b*) whereas the comparisons of types BB' and CC' are controlled respectively from triggers TB and TC. As already seen, and for sequence comparisons, if contact 7A–1 is kept off (FIGURE 4*a*) it prevents trigger TA from being controlled (FIGURE 4*b*) while automatically directing the circuits towards trigger TB. Similarly, if contact 7B–1 is kept off, (FIGURE 4*a*) trigger TB cannot receive any control signal (FIGURE 4*b*). At least one of the card readers is used, so that if trigger TA is not controlled, it is necessary to control either trigger TB or TC.

Without going now into the details, it will be seen that when one of contacts 7A–1, 7B–1, 7C–1 (FIGURE 4*a*) are off, two of the inter-series comparisons are eliminated, while when two of these contacts are kept off all are eliminated.

Similarly, it will be seen that contacts 7A–1, 7B–1, 7C–1 are still maintained closed under some conditions and particularly:

At the beginning of the operations to cause automatically the cards to advance in each of the feeding heads used, so long as the first card of each series has not been recorded into the memory assigned thereto;

At the end of the operation, when a feeding head has exhausted the card set corresponding thereto, to cause the cards to advance towards the other heads.

The purpose of the comparison programs generally controlled from triggers HV, TA, TB, TC and Q1 to QN (FIGURE 4*b*) is to cause, if needed, some of triggers HA, HB, HC, FA, FB, FC (FIGURE 4*q*) or HAB, HBC, HCA, FAB, FBC, FCA (FIGURE 4*j*) to switch in case an inequality is detected and according to the direction of that inequality. Then the comparison is to be interrupted, in particular as concerns the triggers of FIGURE 4*j*. Just as keeping contact 7A–1 in the off state causes trigger FA to have its left side conductive, a positive voltage to be applied to leads **263*a* and 267*a***, the control of trigger BA to be eliminated, and the circuit to be directed towards trigger TB, similarly, one of triggers HA or FA being switched (FIGURE 4*a*) causes a positive voltage to be applied to one of leads **262*a* or 263*a*, and to lead 267*a*** thereby producing the same results.

SWITCHING OF TRIGGERS B2 AND B3 (FIGURE 4*m*)

Let it be assumed again that all contacts 7A–1, 7B–1, 7C–1 (FIGURE 4*a*) are open. The triggers of FIGURE 4*a* then are all conductive through their right side, and a positive voltage is applied to all their left outputs. Outputs **256*a*, 257*a*, particularly, are positive, so that a positive voltage is applied to lead 260*a*** and trigger TA is switched again (FIGURE 4*b*) at the end of time A when lead 290 returned to a negative voltage. It was seen that the latter was coincident with a positive voltage of lead 134. It was seen also, that the positive voltage applied to lead 253 had two particular results: switching of trigger TA and switching of trigger Q1.

Prior to that, trigger HV had switched, and the triggers of FIGURES 4*a* and 4*j* had been restored.

At the same time as the switchings of triggers Q1 and TA, triggers B2 and B3 are also switched (FIGURE 4*m*), all these switchings being performed simultaneously, when lead 134 goes positive. It was seen that lead 116 was positive, which caused, particularly, lead 253 to be also positive. The voltage of lead 116 is applied to coincidence circuit 163 which has for its second input a branch line of lead 134. When this lead returns to a positive voltage, at the end of time A, there occurs a switching pulse which switches triggers B2 and B3. Lead 116 thus returns to a negative voltage and so does 253. At the same time, lead 174 returns to a negative voltage, so that a negative voltage is applied to leads 177 and 162 and momentarily prevents any other control signal being applied to trigger B2.

CONTROL OF TRIGGERS TB (FIGURE 4*b*), TC, Q2 ETC.

The comparison operations corresponding to the simultaneous switchings of triggers HV, TA and Q1 will be explained later. Let it be noted that there occurs successively:

(1) The switching of trigger B6 (FIGURE 4*i*), the return of lead 11 to a negative voltage and the switching of trigger B7 (FIGURE 4*h*);

(2) A positioning of the scanning chains because of the comparison operations, under the control of trigger B7;

(3) The switching of trigger B8 and the return of trigger B7 to its original state;

(4) The performance of the comparison operation under the control of trigger B8, and the possible switching of triggers F or H (FIGURE 4*q*);

(5) The switching of trigger B6, the return of the voltage of lead 11 to a positive value and resetting of trigger B8 (FIGURE 4*h*) to its initial state.

At that moment during time A, the operations are the following:

Leads 111 and **122*a* are positive as is lead 241** (FIGURE 4*i*). Triggers F and H are thus scanned, if an inequality is detected. In case one of triggers F or H is switched, coincidence circuits 84 or **84*b* are favored on both their inputs, and consequently a positive voltage is applied to one of leads 382 or 383. These leads are incorporated to cable 387**, thus going through FIGURES 4*p* to 4*k* to reach FIGURES 4*j* and 4*a*. According to the voltage state of leads 382 and 383, one of coincidence circuits **301*a* or 302*a*** is favored on its two inputs, so that a positive voltage is applied to the right side of one of triggers HA or FA, and thus one of these triggers is switched.

Trigger TA (FIGURE 4*b*) being still switched, lead **300*a* is positive. The positive voltage is applied to coincidence circuit 303*a*, to mixing circuit 304, to lead 65*a* and therethrough to coincidence circuits 69*b* and 70*b*. The latter are already favored on a second input since leads 291 and 294 are positive. Their third input is also positive, according to the voltage state of leads 260*b* and 267*b***, i.e. according to the state of triggers HB and FB (FIGURE 4*a*). If it is assumed that these triggers have their right side conducting, the left outputs **256*b* and 257*b*, are positive, so that a positive voltage is applied to lead 260*b* and coincidence circuit 70*b*** is favored on its three inputs (FIGURE 4*b*). Leads 63 and **63*a* are consequently positive, so that coincidence circuit 299*b* is also favored. The latter has for one input a branch line of lead 290 which also connects to coincidence circuit 303*a*. When leads 290** again receive a positive voltage, two switching pulses result which switch trigger TB and restore trigger TA to its initial state.

SWITCHING TIME OF TRIGGERS HV, TB, Q1

Triggers B6 (FIGURE 4*i*), B7, B8 (FIGURE 4*h*), then again B6, are switched again and new comparison operations are performed under the control of B8. One of triggers F or H (FIGURE 4*q*) may be switched when an inequality has been detected, so that one of triggers HB or FB is switched later (FIGURE 4*a*).

Trigger TB (FIGURE 4*b*) being switched, lead **300*b* is positive which causes a positive voltage to be applied to coincidence circuit 303*b*. The positive voltage of lead 300*b* is applied also to mixing circuit 306 and to lead 64*a*, thus causing coincidence circuits 69*c* and 70*c*** to be favored. Let it be assumed that triggers HC and FC (FIGURE 4*a*) are conducting through their right side, left outputs **265*c* and 257*c* are positive, so that lead 260*c* is positive, and coincidence circuit 70*c*** is favored on its three inputs (FIGURE 4*b*). Leads 62 and **62*a* are thus at a positive voltage so that coincidence circuit 299*c* is favored. The latter being connected by lead 290 to coincidence circuit 303*b***, there appear, on the return of lead 290 to a positive voltage, two switching pulses which switch trigger TC and restore trigger TB to its initial state.

SWITCHING TIME OF TRIGGERS HV, TC, Q1

Triggers B6 (FIGURE 4*i*), B7, B8 (FIGURE 4*h*) are switched again, then B6. New comparison operations are performed under the control of B8. One of triggers F or H (FIGURE 4*q*) may be switched, so that later one of triggers HC or FC (FIGURE 4*a*) is caused to switch.

Trigger TC (FIGURE 4*b*) being switched, lead 300*c* is positive, so that coincidence circuit 303*c* is favored. The voltage of lead 300*c* is also applied to mixing circuit 307, so that lead 308 is supplied a positive voltage and coincidence circuit 309 is favored. Coincidence circuits 303*c* and 309 each receive a branch line of leads 290 and 134. Two switching pulses appear when leads 134 and 290 reassume a positive voltage, which switch trigger B17 and restore trigger TC to its initial state. Lead 308, in particular, goes negative again.

SWITCHING TIME OF TRIGGERS HV, B17 AND Q1

Trigger B17 having been switched in the described way, lead 282 is set to a positive voltage, whereas lead 310 is negative. A branch line of the latter head connects to coincidence circuit 143 (FIGURE 4*i*) which locks it. This trigger is momentarily isolated from the switching pulses from lead 125. Thus lead 111 remains at a positive voltage during several adjacent times. Under the same conditions, lead 128 remains negative, so that, one after the other, several switching pulses are transmitted by lead 134.

Another branch line of lead 310 (FIG. 4*c*) connects to mixing circuit 311, which has for its second input a branch line of lead 134. Lead 310 being negative, lead 312 from mixing circuit 311 conforms to the voltage of lead 134. This lead reaches in particular coincidence circuit 313, which has for its second input a branch line of positive lead 314. This results in a switching pulse which switches trigger Q2 and restores trigger Q1.

Lead 282 and 277 are positive thus favoring one input of coincidence circuits 69*a* and 70*a*. It being assumed that triggers HA and FA (FIGURE 4*a*) are conducting through their right side, leads 256*a*, 257*a* are positive so that a positive voltage is applied to lead 260*a*, coincidence circuit 70*a* is favored (FIGURE 4*b*), a positive voltage is applied to leads 66 and 66*a*, and coincidence circuit 299*a* is favored. Consequently, trigger TA is switched.

Lead 282 also connects to coincidence circuit 315, which also receive lead 316 from mixing circuits 317. The latter receives lead 134, and negative lead 308. Lead 316 thus conforms to the voltage of lead 134, so that a switching pulse is applied to the left side of trigger B17 when lead 134 returns to a positive value. Trigger B17 is thus restored to its initial state, and thereby applies a positive voltage to lead 310. Coincidence circuit 143 (FIGURE 4*i*) is unlocked, so that triggers B6 and B7 may be switched (see also FIGURE 4*h*) when lead 125 transmits its next pulse.

SWITCHING TIME OF TRIGGERS Q2, Q3 . . . (FIGURE 4*b*)

It will be assumed that the successive comparisons performed do not detect any inequality. Trigger TA being originally switched the operations performed are successively as follows:

(1) Trigger TB is switched, and trigger TA returns to its original state;

(2) Trigger TC is switched, and trigger TB is restored to its original state;

(3) Trigger B17 is switched and trigger TC is restored to its initial state.

Each trigger TA, TB, TC is switched when trigger B6 (FIGURE 4*i*) is conducting through its left side (lead 11 being positive, lead 128 negative) and remains switched up to the return of trigger B6 to that same state. During that time:

(1) Trigger B6 is switched, as is trigger B7;

(2) The scanning chains are positioned under the control of trigger B7;

(3) Trigger B8 is switched and trigger B7 returns to its initial state;

(4) Comparison operations are performed under the control of trigger B8;

(5) Trigger B6 is switched again, and trigger B8 is restored to its initial state.

After trigger B17 is switched:

(1) Triggers Q3 and TA are switched;

(2) Triggers TB, TC and again B17 are switched.

The operations are the same for triggers Q4, Q5 . . . not shown, and for trigger QN. Triggers TA, TB, TC are successively switched and reset, then trigger B17.

SWITCHING TIME OF TRIGGERS QN AND B17

Leads 282 and 283 are positive. Lead 292 is negative. Coincidence circuit 293 is locked, so that a negative voltage is applied to lead 294, and coincidence circuits generally referenced 69 and 70 are locked. Coincidence circuits 284 and 295 on the other hand are favored simultaneously on both their inputs, and therefore they deliver a positive voltage to leads 285 and 297, and thence coincidence circuit 317 is favored. Coincidence circuits generally referenced 67 and 68 are thus favored on one of their three inputs.

It being assumed that contacts 7A–1, 7B–1 (FIGURE 4*a*) are all open, triggers HAB, FAB (FIGURE 4*j*) are conducting through their right side, so that a positive voltage is applied to the left outputs, 258*a* and 259*a*, as well as to lead 261*a*, a branch of which connects to coincidence circuit 68*a* (FIGURE 4*b*). The latter, which has for its second input a branch line of positive lead 277, is favored on its three inputs and delivers a positive voltage to leads 66*a* and 66*b*, and thereby favors coincidence circuit 299*a*.

Lead 286 is negative, which causes coincidence circuit 287 to be locked and a negative voltage to be applied to lead 288. The voltage across lead 299 thus is related to that of lead 134. When lead 134 assumes a positive voltage: trigger TA is switched, since coincidence circuit 229*a* is favored on one of its inputs and has for its second input a branch line of lead 290; trigger Q1 is switched, because coincidence circuit 281 is favored by the positive voltage of lead 276, and has also for its second input a branch line of lead 290; a pulse, applied to the left side of trigger HV through coincidence circuit 317 switches the right side of that trigger to conduct.

The voltage across lead 291 goes negative and triggers QN and B17 are restored to their initial state.

CONTROL OF INTER-SERIES COMPARISONS

The switching of triggers TA and Q1 indicates the beginning of a new series of operations during which there are effected inter-series comparisons. As will be seen, these operations are depending upon the voltage of lead 286. Then successively: triggers TB, TC and B17 are switched; triggers TA, TB, TC and B17 are switched successively while trigger Q2 . . . is switched; the same triggers are successively switched, while trigger QN is switched.

These switchings are performed in a way quite similar to that already described, with the only difference that they now depend upon the coincidence circuits generally referenced 67 and 68 and upon the state of triggers HAB, FAB, HBC, HCA, FCA (FIGURE 4*j*). These triggers are normally conducting through their right side (if contacts 7A–1, 7B–1, 7C–1 are assumed to be open). In such a case, the left outputs generally referenced 258 and 259 (FIGURE 4*j*) are positive, so that coincidence circuits such as 258*a*, 258*b*, 258*c* are favored on two inputs and deliver therefore a positive voltage to leads such as 261a, 261b or 261c. Leads such as 268a, 268b or 268c on the contrary are negative. Consequently, coincidence circuits 68a, 68b and 68c (FIGURE 4b) are successively favored and triggers TA, TB, TC successively controlled.

If some of triggers HAB, FAB, HBC, FBC, HCA, FCA (FIGURE 4j) happen to be switched (because of the detection of an inequality, or because one of contacts 7A–1, 7B–1, 7C–1 is maintained off some of leads such as 258a or 259a (FIGURE 4j) go negative to apply a negative voltage to the corresponding lead 261, whereas some of leads such as 264a or 266a become positive and apply a positive voltage to corresponding lead 268. Consequently, some of coincidence circuits 68a, 68b, 68c (FIGURE 4b) are locked, which inhibits the control of that of triggers TA, TB or TC having its coincidence circuit 68 locked. At the same time some of coincidence circuits 67a, 67b, 67c are favored, so that the control is directed towards the following trigger or trigger B17.

The timing of the switchings of triggers HV, TA, TB, TC, B17, Q1 to QN, and of the switchings of triggers B6 (FIGURE 4i), B7 and B8 (FIGURE 4h) will appear more clearly from the analysis of FIGURE 17 which schematically indicates how the various trigger switchings are timed and repeated. First the two long periods during which the sequence comparisons and the inter-series comparisons are effected will be noted: the first one of these periods is characterized by a certain state of trigger HV (see also FIGURE 4b) and by a positive voltage across lead 291. The second one of these periods is characterized by a second state of trigger HV and by a positive voltage of lead 286. Each period is subdivided into a certain number of sub-periods, during which triggers Q1, Q2 . . . Qn are successively switched. These sub-periods are themselves subdivided into bit periods during which triggers TA, TB, TC, then B17 are successively switched. During each bit period, the effects of triggers B6 (FIGURE 4i), B7, B8 (FIGURE 4h), occur successively, then again B6. The passage from one period to the next is made during the switching of trigger B6.

SEQUENCE COMPARISONS

These comparisons are made when lead 291 (FIGURE 4b) is at a positive voltage. Leads 300a, 300b, 300c go to a positive voltage when triggers TA, TB, TC respectively are switched. Then the following operations take place:

(1) Coincidence circuits 318a, 318b, 318c (FIGURE 4k) are favored on both their inputs;

(2) A positive voltage is applied to leads 319a, 319b, 319c;

(3) Coincidence circuits 301a, 302a, 301b, 302b, 301c, 302c (FIGURE 4a) are favored, so that one of the triggers of groups HA, FA—HB, FB—HC—FC may be switched, when leads 382 or 383 are supplied a positive voltage on the detection of an inequality;

(4) Coincidence circuits 321a, 321b, 321c (FIGURE 4l), the function of which will be seen later are favored;

(5) Coincidence circuits 320a, 320b, 320c, which have for their second input a branch line of lead 122a, are favored;

(6) A positive voltage is applied to leads 346a, 346b, 346c when lead 122a is itself positive;

(7) Coincidence circuits 322a, 322b, 322c which have for their second input a branch line of lead 122 are favored;

(8) A positive voltage is applied to leads 353a, 353b, 353c and leads 354a, 354b, 354c, when lead 122 itself is positive;

(9) A positive voltage is applied to lead 345 whenever one of leads 300a, 300b, 300c is itself positive.

Lead 345 connects to coincidence circuit 388 (FIGURE 4d) and to inverter 357, so that a negative voltage is applied to lead 185, and coincidence circuit 184 is locked. Lead 176a thus is constantly negative. Therefore coincidence circuits such as 200 (FIGURE 4c) or 196, are locked, which makes it impossible to switch triggers 1M, 2M, 3M . . . or 11M, 12M, 13M . . . As will be seen the function of the latter triggers is assumed by triggers TA, TB, TC (FIGURE 4b).

Trigger HV is conducting through its left side, thus lead 286 is negative, so that coincidence circuit 389 is locked and a negative voltage is applied to lead 390. This voltage is applied to lead 418 (FIGURE 4a) and to inverter 391, which delivers a positive voltage, applied to coincidence circuit 388. Consequently, coincidence circuit 388 is favored on both its inputs, and a positive voltage is applied to lead 386. The latter goes through FIGURES 4e, 4f, 4g, to reach mixing circuit 392 (FIGURE 4q). Thus the voltage of lead 379 is set to a positive value, so that the result of each comparison is read out whenever the voltage of lead 241 goes positive.

Leads 346a, b and c (FIGURE 4l) connect respectively to mixing circuits 393a, 393b, 393c (FIGURE 4c) and 394a, 394b, 394c. It was seen that these leads are at a positive voltage whenever lead 122a (see FIGURES 4l and 4i) is positive and whenever one of triggers TA, TB, TC (FIGURE 4b) is switched. Leads 395a, 395b, 395c (FIGURE 4c) and 396a, 396b, 396c from mixing circuits generally referenced 393 and 394 are therefore positive under the same conditions.

Leads 354a, b, c (FIGURE 4l), which are positive whenever lead 122 is itself positive, and whenever one of triggers TA, TB, TC (FIGURE 4b) is switched, connect to mixing circuits 397a, 397b, 397c (FIGURE 4c) as well as to mixing circuits 394a, b and c. Therefore leads 398a, 398b, 398c and 396a, 396b, 396c therefrom are positive under the same conditions.

As already seen, leads 398a, also referenced 195 or M1, when positive, controls the circuits provided for the scanning of the various locations of memory M1 (see also FIGURE 4n). Similarly, leads 398b, 398c, when positive, respectively control the circuits provided for the scanning of memories M2 and M3, whereas leads 395a, b and c, when positive, respectively control the circuits provided for the scanning of the various locations of memories M4, M5, M6. Leads 398b and c, and 395a, b and c, have also been referenced M2 to M6 respectively, in order to designate which memory is controlled when said leads are positive. Thus, as specified before, the cards successively fed in card readers A, B and C, are recorded respectively into memories M1, M2, M3 then into memories M4, M5, M6. It will be noted: that the switching of trigger TA results in controlling memories M1 and M4 where the cards from card reader A are recorded; that the switching of trigger TB results in controlling memories M2 and M5 wherein the cards from card reader B are recorded; that the switching of trigger TC results in controlling memories M3 and M6 where the cards from card reader C are recorded.

Leads 396a, b and c are positive under the same conditions as leads 300a, b and c (see also FIGURES 4b and 4l). The voltage of lead 396a, for example, depends upon that of leads 346a and 354a, which are related to the voltage of lead 300a and the voltages of leads 122 and 122a respectively. Leads 396a, b, c, are respectively connected to coincidence circuits 399a, 399b, 399c, 401a, 401b, 401c and 403a, 403b, 403c, which have for their second inputs leads 314, 314a and 314b from the right side of triggers Q1, Q2 . . . Qn respectively (FIGURE 4b). Consequently, a positive voltage is applied successively to hubs 400a, 400b, 400c, 402a, 402c, 404a, 404b, 404c (FIGURE 4c). The voltage of the hubs generally referenced 400 is related to the switching of triggers Q1 (see also FIGURE 4b), while the voltage of the hubs generally referenced 402 or 404 is related to the switching of triggers Q2 or Qn. In each series, the voltage of the hubs further referenced a, b or c, is connected to switch of triggers TA, TB, TC. It is obvious that these circuits further comprise other hubs corresponding to the triggers of the Q series which have not been represented.

Hubs 400, 402, 404 which are directly connected to the right outputs of triggers Q1, Q2 . . . Q*n* and which therefore ar positive as soon as the corresponding trigger is switched are to be connected when required: either to hub 366 (FIGURE 4*q*) when the comparison is made between arithmetical arguments, or to hub 405 (FIGURE 4*b*) if it is desired to limit the comparisons, or some of them, to the only sequence comparison operations; or to one of hubs 406 (FIGURE 4*l*) if it is desired to make sure of the matching of the cards; or to one of hubs 408*a*, 408*b*, 408*c* (FIGURE 4*j*) in case some comparison fields exist only in some cards, and in case it is desired that the cards having no such field should be fed in priority; or to one of hubs 409*a*, 409*b*, 409*c* if some comparison fields exist only in some cards, and if it is desired that these cards should be fed prior to the cards having no such field.

Hubs 400*a*, *b*, *c*, 402*a*, *b*, *c*, 404*a*, *b*, *c* (FIGURE 4*c*) must be connected to the hubs generally referenced 149 (FIGURE 4*h*) in a way quite similar to that in which the latter hubs may be connected to hubs 139 and 140. However, the connections made from hubs 150 may be of any type since these connections are normally provided to control triggers 1M, 2M, 3M . . . 11M, 12M, 13M (FIGURE 4*c*) and since the control of these triggers has been made impossible. The hubs generally referenced 151 (FIGURE 4*h*) must be connected to hubs 153 (FIGURE 4*d*) as described above.

Let us assume that it is desired to keep a series of current accounts, and that the card readers are fed respectively with the series of the following cards:

(a) *Reader A*.—Name cards and address cards comprising specifically:

Columns 1 to 3—the number of the agency;
Columns 8 to 12—the account number;
Columns 13 to 40—the name or trade name, and possibly the address.

(b) *Card reader B*.—Previous balance cards comprising specifically:

Columns 5 to 7—number of the agency;
Columns 19 to 23—account number;
Columns 1 to 4—date when the previous balance card was made up.

(c) *Card reader C*.—Operations cards, comprising specifically:

Columns 5 to 7—number of the agency;
Columns 8 to 12—account number;
Columns 24 to 27—date when each operation becomes operative.

In this case, it is necessary: for all cards to perform a comparison as to the subsidiary number, and as to the account number; for previous balance cards, and for operation cards, to perform a comparison as to the date.

It will be supposed generally: that the comparison as to the subsidiary number will be performed under the control of trigger Q1 (FIGURE 4*b*); that the comparison as to the account number will be performed under the control of trigger Q2; that the comparison as to the date is effected under the control of trigger QN.

In such a case, the connections to be made from the hubs generally referenced 400, 402 and 404 (FIGURE 4*c*) are those indicated in FIGURE 15. Connection 410, between hub 400*a* and that of hubs 149 which is further referenced 11 (see also FIGURES 4*c*, 4*h* and 4*d*) determines the scanning of the memories from location 3 to location 1, provided no connection has been made from that of hubs 151 which bears the immediately lower order, or that such a connection is made with one of hubs 153 bearing a higher number. This scanning area corresponds to the area of the name card which bears the number of the agency.

Connections 411 between hubs 400*b* and 400*c* and that of hubs 149 further bearing number 14 similarly cause the memories to be scanned from location 7 to location 4 excluded, i.e.: a scanning corresponding to the area of "previous balance" and "operation" cards, also bearing the number of the subsidiary.

Connections 412 between hubs 402*a* and 402*c* and that of hubs 149 further bearing number 15 similarly cause the memories to be scanned from location 12 to location 7 excluded, i.e., a scanning corresponding to the "account number" area of the name and operation cards.

Connection 413 between hub 402*b* and that of hubs 149 further referenced 19 causes the memories to be scanned from location 23 to location 18 excluded, i.e., a scanning corresponding to the "account number" area of the "previous balance" card.

Connection 414 also causes the memories to be scanned from location 4 to location 1, which corresponds to the date of the previous balance.

Connection 415 causes the memories to be scanned from location 27 to location 23 excluded, which corresponds to the area of the operation card bearing the date when the operation becomes operative.

As to hub 404*a*, it must be connected to one of hubs 417 (FIGURE 4*d*) and to one of hubs 408*a* or 409*a* (FIGURE 4*j*). As will be seen, the first connection is used to indicate that no comparison has to be effected when triggers TA and QN (FIGURE 4*b*) are simultaneously switched (since there exists no scanning field associated with the control of that trigger combination). The second connection is used to give priority, either to the feeding of the "name" and "address" cards (if this connection is made to hubs 408*a*), or to the feeding of one of the "previous balance" or "operation" cards (if this connection is made to hub 409*a*).

Generally, all hubs such as 400*a*, *b*, *c*, 402*a*, *b*, *c*, 404*a*, *b*, *c* (FIGURE 4*c*) which are unused may possibly be connected to one of hubs 417.

SWITCHING TIME OF TRIGGERS Q1 AND TA (FIGURE 4*b*)

Supposing first that triggers Q1 and TA are switched, whenever leads 122*a* and 122 (FIGURE 4*i*) are positive, a voltage is applied to leads 346*a* and 354*a* (FIGURE 4*l*), and consequently, a positive voltage is applied to lead 396*a* (FIGURE 4*c*), hub 400*a* and that of hubs 149 further referenced 11 (FIGURE 19). As a result:

(1) Each scanning chain is positioned in location 3 of the memories, when it is time for trigger B7 to be switched (FIGURE 4*h*). This positioning is made in a way quite similar to that already described.

(2) On the switching of trigger B8, at each time A, one of locations 3, 2, 1 of memory M4, lead 346*a*, FIGURES 4*l* and 4*c*, is positive, thus causing memory M4 to be energized.

(3) At each time, one of locations 3, 2, 1 of memory M1, lead 354*a*, is at a positive voltage, which causes memory M1 to be energized.

Triggers F and H (FIGURE 4*q*) may be supplied various switching pulses, in case an inequality is detected. Then the state of the triggers is tested, when trigger B6 is switched (FIGURE 4*i*) and a positive voltage is applied to lead 241. There will be supplied:

(1) A positive voltage across lead 283 (FIGURE 4*q*) if the quantity contained in memory M1 is superior to that stored in memory M4.

(2) A positive voltage across lead 383 in the opposite case.

These voltages are applied to coincidence circuits 301*a* and 302*a* which have for their second input a branch line of lead 319*a*, now positive. Consequently, a positive voltage is applied to the right side of one of triggers FA or HA, which makes the corresponding trigger conducting on its left side, whereas, a positive voltage is applied to one of inputs 262*a* or 263*a*. At the same time, one of outputs 256*a* or 257*a* goes negative. This results in a positive voltage across lead 267*a* and a negative voltage across lead 260*a*, which locks coincidence circuit 70*a*

(FIGURE 4*b*), and favors coincidence circuit **69*a***, and momentarily prevents trigger TA from receiving a control signal. This occurs only when an inequality has been detected. Otherwise, triggers FA, HA (FIGURE 4*a*) remain in their initial state, and trigger TA is periodically and repeatedly controlled.

SWITCHING TIME OF TRIGGERS Q1, TB (FIGURE 4*b*)

Figure 41:
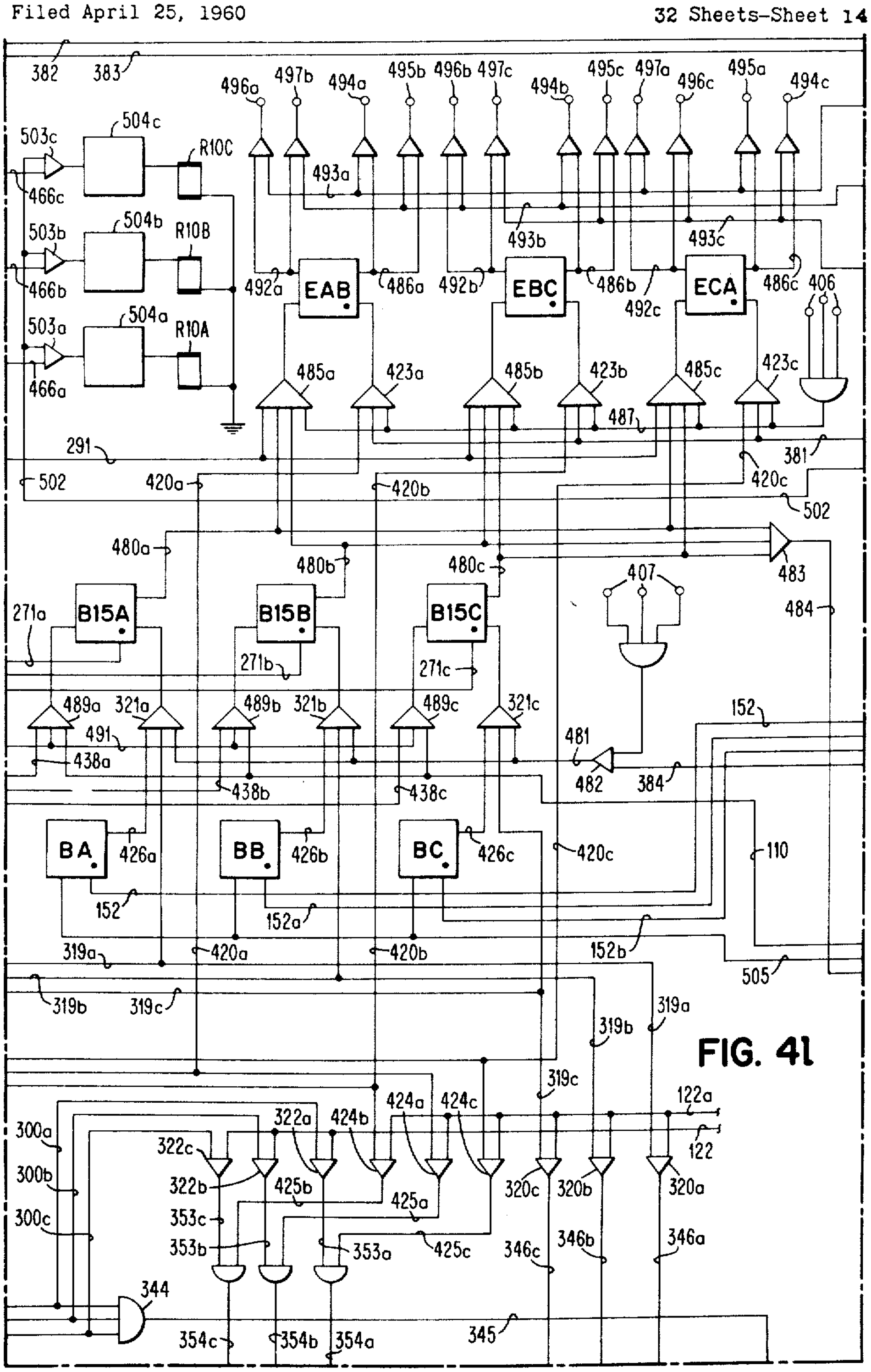

As seen previously, trigger TB is controlled immediately after TA. Whenever leads **122*a* and 122** (FIGURE 4*i*) are positive, leads **346*b* and 354*b*** (FIGURE 4*l*) are supplied a positive voltage, and therefore a positive voltage is applied to lead **396*b*** (FIGURE 4*c*), to hub **400*b*, and to that among hubs 149 which is further referenced 14** (FIGURE 19). Consequently:

(1) Each scanning chain is positioned in location 7 of the memories on the switching of trigger B7 (FIGURE 4*h*);

(2) On the switching of trigger B8, and during each time A, one of locations 7, 6, 5, of memory M5 is scanned (lead **346*b***, FIGURES 41 and 4*c*, is then at a positive voltage which controls memory M5);

(3) During each time B, one of locations 7, 6, 5, of memory M2 is scanned (lead **354*b***, which is positive, causes memory M2 to be controlled);

(4) The two chains stop scanning when they have reached location 5.

Triggers F and H (FIGURE 4*q*) which were restored at the beginning of the operation may be again supplied various switching pulses in case an inequality is detected. The state of these triggers is then tested when lead 241 goes positive. The results are then:

(1) A positive voltage across lead 382 if the quantity stored in memory M2 is greater than that stored in memory M5;

(2) A positive voltage across lead 383 in the opposite case.

These voltages are applied to coincidence circuits **301*b* and 302*b*** (FIGURE 4*a*) which have for their second input a branch line of lead **319*b*, now positive. Consequently, a positive voltage is applied to the right side of one of triggers FB or HB, which results in switching one of said triggers. Lead 267*b* then becomes positive (only if an inequality has been detected) whereas lead 260*b*** becomes negative. This results in momentarily prohibiting any new control of trigger TB (FIGURE 4*b*).

SWITCHING TIME OF TRIGGERS Q1, TC

As already seen, trigger TB is restored to its initial state, whereas trigger TC is switched. Whenever leads **122*a* and 122 go positive, leads 346*c* and 354*c*** are supplied with a voltage (FIGURE 4*l*), and thence a positive voltage is applied to lead **396*c*** (FIGURE 4*c*), hub **400*c*, and that among hubs 149 which is further referenced 14** (FIGURE 19). Consequently, in the same way:

(1) Each scanning chain is positioned in location 7 of the memories when trigger B7 is switched (FIGURE 4*h*).

(2) When trigger B8 is switched, at each time A, one of locations 7, 6, 5, of memory M6 is scanned (lead **346*c***, FIGURES 4*l* and 4*c*, is now positive, which causes memory M6 to be controlled).

(3) At each time B, one of locations 7, 6, 5, of memory M3 is scanned (since it is lead **354*c*** which is now positive).

(4) The scanning performed by the two chains is stopped when they have reached location 5.

Triggers F and H (FIGURE 4*q*) restored at the beginning of the operation may further receive various switching pulses in case an inequality has been detected. The state of these triggers is tested again when lead 241 goes positive. Consequently:

(1) A positive voltage is applied to lead 382 if the quantity stored in memory M3 is superior to that stored in memory M6.

(2) A positive voltage is applied to lead 383 in the opposite case.

These voltages are applied to coincidence circuits **301*c* and 302*c*** (FIGURE 4*a*) which have for their second inputs branch lines of lead **319*c*, now positive. Therefore, a positive voltage is applied to the right side of one of triggers FC or HC, so that one of the triggers is switched. The voltages of leads 267*c* and 260*c*** are inverted, which provides the same results as above (any new control of trigger TC is prohibited when an inequality has been detected).

SWITCHING TIME OF TRIGGERS Q2, TA, TB, TC (FIGURE 4*b*)

As seen above, after trigger TC, trigger B17 is switched, then again triggers TA, TB, TC, B17, at the same time as trigger Q2 is switched. The same operations are repeated; however, it is now hubs **402*a*, 402*b*, 402*c*** (FIGURE 4*c*) which are successively emitting. This results in a new series of comparison operations which concern the scanning fields defined from these hubs. Some of triggers FA, HA, FB, HB, FC, HC (FIGURE 4*a*) may happen to be switched after these operations, when an inequality has been detected.

SWITCHING TIME OF TRIGGERS QN, TA, TB, TC

Similar operations are performed with triggers Q3, Q4, not shown, then with trigger QN. Hubs **404*a*, 404*b*, 404*c*** (FIGURE 4*c*) are then successively emitters when triggers TA, TB, TC (FIGURE 4*b*) are successively switched. As concerns the time when trigger TA is switched, and when hub **404*a* is applied a positive voltage, it is to be noted that the scanning chains are not positioned and, consequently, the memories are not scanned, since the connections made from hub 404*a* define no scanning field. In such a case, hub 404*a* is to be connected to one of hubs 417** (FIGURE 4*d*). A positive voltage thus is applied to the right side of trigger B5 and switches it immediately so that lead 436 becomes positive. The voltage of lead 418 also goes positive and locks coincidence circuit 388. Lead 386 is negative. The voltage of lead 418 is also applied to mixing circuit 288 (FIGURE 4*h*) thus applying a positive voltage to lead 180, a negative voltage to lead 182 and causing all the results seen above. Consequently, trigger B7 is switched, and then trigger B8, and immediately thereafter, trigger B6 (FIGURE 4*i*). The latter controls the switching of trigger TB (FIGURE 4*b*) in the already described way. At the same time, trigger B5 (FIGURE 4*d*) is restored to its initial state when lead 134 returns to a positive voltage, since coincidence circuit 437 is favored on one of its inputs by the positive voltage from lead 436. The switching of trigger TC occurs afterwards, then that of trigger B17, which provides the results described above, namely, switching of trigger Q1 and trigger TA, the latter being now under the control of coincidence circuit **68*a***. The switching of the latter triggers initiates the inter-series comparisons, as will be seen hereinafter. While it is still a question of the sequence comparisons, it should be noted that the switching of any of the triggers of groups FA, HA, FB, HB, FC, HC (FIGURE 4*a*) changes the sequence order of the control of triggers TA, TB, TC (FIGURE 4*b*) so as to eliminate the control of the among these triggers which has caused an inequality to be detected.

When these inequalities have been recorded in all trigger groups FA, HA—FB, HB—FC—HC (FIGURE 4*a*), coincidence circuits **70*a*, 70*b*, 70*c*** (FIGURE 4*b*) are all locked, whereas coincidence circuits **69*a*, 69*b*, 69*c*, are all favored. Trigger B17 being switched, the positive voltage of lead 282 is applied successively to lead 65, to lead 64, and to lead 308, causing a positive voltage to be applied to mixing circuit 317. Thus, lead 316 remains positive, so that no switching pulse can be applied to the left side of trigger B17, through coincidence circuit 315. Switching pulses are transmitted by lead 312 which causes the triggers of the Q series to be successively switched, up to trigger QN. At that moment, lead 292 goes negative, which causes coincidence circuit 293 to be locked. Lead 294 goes negative and locks coincidence circuits 69***a*, 69*b*, 69*c*. Coincidence circuit 295 on the other hand, is favored on both its inputs, thus causing a positive voltage to be applied to lead 297 and favoring the coincidence circuits generally referenced 67 and 68. The control of triggers TA, TB, TC thus is taken away from the action of the triggers of FIGURE 4*a*, and now depends upon the triggers of FIGURE 4*j*.

INTERSERIES COMPARISONS

These comparisons are effected when lead 286 (FIGURE 4*b*) is at a positive voltage. Leads 300*a*, 300*b*, 300*c*, are then successively supplied with a positive voltage when triggers TA, TB, and TC are switched. Consequently:

(1) Coincidence circuits 419*a*, 419*b*, 419*c*, are favored on both their inputs (FIGURE 4*k*);

(2) A positive voltage is applied to leads 420*a*, 420*b*, 420*c*;

(3) Coincidence circuits 421*a*, 422*a*—421*b*—422*b*—421*c*, 422*c* (FIGURE 4*j*) make it possible for one of the triggers of groups HAB, FAB—HBC, FBC—HCA, FCA, respectively, to be switched when leads 382 and 383 are supplied with a positive voltage on the detection of an inequality;

(4) Coincidence circuits 423*a*, 423*b*, 423*c* (FIGURE 4*l*), the function of which will be discussed later on, will be favored;

(5) Coincidence circuits 424*a*, 424*b*, 424*c*, which have for their second inputs branch lines of lead 122*a*, are favored;

(6) A positive voltage is applied to leads 425*a*, 425*b*, 425*c*, when lead 122*a* is itself positive;

(7) Coincidence circuits 322*a*, 322*b*, 322*c*, which have for their second inputs branch lines of lead 122, are favored;

(8) A positive voltage is applied to leads 353*a*, 353*b*, 353*c*, and to leads 354*a*, 354*b*, 354*c*, when lead 122 itself is positive;

(9) A positive voltage is applied to leads 354*b*, 354*c*, 354*a*, respectively, when lead 122*a* itself is positive;

(10) A positive voltage is applied to lead 345, which provides the same results as in the sequence comparison case (locking of the control of triggers 1M, 2M, 3M . . . 11M, 12M, 13M . . ., FIGURE 4*c*).

As in the case of the sequence comparisons, lead 390 (FIGURE 4*b*) is at a negative voltage so long as no positive voltage is applied to hub 405. Consequently, a positive voltage is applied to leads 386 (see also FIGURES 4*d* and 4*q*) and 379, thus permitting the results of each comparison to be read-out whenever lead 241 is at a positive voltage.

Thus, as seen above, leads 354*a*, *b*, *c* (FIGURE 4*l*), connect to mixing circuits 397*a*, *b* and *c* (FIGURE 4*c*) and 394*a*, *b* and *c*. Consequently, a positive votlage is applied to some of the leads generally referenced 398, 396 and to some of the hubs generally referenced 400, 402 and 404. The application of this positive voltage depends upon the switching state of triggers TA, TB, TC (FIGURE 4*i*) according to whether it is a time A or a time B. The leads and hubs which are thus applied a positive voltage are (see FIGURES 4*b* and 4*c*) as follows:

(1) *When triggers Q1 and TA are switched*

At time A—lead 398*b* and hub 400*b* which control memory M2 and the scanning of the memory area defined from hub 400*b*.

At time B—lead 398*a* and hub 400*a*, which control memory M1 and the scanning of the area of that memory which is defined from hub 400*a*.

(2) *When triggers Q1 and TB are switched*

At time A—lead 398*c* and hub 400*c*, thus permitting the control of memory M3 and the scanning of the area of that memory which is defined from hub 400*c*.

At time B—lead 398*b* and hub 400*b*, the functions of which have already been described.

(3) *When triggers Q1 and TC are switched*

At time A—lead 398*a* and hub 400*a*.

At time B—lead 398*c* and hub 400*c*.

After the above example (refer also to FIGURE 19), a comparison is made, two by two, of the memory areas containing the number of the agency. Leads 382 or 383 (FIGURE 4*q*) are eventually made positive at the end of each comparison in case an inequality has been detected when lead 241 goes positive. These voltages are applied to coincidence circuits 421*a*, 422*a*—421*b*, 422*b*—421*c*, 422*c* (FIGURE 4*j*) causing, when required, one of the triggers of groups HAB, FAB—HBC, FBC—HCA, FCA to be switched. This switching occurs only when an inequality has been detected. Therefore, should the occasion arise, the voltage of leads 261*a*, 268*a*, 261*b*, 268*b*, 261*c*, 268*c* is inverted and that inversion causes some of coincidence circuits 67*a*, 67*b*, 67*c* (FIGURE 4*b*) to be favored, and corresponding coincidence circuits 68*a*, 68*b*, 68*c* to be locked. Thereby, those among triggers TA, TB, TC, which on a comparison have caused an inequality to be detected, are not controlled again. It is to be noted that coincidence circuits 421*a*, 422*a*—421*b*, 422*b*—421*c*, 422*c* (FIGURE 4*j*) receive respectively on one of their inputs branch lines of leads 261*a*, 261*b*, 261*c* which are positive so long as the triggers of groups HAB, FAB—HBC, FBC—HCA, FCA, have recorded no detected inequality. Thus, the second trigger of each group cannot be switched as soon as one of them is switched.

Similar operations are repeated when trigger Q2 is switched. The scanning fields are those defined from the hubs referenced generally 402 (FIGURE 4*c*). Other similar operations are again repeated when triggers Q3, Q4 . . . (not shown) are switched, and again on the switching of trigger QN. During these operations, some of the triggers of groups HAB, FAB—HBC, FBC—HCA, FCA (FIGURE 4*j*) may be switched whenever an inequality is detected. As already explained, each switching of each trigger of these groups restricts the field of the subsequent comparison operations, so as to limit these operations to the scanning and comparison of the memory areas having resulted in no detection of inequality. The switching of one of the triggers HAB, FAB prevents any further control of trigger TA (see also FIGURE 4*b*). The switching of one of triggers HBC, FBC prevents any further control of trigger TB, and the switching of one of triggers HCA, FCA, prevents any further control of trigger TC. As has been explained, these results will be obtained through the action of the voltages of the leads generally referenced 261 and 268 and through the action of the coincidence circuits generally referenced 67 and 68 (FIGURE 4*b*).

CASE WHEN SOME SCANNING FIELDS ARE MISSING

It was seen from the selected example (see also FIGURE 19) that the scanning fields defined from hubs 404*b*, 404*c* (FIGURE 4*c*) had no equivalent as concerns the cards fed in card reader A, and that, consequently, hub 404*a* were not connected to any of hubs 417. After the preceding, hub 404*a* is emitting in two cases:

(1) During each time B (lead 122, FIGURES 4*i* and 4*l*, at a positive voltage) when trigger QN and TA (FIGURE 4*b*) are switched;

(2) During each time A (lead 122a positive) on the switching of trigger combination QN—TC.

In the first case, hub 404b is emitting at time A; in the second case, it is hub 404c which is emitting during time B.

It was seen that the connections made from hub 404a defined no scanning field (refer to the example of FIGURE 19). Under these conditions, the comparisons controlled from trigger combinations QN—TA and QN—TC do not mean anything, and they have to be suppressed, or at least their result must not be recorded in the combinations of triggers HAB, FAB and HCA, FCA (FIGURE 4*j*). This is accomplished through the connection made between hub 404a (FIGURE 4*c*) and hub 417.

On the control of the combination of triggers QN, TA, hub 404a, emits as soon as these triggers are switched, i.e. at half the switching time of trigger B6 (FIGURE 4*i*); lead 122, which controls in particular coincidence circuit 322a (FIGURE 4*i*), turns positive at the same moment. It may be seen:

(1) That lead 300a (FIGURES 4*b*, 4*k* and 4*l*) is positive;

(2) That coincidence circuit 322a, at that moment is favored on both its inputs;

(3) That leads 353a, 354a (see also FIGURE 4*c*), 396a, are therefore supplied a positive voltage;

(4) That lead 314b (FIGURES 4*b* and 4*c*) is itself positive (because trigger QN is switched) so that therefrom coincidence circuit 403a is favored on both its inputs, and a positive voltage is applied to hub 404a. This voltage is applied to the right side of trigger B5 (FIGURE 4*d*) thus causing this trigger to switch immediately, as explained above. Thus, lead 436 goes positive, so that a positive voltage is applied to lead 418. At the same time, lead 386 goes negative, thus momentarily preventing any new read-out of the comparison results which might be recorded in triggers F and H (FIGURE 4*q*).

The positive voltage of lead 418 is applied to mixing circuit 228 (FIGURE 4*h*) and therethrough to lead 180, to inverter 183 and to mixing circuits 186 and 189 (FIGURE 4*i*). Leads 181 and 187 are thus positive, and prevent the scanning chains (FIGURES 4*e*, 4*f* and 4*g*) from being positioned. Lead 182 from inverter 183 is brought to a negative voltage, but it is inoperative at this time.

The switching of triggers B6 (FIGURE 4*i*) now occurs, in the above described way, which causes a positive voltage to be applied to lead 128 and a negative voltage to be applied to lead 111. At the same time, trigger B8 (FIGURE 4*h*) is also switched, thus causing a positive voltage to be applied to lead 178. This results in the restoration of triggers F and H (FIGURE 4*q*), but has no other effects since coincidence circuit 192 (FIGURE 4*h*) is now locked.

Later, trigger B8 is switched, and trigger B7 is restored to its initial state. Said switching lasts only during a time A and a time B. With lead 182 negative, lead 232 (see also FIGURE 4*i*) conforms to the voltage of lead 125, causing B8 to return to its initial state when that lead goes positive again. Similarly, trigger B6 (FIGURE 4*i*) is switched again (lead 111 being positive, and lead 128 negative) which provides the results already described. At the end of time A, when lead 134 returns to a positive voltage, the results are the following:

(1) The switching of trigger TB (FIGURE 4*b*);

(2) The restoration of trigger TA to its initial state;

(3) The restoration of trigger B5 (FIGURE 4*d*) to its initial state (since coincidence circuit 437 is favored on one of its inputs and its second input is subjected to the voltage variations of lead 134).

The circuits operate in substantially the same way when the trigger combination QN—TC is controlled. The difference is that trigger B5 is controlled a little later (at the beginning of the switching time of trigger B7). Lead 122a (FIGURES 4*i* and 4*l*) is then at a positive voltage, just as is lead 300c (FIGURES 4*b*, 4*k* and 4*l*), since trigger TC is switched. Lead 286 (FIGURES 4*b* and 4*k*) are also subjected to a positive voltage causing coincidence circuit 419c to be favored on both its inputs, so that:

(1) A positive voltage is applied to lead 420c;

(2) Coincidence circuit 424c is favored on both its inputs (FIGURE 41);

(3) A positive voltage is applied to leads 425c, then 354a (see also FIGURE 4*c*) and 396a;

(4) Coincidence circuit 403a is favored on both its inputs;

(5) Finally, a positive voltage is applied to hub 404a, hub 417 (FIGURE 4*d*), so that trigger B5 is switched, and all the already described results are provided.

It has been mentioned that all hubs such as 400a, *b* and *c*, 402a, *b* or *c*, 404a, *b* or *c* (FIGURE 4*c*) which are not used to define a scanning field, have to be connected to one of hubs 417.

The functions of the connections between hub 404a (FIGURE 4*c*) and one of hubs 408a and 409a (FIGURE 4*j*) will be analyzed later.

LIMITING THE COMPARISONS TO ONLY THE OPERATIONS THE RESULTS OF WHICH MAY BE MODIFIED BECAUSE ANOTHER CARD IS FED

It has been explained how the comparison operation field was automatically limited whenever one of the triggers of groups HA, FA—HB, FB—HC, FC—(FIGURE 4*a*)HAB, FAB—HBC, FBC—HCA, FCA (FIGURE 4*j*) was switched. As mentioned before, it is possible to further restrict the comparison operation field, and to limit these operations to only the comparisons the results of which may be modified by the feeding of a new card. For example, the feeding of a new card in card reader A may modify, should the occasion arise, only the results of the comparisons wherein the indices of that new card are concerned, i.e. the results which are recorded by means of trigger groups HA, FA (FIGURE 4*a*), HAB, FAB and HCA, FCA (FIGURE 4*j*). It is unnecessary, in such a case, to resume the comparisons the results of which are to be recorded in trigger groups HB, FB—HC, FC (FIGURE 4*a*) and HBC, FBC (FIGURE 4*j*) since the corresponding operations can only restore the triggers to their previous state.

To get such a result, the restoration of the triggers of FIGURES 4*a* and 4*j* is to be limited to the trigger groups which are concerned with the comparison operations and which will be performed subsequently, for example, to the trigger groups HA, FA—HAB, FAB—HCA, FCA when only card reader A has fed a new card. Similarly, it is necessary to change the control of trigger TA, TB, TC (FIGURE 4*b*), so as to suppress all the controls corresponding to comparisons, the result of which is already known.

The modified circuits are represented in FIGURE 20.

Let it be noted first that each card fed in one of card readers A, B or C, causes one of triggers BA, BB, or BC (FIGURE 4*l*) to be switched, this being done during the read-out of the corresponding card, on the closing of cam contacts C1A, C1B and C1C (FIGURE 4*m*). It has been seen that at the same time triggers B11, B16 and some of triggers B12 to B13 are controlled. Therefore, triggers BA, BB and BC are switched previous to the control of the comparison operations, and it will be seen that the restoration of these triggers is performed only when the comparison operations are completed. The voltage of leads 426a, 426b, 426c, indicates which card reader or readers a card has been fed to. One only of these leads is positive if only one card reader has been another card. Two of these leads or all three of them are positive if two or three card readers have effected simultaneously feeding operations.

If it is desired to limit the comparison operations to only the operations, the results of which might be modified by the feeding of a new card, the connection between lead 255 (FIGURES 4*b*, 4*a* and 4*j*) and trigger groups HA, FA—HB, FB—HC, FC—HAB, FAB—HBC, FBC—HCA, FCA must be made through coincidence circuits 427*a*, 427*b*, 427*c*, and 428*a*, 428*b*, 428*c* (FIGURE 20). The latter have for one input lead 255, and for a second input leads 426*a*, 426*b*, 426*c* or 430*a*, 430*b*, 430*c*. The latter come from mixing circuits 429*a*, 429*b*, 429*c* which have for their inputs two of leads 426*a*, 426*b*, 426*c*. Consequently:

(1) If lead 426*a* is positive, trigger groups HA, FA—HAB, FAB—HCA, FCA, are restored.

(2) If lead 426*b* is positive, trigger groups HB, FB, HAB, FAB, HBC, FBC, are restored.

(3) If lead 426*c* is positive, trigger groups HC, FC—HBC, FBC—HCA, FCA, are restored.

I.e., the restored trigger groups are those groups recording comparison results which may be modified respectively by the feeding of a new card in one of readers A, B or C.

Similarly, the control of trigger TA, during the sequence comparison operations, can be performed only if coincidence circuit 431*a* is favored simultaneously on both its inputs, which particularly implies a positive voltage across lead 426*a*. This may occur only if trigger BA has been switched after a card has been fed in card reader A. In the opposite case, lead 432*a* is positive, so that coincidence circuit 69*a* is favored, and the control pulse is directed towards trigger TB. The possible elimination of the control signal for triggers TB and TC is performed in quite a similar way. During the inter-series comparison operations, the control of trigger TA can be performed but if coincidence circuit 433*a* is favored simultaneously on its two inputs, which particularly implies a positive voltage of lead 430*a*.

It may be seen that this is the case:

(1) When a card has been fed to card reader A, since lead 426*a* is then positive, and since a branch line of that lead connects to mixing circuit 429*a*;

(2) When a card has been fed in card reader B, since lead 426*b* is positive, then, and since a branch line of that lead connects to mixing circuit 429*a*.

Therefore, trigger TA is controlled whenever a card has been fed to one of card readers A or B. In the case when none of the card readers have received a card, leads 426*a* and 426*b* are both negative, so that lead 430*a* is negative, and coincidence circuits 433*a* and 68*a* are locked. On the other hand, leads 432*a* and 432*b* are at a positive voltage, so that the two inputs of coincidence circuit 434*a* are simultaneously favored, and there appears a positive voltage across lead 435*a*, thus favoring coincidence circuit 67*a*. Thus, the control of trigger TA is prevented. At the same time, the control pulse is directed towards trigger TB. The control of triggers TB or TC during the inter-series comparison operations, may be eliminated in a similar way.

PARTIAL SUPPRESSION OF SOME INTER-SERIES COMPARISONS

One may wish to perform only a series of sequence comparison operations in some fields. In such a case, it is necessary to neutralize the inter-series comparison operations. This is accomplished by applying a positive voltage to hub 405 (FIGURE 4*b*). By interconnecting for example, hubs 405 and 402 (see also FIGURE 4*c*), all inter-series comparisons corresponding to the control of trigger Q2 will be suppressed. Then coincidence circuit 389 is favored on both its inputs (when lead 286 is positive, and on the switching of trigger Q2) and delivers a positive voltage to lead 390 (see also FIGURES 4*c* and 4*d*). Coincidence circuits 388 thus are locked, and therefore lead 386 is negative, so that the comparison results which may be recorded in triggers F and H (FIGURE 4*q*) cannot be read-out. At the same time, lead 418 (FIGURE 4*d*) is positive (see also FIGURE 4*h*), which provides the already described results. The scanning chains are not positioned because coincidence circuit 192 is locked and because the voltage of leads 181 and 187 (see also FIGURE 4*i*) is now positive. Lead 232 conforms to the voltage of lead 125, which makes an anticipated restoration of trigger B8 possible, and as well trigger B6 is switched. The results have already been described (switching of one of triggers TB, TC, B17 (FIGURE 4*b*) and restoration of triggers TA, TB, TC to their original state).

CONTROL OF THE FEEDING OF THE CARD READERS

The main function of the inter-series comparison operations is to direct the control of the feeding to the card readers. According to the results of these operations, the triggers of groups HAB, FAB—HBC, FBC—HCA, FCA (FIGURE 4*j*) are either all in their initial state, namely conducting through their right side, or some of them have been switched on the detection of an inequality, and therefore conducting through their left side.

To aid in understanding the way in which the control of the feeding to the card readers is made, and the way in which this control may be made correctly after the state of the triggers of groups HAB, FAB—HBC, FBC—HCA, FCA, the above example should be noted.

Let it be assumed that the cards are grouped in three series A, B, C, having the following respective indices:

| Series A | Series B | Series C |
|---|---|---|
| 07 | 05 | 03 |
| 12-1 | 12-5 | 12-4 |
| 12-2 | 12-6 | 15 |
| 12-3 | 16 | 17-2 |
| 17-1 | 19 | |

Let it be assumed that these cards must be fed in the increasing order of their numbers, and when the numbers are identical, according to sequential order series A, series C and series B.

It may be seen that cards 03, 05, 07 are fed sequentially, then cards 12-1 to 12-3 of the A series, since these cards must be fed first, then card 12-4 of the C series, cards 12-5, 12-6 of the B series, and so on . . . (suffixes 1 to 6, affecting the cards bearing index 12, have been mentioned only to differentiate the various cards from one another, and to indicate their feeding order).

Thus, the problem of the well ordered advance of three series of cards raises at first various difficulties when this advance is desired to be automatic. The composition of each series is not known at first, nor the classification of the various cards of these series with respect to one another, so that it is necessary to perform a prior analysis of each new incoming card and a systematic comparison of these indices with those of the already fed cards. Thus, it may be known how the various cards are classified with respect to one another, and it will suffice to feed systematically the card corresponding to the lower index to solve properly the whole problem concerning the card feeding. If there are two or more cards bearing the same index number, it will suffice to use the priority rules, i.e. to feed first the card of the A series, then the cards of the C series, and at last the cards of the B series.

It was seen that all newly fed cards in any one of card readers A, B or C was recorded first and respectively, into memories M1, M2 and M3 and stored therein until the following card of the same series is fed. Let it be supposed that cards A07, B05, C03 are fed and recorded into memories M1, M2, M3 provided for that purpose. It is possible to determine which is the first card reader to be fed by systematically comparing the index numbers of the various cards, two by two, i.e. by making the following comparisons:

AB BC CA

Then, knowing the particular result of each comparison, it is possible to deduct therefrom the result. The latter always corresponds to one of the following results:

(1) One card lower than two others, which may be indifferently any one of cards A, B or C (there may exist any relation between the two other cards—equal or unequal);

(2) Two equal cards, lower than the third one (which would be the case for cards bearing respectively index numbers 07, 07, 12);

(3) Three equal cards.

In the illustrative example (analysis of cards A07, B07, C03), card C03 is less significant, so that it is necessary to feed first card reader C. Card C12–4 is thus advanced and recorded into the corresponding memory, i.e. memory M3, so that the next comparison will now concern cards A07, B05 and C12–4 (prefixed A, B and C are no part of the index numbers, but are used only to indicate to which series the various cards under consideration belong).

Let us examine the various possible cases, according to whether the card bearing index number 03 belongs to one of series A, B or C, or according to whether the same index number may be found simultaneously in two or three series.

(A) COMPARISON OF CARDS A03, B05, C07

As seen before, trigger TA (FIGURE 4*b*) controls the comparison of the index numbers of cards A and B and causes, after that comparison, the switching of trigger FAB (FIGURE 4*j*) because the index number of card A is the lower. Similarly, trigger TB, which controls the comparison of the index numbers of cards B and C, switches trigger FBC, following that comparison, because the index number of cards B is lower than that of card C. Trigger TC, after the comparison between the index numbers of cards C and A, causes trigger HCA to switch, because the index number of card C is greater than that of card A. Leads 266*a*, 266*b*, and 264*c* (FIGURE 4*j*) are then at a positive voltage (because the triggers from which they derive are switched) so that coincidence circuit 439*a* (FIGURE 4*k*) is favored and delivers a positive voltage to lead 442*a*. Lead 438*a* from mixing circuit 445*a* will also deliver a positive voltage. The latter voltage indicates that a feeding operation in card reader A is to be performed.

(B) COMPARISON OF CARDS A05, B03, C07

Without going into the details, it will be seen that the switch triggers are HAB, FBC, HCA (see FIGURES 4*j* and 4*k*). Leads 264*a*, 266*b*, 264*c* are positive so that coincidence circuit 439*b* is favored on both its inputs and delivers a positive voltage to leads 442*b* and 438*b*. As in the preceding case, the positive voltage of lead 438*b* indicates that a feeding operation has to be performed in card reader B.

(C) COMPARISON BETWEEN CARDS A05, B07, C03

The switched triggers are triggers FAB, HBC, FCA. Leads 266*a*, 264*b* and 266*c* are positive, so that coincidence circuit 439*c* is favored on both its inputs and delivers a positive voltage to leads 442*c* and 438*c*. The voltage of the latter lead indicates that a feeding operation has to be performed in card reader C.

(D) COMPARISON BETWEEN CARDS A03, B03, C07

The triggers switched are triggers FBC, HCA, Lead 264*c* in particular is positive, as is lead 261*a*, the latter because triggers HAB and FAB are in their initial state. Thus coincidence circuit 440*a* is favored on both its inputs and delivers a positive voltage to lead 443*a*. As the latter particularly connects to mixing circuit 445*a* and 445*b*, and results simultaneously in the application of a positive voltage to leads 438*a* and 438*b*, thus indicating that card readers A and B are simultaneously enabled to perform a feeding operation.

(E) COMPARISON BETWEEN CARDS A07, B03, C03

The triggers switched are triggers HAB and FCA. Leads 261*b* and 266*c* in particular are positive so that coincidence circuit 440*b* is favored on both its inputs and delivers a positive voltage to leads 443*b*, 438*b* and 438*c*.

(F) COMPARISON BETWEEN CARDS A03, B07, C03

The triggers switch are triggers FAB, HBC, so that a positive voltage is applied to leads 266*a* and 261*c*. Coincidence circuit 440*c* is favored simultaneously on both its inputs, thus causing a positive voltage to be applied to leads 443*c*, 438*a* and 438*c*.

(G) COMPARISON BETWEEN CARDS A03, B03, C03

None of triggers HAB, FAB—HBC, FBC—HCA, FCA is switched. Leads 261*a* and 261*b* in particular are positive, so that coincidence circuit 441 is favored on both its inputs and delivers a positive voltage to lead 444. As the latter connects to mixing circuits 445*a*, *b*, *c*, it results simultaneously in a positive voltage across leads 438*a*, 438*b*, 438*c*, thus signalling that all the card readers are simultaneously able to perform a feeding operation. Let it be also mentioned that a branch line of leads 444 and 443*a*, *b* and *c*, connects to mixing circuit 446. Therefore, a positive voltage is applied to hub 447 whenever one of these leads is itself positive.

FEEDING PRIORITY

The circuits of FIGURE 4*k* are arranged so as to provide, when there is no other special control, a general priority to card reader A with respect to card readers B and C, and a priority to card reader B over card reader C. Leads 438*a*, *b* and *c*, being all positive, inverters 448 and 448*a* deliver on leads 449 and 449*a* negative voltages which lock coincidence circuits 450 and 451 and cause a negative voltage to be applied to leads 452*b* and 452*c*. It being supposed that no connection has been made between hub 447 and hubs 453*a*, *b* and *c*, hubs 454*a*, *b* and *c*, are negative, so that lead 455 also is negative. In such a case, inverter 456 restores lead 452*a* to a positive voltage, which is applied to mixing circuit 457*a*, lead 458*a* and one input of coincidence circuit 459*a*. Under the same conditions, mixing circuits 457*b* and 457*c* receive on both their inputs a negative voltage, so that there is a negative voltage on leads 458*b* and 458*c* and one input of coincidence circuits 459*b* and 459*c* is locked.

If it is assumed that no positive voltage is applied to hubs 460*a*, *b* and *c*, leads 461*a*, *b* and *c* are negative, to that lead 462 is also negative. Inverter 463 restores lead 464 to a positive voltage which is applied to one input of coincidence circuits 459*a*, *b* or *c*. It does not change anything for the two latter since their second input 458*b* or 458*c* is negative. Coincidence circuit 459*a*, on the contrary, receives on its second input the voltage of lead 458*a*, now positive, and on a third input, the voltage of lead 438*a*, also positive. It is therefore favored on its three inputs and delivers a positive voltage to leads 465*a* and 466*a*. As will be seen, the positive voltage of lead 466*a* will permit subsequent control of relay 10A (FIGURE 4*l*) which has for its function the advance of the cards towards card reader A.

Let it be assumed that the three series of cards have respectively for index numbers:

| Series A | Series B | Series C |
|---|---|---|
| 12-1<br>12-2<br>12-3<br>17 | 12-4<br>12-5<br>18 | 12-6<br>15 |

numbers 1 to 6 which are coupled to the cards bearing index number 12 being provided only to indicate the feeding sequence order of these cards.

The comparison of cards 12–1, 12–4 and 12–6 shows a triple equality, so that a positive voltage is applied to lead 466a (FIGURE 4*k*) and relay 10A (FIGURE 4*l*) is energized as just seen. Card reader A thus feeds a new card, whereas all the cards previously fed advance one position. The next comparison will concern cards 12–2, 12–4 and 12–6. Once more a triple equality results, and therefore a new feeding operation in card reader A, so that the next comparison is made between cards 13–3, 12–4 and 12–6. Generally, there will take place a series of successive feeding operations in card reader A, until the running out of the cards having the same index number as the cards momentarily waiting in card readers B and C. In the case of the example, there will occur a series of successive feeding operations which will go on until the card bearing index number 17 is recorded so that subsequently, there will occur the comparison operations concerning cards 17, 12–4 and 12–6. Consequently, triggers HAB and FCA are switched (FIGURE 4*j*). The voltage of lead 438a (FIGURE 4*k*) goes negative, whereas leads 438b and 438c remain positive, this voltage being applied to leads 438b and 438c through coincidence circuit 440b (instead of 441 as previously in the case of triple equality).

Lead 438a being negative, coincidence circuit 459a is locked, so that a negative voltage is applied in particular to lead 466a and any other control of card reader A is prohibited. Parallelly, inverter 448 restores a positive voltage to lead 449, which connects to coincidence circuit 451. The latter has for its second input a branch line of lead 452a, which, as seen above, is now positive. Consequently, a positive voltage is applied to leads 452b and 458b, and coincidence circuit 459b is favored on its three inputs and delivers a positive voltage to leads 465b and 466b. As in the preceding case, the positive voltage of lead 466b permits relay 10B to be controlled subsequently, which controls the advance of the cards towards card reader B. Thus the latter feeds a new card, whereas, the cards previously fed are all advanced one position. In the described example, the new comparison will be made between cards 17, 12–5 and 12–6, which causes triggers HAB and FCA to be switched once more (FIGURE 4*j*). As previously, therefore, a negative voltage is applied to lead 438a (FIGURE 4*k*), a positive voltage to leads 438b and 438c and therefore a positive voltage to lead 466c, which causes another card to be fed to card reader B. Generally, there will occur a series of successive feeding operations to card reader B, until the running out of the cards bearing the same index as the card momentarily stored in card reader C, i.e. in the described example until the card bearing card number 18 is recorded. The subsequent comparison operations will concern cards 17, 18, and 12–6, thus causing triggers FAB, HBC and FCA (FIGURE 4*j*) to be switched. Consequently, as already seen, coincidence circuit 439c is favored on both its inputs and delivers a positive voltage to lead 438c. Leads 438a and 438b, on the other hand, are negative so that coincidence circuits 459a and 459b are locked, thus ensuing a negative voltage of leads 466a and 466b and momentarily prohibiting any other feeding operation in card readers A and B.

Leads 438a and 438b being therefore negative, inverters 448 and 448a restore on leads 449 and 449a, a positive voltage which causes coincidence circuit 450 to be favored on both its inputs and to deliver a positive voltage to leads 452c and 458c. Thus, coincidence circuit 459c is favored simultaneously on its three inputs, delivers a positive voltage to leads 465c and 466c and permits a subsequent energization of relays 10C (FIGURE 4*l*). Card reader C thus feeds a new card, whereas the cards previously fed are all advanced one position. In the described example, this will result in a new series of comparison operations bearing on cards 17, 18 and 16 and causing another feeding operation of card reader C.

It should be noted that the operation is similar when two only of leads 438a, *b* and *c* are supplied a positive voltage. For example, if leads 438a and *b* only are supplied a positive voltage, there occurs first a series of feeding operations in card reader A, which are repeated until it results in a series of comparison operations bringing the triggers of groups HAB, FAB—HBC, FBC—HCA, FCA, to a state so that lead 438a goes negative. These feeding operations are followed with a series of card feeding operations in card reader B which go on until the comparisons occurring after these feeding operations bring lead 438b to a negative voltage. The results are similar if only leads 438a and 438c are supplied a positive voltage. Similarly, if one of leads 438a, *b* or *c* only is applied a positive voltage, control of the feeding of the corresponding card reader results, which is then repeated so long as the comparison operations made after that feeding operation do not change the relative voltages of these various leads.

CHANGES IN THE FEEDING PRIORITY

As will appear from the following, the feeding priorities may be changed at will by properly connecting hubs 447, 447a and 453a to *c* (FIGURE 4*k*).

If it is desired that card readers B and C should feed first, it will suffice to connect hub 447 to one of hubs 453b and 453c. As seen before, hub 447 is positive whenever one of leads 444 or 443a, *b* or *c*, is positive, i.e. whenever two of leads 438a, *b* and *c* are positive. Hub 447 being itself connected to one of hubs 453a, *b* or *c*, a positive voltage is applied to one of leads 454a, *b* or *c*, as well as to lead 455 whenever hub 447 is itself positive. In the same case, leads 452a, *b* and *c* are always negative. Inverter 456 restores lead 452a to a negative voltage which is applied in particular to coincidence circuit 451, thus placing a negative voltage across lead 452b. One of leads 438a and 438b is positive (if not, at least two of leads 438a, *b* and *c* could not be positive). Inverters 448 and 448a therefore place a negative voltage on at least one of leads 449 and 449a, causing coincidence circuit 450 to be locked and a negative voltage to be applied to lead 452c. Consequently, leads 458a, *b* and *c* can be supplied a positive voltage only if positive voltages are applied to hubs 453a, 453b or 453c.

Let it be assumed that hub 447 is connected to hub 453b. This results in a positive voltage across leads 454b and 458b, whenever hub 447 is itself positive, however, it results in controlling the feeding of card reader B only if lead 438b is supplied a positive voltage, i.e. in case of a triple inequality or in case of an equality AB or BC. There is no feeding control if lead 438b is negative, i.e. in case of an equality AC. In the latter case, one of the triggers of groups HAB, FAB—HBC, FBC (FIGURE 4*j*) is switched causing a positive voltage to be applied to leads 268a and 268b. A branch line of these leads reaches mixing circuit 467, thus applying a positive voltage to lead 468 and favoring coincidence circuit 469. It is to be noted that circuit 469 is favored in case of a triple equality, because leads 268a and 268b are then both negative. A branch line of lead 454b connects to coincidence circuit 470b, which has for its second input a branch line of lead 261c. The latter is positive in case of an equality AC and provides a positive voltage across leads 471b and 472. Coincidence circuit 469 is favored on both its inputs and therefore delivers a positive voltage to hub 447a.

If it is assumed that hub 447 is connected to hub 453b, hub 447a must be connected to one of hubs 453a or 453c according to whether it is desired that card reader A or card reader C feed in the second place. One of leads 454a or 454c is thus supplied a positive voltage permitting the application of a positive voltage to one of leads 458a or 458c and also permitting the control of one of card readers A or C in case card reader B is not able to feed. Similar connections and circuits permit:

(1) The control of one of card readers A or B when hub 447 is connected to hub 453*c*, and in case card reader C is not in a position to feed;

(2) The control of one of card readers B or C in case hub 447 is connected to hub 453*a*, and in case card reader A is not in a position to feed.

These connection and devices operate only when at least two of leads 438*a*, *b* and *c* are supplied a positive voltage. If one only of these leads is supplied a positive voltage the control of the card feeding operation is made through previously described circuits.

SIMULTANEOUS CONTROL OF THE CARD READERS

One may cause a simultaneous control of the card readers by inter connecting hubs 473*a*, 473*b* and 473*c*, for example hubs 473*a* and 473*b*, if it is desired to control simultaneously card readers A and B. This control is operative only to the extent that the corresponding leads 438*a*, *b* or *c* are simultaneously positive.

FEEDING IN ABSOLUTE PRIORITY

It is possible to feed some cards in absolute priority, by applying a positive voltage to one of hubs 460*a*, 460*b* or 460*c*. In such a case, one of the leads 461*a*, *b* or *c*, is at a positive voltage, thus applying a positive voltage to one of leads 466*a*, *b* or *c* and permitting subsequently the control of one of relays 10A, 10B or 10C (FIGURE 4*l*). At the same time, lead 462 (FIGURE 4*k*) is supplied a positive voltage so that a negative voltage is applied to lead 464 (because of the presence in the circuit of inverter 463), therefore locking coincidence circuits 459*a*, *b* and *c*.

CARD FEEDING CONTROL FOR CARDS IN WHICH SOME SCANNING FIELDS ARE MISSING

It has already been explained that hubs 400*a*, 400*b*, 400*c* (FIGURE 4*c*) and the homologous hubs referenced 402 and 404 were used to define the respective scanning fields between which the comparisons should be made, that these hubs were operative as well during the sequence comparisons as during the interseries comparisons, and that in particular these hubs were to be connected to hub 417 (FIGURE 4*d*) whenever these hubs were not used to define a scanning field. It was seen that trigger B5 was switched whenever one of the hubs connected to one of hubs 417 was supplied a positive voltage, that the switching resulted in a positive voltage across leads 436 and 418, and a negative voltage across leads 345*a* and 386. The testing of the state of triggers F and H (FIGURE 4*q*) was eliminated in particular.

As will be seen later, various special arrangements are to be made to ensure a correct feeding of the cards.

Let it be assumed that each series of cards is made of a number of cards having respectively as index numbers:

| Series A | Series B | Series C |
|---|---|---|
| 07 | 07–X | 07–Y |
| 12 | 12–X | 12–Y |
| 15 | 15–X | 15–Y |

letters X and Y designating any index number, which may vary from one card to the next, but however having a well determined number of digits. Let us now refer to the comparison operations which are to develop when the cards bearing index number 07 run out, i.e. on the appearance of the first cards bearing index number 12.

As far as the inter-series comparisons are concerned, a first series of operations will be effected on the switching of trigger Q1 (FIGURE 4*b*) concerning index number 12. No inequality will be detected, so that, at the end of that first series of operations, the triggers of groups HAB, FAB—HBC, FBC—HCA, FCA (FIGURE 4*j*) will all be restored to their initial state and will be conducting through their right side. It may be assumed that other comparisons are effected under the control of trigger Q2, which still results in no detected inequality. Thus it may be assumed that the comparisons which have been controlled from trigger QN are effected in the way already explained, hub 404*a* (FIGURE 4*c*) being connected to one of hubs 417.

In the latter case, it was seen that the comparisons controlled from triggers TA and TC (FIGURE 4*b*) were eliminated, and that they are followed with no switching of the triggers of groups HAB, FAB, HCA, FCA (FIGURE 4*j*). These triggers are thus maintained in their initial state, to which there corresponds in particular a positive voltage across leads 261*a* and 261*c*. Only the comparison controlled from trigger TB (FIGURE 4*b*) may cause an inequality to be detected. It will possibly result in the switching of one of triggers HBC, FBC (FIGURE 4*j*) according to the relative value of index numbers X and Y. The state of the triggers of groups HAB, FAB—HBC, FBC—HCA, FCA, is inconsistent, which might cause the cards to be fed incorrectly.

If now the practical problem is examined, it may be remarked that the cards of the A series are cards of a nature quite different from that of the cards of the B and C series, for example name and address cards. In such a case, it is known that such cards are generally printed either as a heading of a statement or at the end thereof, so that it must be possible, at will, to give the priority to the cards of the A series or to the cards of the B and C series. This result is obtained, as will be explained, by connecting hub 404*a* (FIGURE 4*c*) to one of hubs 408*a* or 409*a* (FIGURE 4*j*).

(a) *Connection With Hub 408a*

When hub 404*a* (FIGURE 4*c*) goes positive, hub 408*a* (FIGURE 4*j*) will go positive, thus causing a positive voltage to appear across leads 474*a*, 475*a* and 476*a* and coincidence circuits 477*c* and 478*a* to be favored. The latter have for other inputs:

(1) A branch line of leads 261*c* and 261*a*, so as to make the connection with hub 408*a* operative only if the groups of triggers HAB, FAB or HCA, FCA, are in their initial state.

(2) A branch line of leads 420*c* and 420*a*, so that the connection reaching hub 408*a* is counteracted during the sequence comparison operations and is operative only during the inter-series comparisons.

A positive voltage may be applied to the right side of triggers FAB and HCA thus switching these triggers, causing a positive voltage to be applied to lead 438*a* (FIGURE 4*k*) and therefore causing a card to be fed in card reader A.

The same operations are repeated until the cards of the A series bearing index number 12 are run out. The comparison effected afterwards concerns cards 15, 12–X, 12–Y and causes triggers HAB and FCA to be switched, thus permitting the cards of the B and C series to be advanced. This feeding operation lasts until the cards bearing index number 12 are run out.

(b) *Connection With Hub 409a*

Similarly, it will be seen that the application of a positive voltage to hub 409*a* renders leads 479*a*, 475*a*, 476*c* positive; coincidence circuits 477*a* and 478*c* are favored and triggers HAB and FCA are switched. Consequently, a positive voltage is applied to leads 438*b* or 438*c* (FIGURE 4*k*) according to the state of triggers HBC, FBC and therefore a card of the B and C series is fed. The same operations are repeated until the cards bearing index number 12 run out. The comparison made afterwards concerns cards 12, 15–X and 15–Y and results in switching triggers FAB and HCA, as well as in applying a positive voltage to lead 438a (FIGURE 4*k*). A series of successive feeding operations in card reader A results, until the cards bearing index number 12 are run out.

Similar operations are repeated if the hub which corresponds to no definition of field is hub 404b or 404c (FIGURE 4*c*), or one of the homologous hubs. However, hub 404b must be connected to one of hubs 408b or 409b (FIGURE 4*j*), whereas hub 404c must be connected to one of hubs 408c or 409c.

CONTROL OF SOME SPECIAL PROGRAMS WHEN A SEQUENCE BREAK HAS OCCURRED SUCCESSIVELY IN ALL FEEDING HEADS

Referring to the example which has just been analyzed, it may be remarked that the flow of the cards bearing index number 07, then the flow of the cards bearing index number 12 or 15, indicate a step in the machine operation, and the end of these flows has to be noted, since quite a series of special functions is to be controlled at that moment. If the general operation concerns the account keeping of deposits in a bank, each end of a flow indicates that the operations relating to a given customer are completed, and the operations relating to another customer will be initiated. There exists no relation between the two series of operations, so that it is necessary to avoid mixing them. Various special operations are to be performed when, in particular, the account change occurs and all that relating to the just completed account must be erased. On the other hand, one may wish to perform the computation of the account care expenses, to be able to invoice them to the customer.

As will be seen, the group changes may be detected during the sequence comparisons in association with the control of some of triggers Q1, Q2 . . . (FIGURE 4*b*), and after the scanning fields controlled from hubs 400a, *b*, and *c*, 402a, *b*, and *c* (FIGURE 4*c*), with the prerequisite that hubs 400, 402 . . . should be connected to one of hubs 407 (FIGURE 4*l*). Triggers B15A, B15B, B15C are switched when an inequality is detected, these triggers respectively corresponding to one of card readers A, B, or C. This results in controlling trigger B15 (FIGURE 4*m*) whenever the three preceding triggers are simultaneously switched. Of course, one may provide several units such as that composed of triggers B15, B15A, B15B, B15C.

Let it be assumed that the comparison of the index numbers is controlled from trigger Q1 (FIGURE 4*b*), i.e., from hubs 400a, 400b, 400c (FIGURE 4*c*), hub 400 being connected to one of hubs 407 (FIGURE 4*l*). With reference to the development of the operations from the moment when the cards bearing index number 07 have run out, and when a restoring pulse has been applied to the left side of triggers B15A, B15B, B15C, so as to turn these triggers conductive through their right side, and to drive leads 480a, 480b, 480c negative, the inter-series comparisons concern the cards bearing index number 12. It will be assumed that these cards are all followed with a series of cards bearing the same index number, and that the card feed is made according to the following order: series A, series B, series C. As seen above, there occurs first a series of feeding operations to card reader A, which go on up to the run out of the cards bearing index number 12 and until the occurrence of the first card bearing index number 15. The interseries comparison operations, which occur at that moment, concern index numbers 15, 12 and 12. This results in a series of feed control operations to card reader B, which also go on until the cards bearing index number 12 have run out and until the appearance of the first card bearing index number 15. The interseries comparison operations then concern index numbers 15, 15 and 12. A series of feed control signals in card reader C result, which go on until the cards bearing index number 12 have run out, and until the appearance of the first card bearing index number 15.

SEQUENCE COMPARISONS OCCURRING DURING SUCCESSIVE FEEDING OPERATIONS TO CARD READER A

It will be assumed that the corresponding operations are limited to the scanning fields defined from hubs 400a, 400b, and 400c (FIGURE 4*c*), to which corresponds trigger Q1 being switched (FIGURE 4*b*). It may be seen that triggers TA, TB, TC control the respective comparison operations:

(1) Trigger TA—index number 12 with index number 12 (since the card just fed bears that index number and since this card is supposed to be followed with others bearing the same index number);

(2) Trigger TB—index number 12 with index number 07;

(3) Trigger TC—index number 12 with index number 07.

It will be noted that:

(1) Lead 291 is positive;

(2) Leads 300a, 300b, 300c are successively supplied a positive voltage (according to whether one of triggers TA, TB, and TC is controlled);

(3) Leads 319a, 319b, 319c (FIGURES 4*k* and 4*l*) are successively supplied a positive voltage;

(4) Coincidence circuits 321a, 321b, 321c are successively favored.

The latter also have for other inputs lead 481, as well as leads 426a, 426b, 426c from the right side of trigger BA, BB, BC. As seen before, these triggers are switched respectively whenever there occurs a card feed in one of card readers A, B or C, and they are restored later when the comparison operations are completed. Now only trigger BA is switched, so that lead 426a is positive.

The control of trigger TA (FIGURE 4*b*) is inoperative, since the index numbers compared are identical (12 compared with 12). The control of triggers TB and TC causes index numbers 12 and 07 to be compared. Consequently, trigger H (FIGURE 4*q*) is switched, thus applying a positive voltage to leads 373, 382, and 384, the latter being made positive only when there appears the positive voltage across lead 241. Lead 384 connects to coincidence circuit 482 (FIGURE 4*l*) which is already favored on its second input because one of hubs 407 is supplied with the positive voltage of lead 400 (FIGURE 4*c*). Lead 281 is set then to a positive voltage, but this results in no effect because leads 426b and 426c are negative.

Similar operations are repeated on the successive feeding of the cards bearing index number 12.

When the first card bearing index number 15 appears, trigger TA (FIGURE 4*b*) controls the comparison between index number 15 and index number 12. Consequently, trigger H (FIGURE 4*q*) is switched, a positive voltage is applied across leads 384 and 481 (see also FIGURE 4*l*), and therefore, coincidence circuit 321a is favored on its three inputs. Leads 319a and 426a are at a positive voltage at that moment. Therefore, a positive voltage is applied to the right side of trigger B15A causing it to conduct through its left side. Lead 420a thus goes to a positive voltage. The inter-series comparison operations which develop immediately after concern index numbers 15, 12 and 12. This results in a negative voltage across lead 438a (FIGURE 4*k*), so that the following feed control signal will be applied to card reader B.

SEQUENCE COMPARISONS OCCURRING DURING SUCCESSIVE FEEDING OPERATIONS TO CARD READER B

It may be seen that triggers TA, TB, TC (FIGURE 4*b*) control the respective comparison operations:

(1) Trigger TA—index 15 with index 12 as when trigger B15A (FIGURE 4*l*) has been switched, because no feeding operation has been made in card reader A;

(2) Trigger TB—index number 12 with index number 12, since the card which has just been fed relates to that index number, and this card was followed with several cards bearing the same index number;

(3) Trigger TC—index number 12 with index number 07 as previously.

The comparison being performed at the moment of the control of trigger TA leads to the detection of an inequality, thus causing a positive voltage to be applied to lead 384 (FIGURE 4*q*) when lead 241 is itself positive. This produces no effect since this voltage can operate only coincidence circuits **321*a*** (FIGURE 4*l*) and the latter is locked because of the negative voltage of lead **426*a* (there has occurred a card feeding to card reader B, which has caused trigger BB to be switched, thus making lead 426*b*** positive).

The comparison being made at the moment of the control of trigger TB provides no particular effect because of the identity of the index numbers.

The comparison being made at the moment of the control of trigger TC also causes an inequality to be detected; however, there results no effect therefrom since lead **426*c* is negative, and therefore coincidence circuit 321*c*** is locked.

Similar operations are repeated during each successive feeding operation in card reader B, so long as the card newly fed bears index number 12.

When the first card bearing index number 15 appears, there occurs a change in the relative value of the index numbers compared under the control of trigger TC FIGURE 4*b*), which change causes an inequality to be detected. Lead 384 goes positive, so that coincidence circuit **321*b* is favored on its three inputs. This results in the application of a positive voltage to the right side of trigger B15B, thereby switching it, and applying therefore a positive voltage to lead 480*b*. The inter-series comparison operations which develop immediately after concern index numbers 15, 15 and 12. As already seen, this results in a negative voltage on leads 438*a* and 438*b*** (FIGURE 4*k*), so that the following feeding operations will concern card reader C.

SEQUENCE COMPARISONS OCCURRING DURING THE SUCCESSIVE FEEDING OPERATIONS IN CARD READER C

It will be seen that triggers TA, TB, TC (FIGURE 4*b*) now control the respective comparison operations:

(1) Trigger TA—index number 15 with index number 12, as previously;

(2) Trigger TB—index number 15 with index number 12, as when trigger B15B (FIGURE 4*l*) has been switched, since the feeding operations to card reader B are momentarily stopped;

(3) Trigger TC—index number 12 with index number 12, since the card just fed bears index number 12, and this card was assumed to be followed with several cards bearing the same index number. Similarly, trigger BC is switched (FIGURE 4*l*) on each feeding operation.

The comparisons effected on the energization of triggers TA and TB permit an inequality to be detected, but there is no other effect since leads **426*a* and 426*b*** (FIGURE 4*l*) are now positive. The comparison effected at the moment of the energization of trigger TC is inoperative because the index numbers compared are identical. One of the compared index numbers changes when the first card bearing index number 15 is advanced. This results in a positive voltage across lead 384 (FIGURE 4*q*) when lead 241 itself goes positive, so that coincidence circuit **321*c*** is favored on its three inputs (FIGURE 4*l*) and trigger B15C is controlled. Thus lead **480*c* goes positive, so that coincidence circuit 483 is favored on its three inputs and delivers a positive voltage to lead 484. This voltage is applied to the right side of trigger B15** (FIGURE 4*m*) thus causing this trigger to be switched, and a positive voltage to be applied to lead 110. Coincidence circuits **489*a*, 489*b*, 489*c*** (FIGURE 4*l*) are thus favored on one input.

It being further supposed that hub 400 (FIGURE 4*c*) is connected to one of hubs 406 (FIGURE 4*l*), positive voltages are again applied to the left side of triggers EAB, EBC, ECA, thereby making these triggers conductive on their right side, and applying a negative voltage to leads **486*a*, 486*b*, 496*c*. Coincidence circuits 485*a*, 485*b*, 485*c*** have respectively for other inputs:

(1) A branch line of lead 487 from hub 406 which is now positive;

(2) A branch line of lead 291 which is also positive;

(3) Two of leads **420*a*, 420*b*, 420*c***.

Therefore, the coincidence circuits are favored on their four inputs, thus causing a positive voltage to be applied to the left side of the above-mentioned triggers. It may be noted that this quadruple energization of the coincidence circuits occurs for coincidence in card reader B, and that it is repeated whenever a card is fed to card reader C. The restoration of trigger EAB is made when the card feed to card reader B is interrupted (and each time is switched again immediately after).

Let us refer now more in detail to the inter-series comparison operations which are effected then, hub 400 (FIGURE 4*b*) is connected to one of hubs 406 (FIGURE 4*l*), and to one of hubs 488. Lead 286 (FIGURE 4*b*) is then at a positive voltage and causes a positive voltage to be applied to leads **420*a*, 420*b*, 420*c*** (FIGURE 4*k*) successively, and causes one input of coincidence circuits **423*a*, 423*b*, 423*c*** (FIGURE 4*l*) to be favored. The control of trigger TA (FIGURE 4*b*) causes two identical index numbers to be compared (during the time trigger Q1 is switched). Consequently, none of triggers F and H are switched (FIGURE 4*q*), so that leads 372 and 375 are maintained at a positive voltage. Therefore, coincidence circuit **84*a* may be favored on its three inputs when the positive voltage across lead 241 occurs, thus causing a positive voltage on lead 381. A branch line of that lead particularly connects to coincidence circuit 423*a*** (FIGURE 4*l*) which is already favored on its two other inputs since leads **420*a* and 487 are positive now. Consequently a positive voltage is applied to the right side of trigger EAB, which causes a positive voltage to be applied across lead 486*a*. It is to be pointed out that the same results are repeated whenever leads 420*a*, 487, and 381** are simultaneously at a positive voltage, i.e., whenever an inter-series comparison, controlled by the cooperation of triggers Q2 and TA (FIGURE 4*b*) shows an identity. (It might be the same for the comparison controlled by the combined action of triggers Q2 and TA, with the requirement that hub 402 (FIGURE 4*c*) is connected also to one of hubs 406, FIGURE 4*l*.)

It may be shown in the same way that the combined action of triggers Q1 and TB (FIGURE 4*b*), Q1 and TC causes two identical index numbers to be compared (in the given case); consequently, a positive voltage is applied to the right side of triggers EBC and ECA (FIGURE 4*l*) which are thereby conductive through their left side, thus causing a positive voltage to be applied to leads **486*b* and 486*c*. As mentioned with reference to trigger EAB, the same results are repeated for triggers EBC and ECA, whenever leads 487, 381, 420*b* or 420*c*** are simultaneously positive.

If no inequality has been detected, the triggers of groups HAB, FAB—HBC, FBC—HCA, FCA (FIGURE 4*j*) are all in an equality condition, and it was seen that, in such a case, leads **438*a*, 438*b*, 438*c*** (FIGURE 4*k*) are all positive. A branch line of the latter leads connects to coincidence circuits **489*a*, 489*b*, 489*c*** (FIGURE 4*l*) which, as seen, are already favored on one input because lead 110 is positive.

The control of trigger TC (FIGURE 4*b*) is followed, as seen, by the control of trigger B17. The control of trigger Q2 and the restoration of trigger Q1 to its initial state occur afterwards. Hub 400 (FIGURE 4*c*), therefore, is always positive, and so is consequently that of hubs 488 (FIGURE 4*k*) to which the former was supposed to be connected. Lead 282 (FIGURE 4*b*) is also at a positive voltage (since trigger B17 is switched), as is lead 286. Coincidence circuit 490 (FIGURE 4*k*) is favored on its three inputs, thus causing a positive voltage to be applied to lead 491, which voltage is applied also to coincidence circuits 489*a*, 489*b*, 489*c* (FIGURE 4*l*). The latter are thus favored on their three inputs, thereby applying a positive voltage to the left side of triggers B15A, B15C. The state of these triggers is switched, so that their right side is made conducting, and a negative voltage is applied to leads 480*a*, 480*b*, 480*c*. Consequently, coincidence circuit 483 is locked, thus preventing any new control of trigger B15 (FIGURE 4*m*). At the same time, coincidence circuits 485*a*, 485*b*, 485*c* (FIGURE 4*l*), are also locked, thus preventing momentarily triggers EAB, EBC, ECA from being switched. These triggers are now conducting through their left side (since it is assumed that there is a triple equality). During the inter-series comparisons which will be performed later on, they may be supplied positive voltages on their right side; however, these voltage applications will be momentarily inoperative since they are only able to make the triggers conductive through their left side, and that these triggers are already conducting through that side.

It has been seen that the restoration of triggers B15A, B15B, B15C, has been placed under the control of the voltage of leads 438*a*, 438*b*, 438*c* (FIGURE 4*k*) and that this restoration is made now at the end of the switching time of trigger Q1, i.e., when the inter-series comparison operations are not wholly completed. There are two reasons therefore.

The cards series may be composed in one of the following ways:

FIRST CASE

| Series A | Series B | Series C |
|---|---|---|
| 07<br>12<br>15 | 07-X<br>12-X<br>15-X | 07-X<br>12-Y<br>15-Y |

i.e. cards bearing index number 12 followed, in all series by cards bearing index number 15, letters X and Y representing any index number existing but in series B and C.

SECOND CASE

| Series A | Series B | Series C |
|---|---|---|
| 07<br>12<br>15<br>32 | 07-X<br>12-X<br>27-X<br>32-X | 07-Y<br>12-Y<br>15-Y<br>29-Y |

I.e. card bearing index number 12 followed with cards bearing any index number, letters X and Y having the same meaning.

In such a case, the control of trigger B15 (FIGURE 4*m*) must occur after the cards bearing a common index number have run out. Therefore, in the second case, this control occurs:

(1) After the cards bearing index number 07, which may be found in all series, have run out;

(2) After the cards bearing index number 12, which may be found in all series, have run out;

(3) After the cards bearing index number 15, which may be found only in series A and C, have run out;

(4) After the cards bearing index number 27, which are found only in the B series, etc. . . ., have run out.

Consequently, for the cards bearing index number 15, only the feeding in cards readers A and C need be controlled. This will result in the control of triggers BA and BC (FIGURE 4*l*), so that only triggers B15A and B15B will be switched when needed. The switching of trigger B15B will not occur because card reader B will not be fed, and therefore, trigger BB will not be picked up.

Similarly, for the cards bearing index number 27, only card reader B need be controlled by controlling only triggers BB and B15B.

Consequently, triggers B15A, B15B, B15C are to be restored only in proportion to the feeding of the cards which feeding will be performed after this restoration which will permit triggers BA, BB, BC, to be controlled, and will therefore permit the control of same triggers (B15A, B15B, B15C). The voltage state of leads 438*a*, 438*b*, 438*c* (FIGURE 4*k*) indicates which card readers will be operated, so that it will suffice to condition the restoration of triggers B15A, B15B, B15C (see also FIGURE 4*l*) to the voltage state of leads 438*a*, 438*b*, 438*c* to solve completely the problem. Thus, those of triggers B15A, B15B, B15C, which correspond to card readers which are not to feed will be maintained in their initial condition. Leads 438*a*, 438*b*, 438*c* are positive after the cards bearing index number 07 have run out. All triggers B15A, B15B, B15C will then be restored since index number 12 which appears afterwards may be found in all the series. Only leads 438*a* and 438*c* are positive after the cards bearing index number 12 have run out. Then triggers B15A and B15C only will be restored, since index number 15 which appears then is found only in series A and C. Similarly, only lead 438*b* is positive after the cards bearing index number 15 have run out; consequently, only trigger B15B will be restored, since index number 27 which comes afterwards is found only in the B series, etc.

The voltage condition of leads 438*a*, 438*b*, 438*c* is not definitive. This voltage condition results from the inter-series comparison operations which are generally performed under the control of trigger Q1 (FIGURE 4*b*). This may be modified during the comparison operations controlled on the switching of any one of triggers Q2 . . . QN, since these operations may cause inequalities to be detected, and some of the triggers of groups HAB, FAB—HBC, FBC—HCA, FCA (FIGURE 4*j*) to be switched. It was seen that the voltage condition of leads 438*a*, 438*b*, 438*c* (FIGURE 4*k*) depends upon the condition of these latter triggers, and it was seen also that the condition of these triggers could be modified by connections made with one of hubs 408*a*, 408*b*, 408*c* or 409*a*, 409*b*, 409*c* (FIGURE 4*j*).

It was further seen that contacts (7A–1, 7B–1, 7C–1, FIGURE 4*a*) were maintained closed whenever the corresponding card reader was unused. This resulted in a positive voltage on one of leads 271*a*, 271*b*, 271*c*, which voltage is applied to the right side of triggers B15A, B15B, B15C (FIGURE 4*l*), respectively. All among these triggers corresponding to an unused card reader are thus maintained in such a state that they are conducting through their left side.

The control of triggers B15A, B15B, B15C may be placed, if needed, under the control of two or more scanning fields, for example, under the control of the scanning fields corresponding to the successive control of triggers Q1 and Q2 (FIGURE 4*b*). In such a case, hubs 407 (FIGURE 4*l*) must be connected both to hubs 400 and 402 (FIGURE 4*c*). As concerns hubs 488 (FIGURE 4*k*) which control the restoration of triggers B15A, B15B, B15C, it is necessary to connect them only to hub 402.

*Card Matching Check*

It has been explained previously how triggers EAB, EBC, ECA (FIGURE 4*l*) were successively switched and restored to their initial state, thus causing a positive voltage to be applied to one of leads 486*a*, 486*b*, 486*c* (when the corresponding triggers are switched) or 492*a*, 492*b*, 492*c*, when the triggers are in their initial state. These triggers are switched respectively whenever leads 381, 487, and 420*a*, 420*b*, 420*c* are positive simultaneously. Their restoration is initiated during the sequence comparisons (lead 291 positive), as soon as two of triggers B15A, B15B, B15C are switched (to be switched back immediately after, if the corresponding conditions are again met).

These triggers are provided to deliver, during the card feeding operation, various pulses indicating the matching or unmatching state of the card just advanced with respect to the cards of same group which are about to be advanced or already advanced.

Leads 493*a*, 493*b*, 493*c* (FIGURE 4*m*) are normally negative. They are connected to negative terminal 146 through resistance 498. On the occurrence of the feed control signal of one of the card readers, control of card reader A for example, one of leads 493*a*, 493*b* or 493*c*, is brought to a positive voltage because it is then connected to the positive terminal 144 through the corresponding contacts C3A, C3B or C3C. Consequently, according to the state of triggers EAB, EBC, ECA (FIGURE 4*l*), a positive voltage is applied to one of the hubs generally referenced 494, 495, 496, and 497. Two of hubs 494*a*, 495*a*, 496*a*, and 497*a*, for example, are supplied with a positive voltage when a card is fed to card reader A. Hubs 494*a* and 495*a*, if positive, are used to indicate that the card previously advanced in card reader A has at least one card corresponding thereto in the cards which are advanced or to be advanced in card readers B and C, respectively. Under the same conditions, hubs 496*a* and 497*a*, if positive, are provided to indicate that the card previously advanced has no equivalent among the cards of card readers B or C, respectively. Hubs 494, 495, 496, and 497 further referenced *b* or *c* have similar functions with respect to the cards fed in card readers B and C, respectively.

With the voltages applied to the hubs generally referenced 494, 495, 496, and 497, it is possible to cause various special functions according to the case which occurs (control or noncontrol of the computation programs). It is possible to perform at the same time a sorting of the cards according to whether they have caused a computation or not.

Several devices, such as that formed with triggers EAB, EBC, ECA may be provided, and these devices may be associated with other groups of triggers similar to triggers B15A, B15B, B15C and performing the same function.

*Completion of the Inter-series Comparison Operations*

On the completion of the inter-series comparison operations, triggers ON and B17 (FIGURE 4*b*) are simultaneously switched. Leads 282 and 283 are then positive as is lead 286 because of the state of trigger HV. Consequently, coincidence circuit 284 is favored on both its inputs, a positive voltage is applied to lead 285, coincidence circuit 287 is favored on both its inputs, and lead 288 is also supplied with a positive voltage. The voltage of lead 290 is thus maintained positive, which prevents trigger Q1, TA, TB or TC from being switched again.

Lead 312 conforms to the voltage of lead 134 or remains positive. Thence, under the same conditions, trigger B17 is restored to its initial state.

A branch line of lead 288 connects to coincidence circuit 499 (FIGURE 4*m*) and to mixing circuit 100, thus driving lead 245 positive. Consequently coincidence circuits 499 and 247 are favored, since they have for another input lead 134. Two switching pulses are thus applied to the left side of triggers B3 and B11. These pulses occur on the return of lead 134 to a positive voltage, and therefore, at the same time as trigger QN and possibly B17 are switched back to their initial state (FIGURE 4*b*). The voltage of lead 108 (FIGURE 4*m*) thus goes negative. Leads 174 and 167 on the other hand go positive. The voltage of the latter lead is applied to the left side of trigger B17 (FIGURE 4*b*), which restores this trigger to its initial state if it is not already in such state.

*Control of Relays 10A, 10B, 10C (FIGURE 4l)*

All the operations which are performed on each card feed after the control of trigger B11 (FIGURE 4*m*) have been described. As seen, these operations are followed with other operations controlled from any one of triggers B12, B13, B14, since it was seen that one at least of these triggers was controlled on each card feed. This results in a new control of trigger B2 which causes a positive voltage on lead 116. Coincidence circuit 166 is thus favored on both its inputs, thus causing a positive voltage to be applied to lead 169, coincidence circuit 171 to be favored on both its inputs (in case trigger B12 has been controlled) and a positive voltage to be applied to hub 129. The function of that hub has already been explained. A branch line of lead 169 connects to coincidence circuit 501, which has for its second input a branch line of lead 107 which is now positive since trigger B16 is systematically controlled on each card feed. Consequently, the coincidence circuit 501 is favored on both its inputs, a positive voltage is applied to lead 502 and coincidence circuits 503*a*, 503*b*, 503*c* (FIGURE 4*l*) are favored. Some of thyratrons 504*a*, 504*b*, 504*c* are thus controlled according to the voltage state of leads 466*a*, 466*b*, 466*c*, and cause the corresponding one of relays 10A, 10B, 10C to be energized. The relays are held afterwards through contacts 10A–1, 10B–1, or 10C–1 (FIGURES 21*b*, 21*c* or 21*d*), when contacts C10–*a*, C10–B or C10–C are closed again.

*Control of Transfers From Memories M1, M2, M3 to Memories M4, M5, M6*

Let it be noted first that triggers B11 and B16 (FIGURE 4*m*) are controlled systematically on each card feed, at the same time as some of triggers B12, B13, B14 according to the connections of hubs 148, 148*a*, 148*b* and hubs 158, 158*a*, and 158*b*. Trigger B15 is controlled occasionally, for example, whenever a triple inequality has been detected and triggers B15A, B15B, B15C (FIGURE 4*l*) are simultaneously switched. It has been seen how triggers B11, B12 (FIGURE 4*m*) operated and how these triggers were restored to their initial state at the end of the program.

The programs controlled from triggers B11, B12, B13, B14, and possibly B15 being completed, there occurs a new control of trigger B2 since lead 107 is positive. Lead 116 being at a negative voltage, a positive voltage is also applied to leads 169, 169*a*, 169*b*, 169*c*, 169*d*, since coincidence circuits 166, 172, 172*a*, 172*b* and 172*c* are simultaneously favored on both their inputs. Coincidence circuit 171*d* is also favored on both its inputs, so that a positive voltage is applied to lead 251 and to lead 505. Thus a positive voltage is applied to the left side of triggers BA, BB, BC (FIGURE 4*l*) which results in restoring to their initial state all the triggers which might happen to be switched. This restoration is necessary because if it is trigger BA for instance which is switched, the following feed control may operate one of card readers B or C, thus causing one of triggers BB or BC to be controlled.

The positive voltage of hub 251 (FIGURE 4*m*) is used to control the general transfer of memories M1, M2, M3 to memories M4, M5, M6. It was seen that it was simpler or, at any rate quicker, to record respectively into memories M1, M2, M3 the cards advanced in front of the prescanning stations of card readers A, B, and C, and then to transfer the content of these memories to memories M4, M5, M6 rather than at the same time performing the recording into memories M1, M2, M3 from the prescanning station of each card reader and record into memories M4, M5, M6 from the operation station of the same card readers.

The transfer must be performed only to the memories corresponding to the card readers which are actually to perform a feeding operation.

The control of the transfer program may be performed as indicated in FIGURE 23. It will be noted that relays 10A, 10B, and 10C (FIGURE 4*l*) are energized if the corresponding card reader performs a feeding operation, several relays being possibly energized simultaneously in case some of leads **438*a*, 438*b*, 438*c*** (FIGURE 4*k*) are simultaneously positive, or some of hubs **473*a*, 473*b*, 473*c* are interconnected. Contacts 10A–2, 10B–2, 10C–2** (FIGURE 23) are off or transferred as the case may be.

The connections to be made are the following:

(1) Hub 251 (FIGURE 4*m*) to hub 506 (see also FIGURE 23).

(2) Hub **507*a* to one of hubs 130** (FIGURE 4*h*) provided for the control of program steps, for example, to the hub for controlling the program step bearing index number 71.

(3) Similarly, hub **507*b* to that of hubs 130 which permits control of the program step bearing, for example, number 72**.

(4) Similarly, hub **507*c* to that of hubs 130 which permits control of the program step bearing reference number 73**.

(5) The hub 137 corresponding to the program step bearing reference number 71 to hub **508*a***.

(6) The hub 137 corresponding to the program step bearing reference number 72 to hub **508*b***.

(7) The hub 137 corresponding to the program step bearing reference number 73 to hub **508*c*, which must be further connected to hub 509** (FIGURE 4*m*).

It is seen that the program step bearing number 71 is controlled only when contact 10A–2 is transferred, i.e., when there is to be a card feed to card reader A. In another case, the control pulse is directed towards program 72 or program 73. Similarly, program 71 controls program 72, only when there is to be a card feed to card reader B. In still another case, the control is directed towards program 73 or towards hub 509.

Hubs 138 must be connected as a whole to a hub 510 (unshown in FIGURES 4*a* to 4*q*), controlling the transfer from one memory to another. Hubs 139 and 140 must be connected as represented to some of hubs 149 (FIGURE 4*h*), for example, to those among hubs 149 which are further referenced 33 to 38. The corresponding hubs 159 must be connected as a whole to that among hubs 153 (FIGURE 4*d*) which are further referenced 80. The corresponding hubs 150 (FIGURES 23 and 4*h*) must be connected respectively:

(1) To hubs 132–1 (FIGURE 4*c*) and 132–4 (the latter being unshown) for program 71.

(2) To hubs 132–2 and 132–5 for program 72.

(3) To hubs 132–3 and 132–6 for program 73.

Program 71 thus controls the transfer from memory M1 to memory M4, thus making the former available for a new record. Programs 72 and 73 control also respectively the transfers from memory M2 to memory M5 and the transfer from memory M3 to memory M6. The control of each program is effected in a way quite similar to that described. Finally, trigger B16 is restored to its initial state in a way similar to that described when the positive voltage occurs on hub 509 (see also FIGURE 23).

Leads 107, 108, **109*a*, 109*b*, 109*c*, 110 are thus all negative, so that a negative voltage is applied to leads 117. The later locks coincidence circuit 118** (FIGURE 4*i*), thus causing the pulse distributor to stop.

*Main Circuits*

Main switch 513 (FIGURE 21*a*) being switched, row leads 514, **514*a* are all supplied with a voltage, thus causing motors 515 to start and feeding unit 516 to be operated. The terminal and row lead 517 are thus supplied with a voltage permitting the relay circuits to be fed to. Other terminals 518, 519 permit the delivery of various positive and negative voltages necessary to the energization of the electronic circuits. Motors 515 control the continuously rotating mechanisms of card readers 48*a*, 48*b*, 48*c* (FIGURE 1) of printing unit 50 and of punching unit 51**.

Switch **521*a*** (FIGURE 21*b*) must be closed if work requiring the use of card reader A is performed. Similarly, for switch **521*b*** (FIGURE 21*c*) if a work requiring use of card reader B is performed and for switch **521*c*, if the work performed requires card reader C. The three switches 521*a*, 521*b*, 521*c* must be closed, if work requiring the simultaneous use of the three card readers is performed. Relays 1A, 1B, 1C** (FIGURES 21*b* to 21*d*) are then picked up as soon as lead 517 is supplied a voltage. These relays are maintained energized up to the opening of main switch 513 (FIGURE 21*a*).

Cards having been arranged in the hoppers of card readers A, B, and C, contacts **510*a*, 510*b*, 510*c*** (FIGURES 21*b* to 21*d*) are closed, thus causing relays 2A, 2B, 2C to be energized.

The starting of all the units may be accomplished in two ways as follows:

(1) By operating for a short time push button 522 (FIGURE 21*a*). In such case, one card feeding operation only is performed in one of card readers A, B or C, and the whole unit stops.

(2) By operating push button 523. In such a case, the machine operates in an automatic manner and stops only when there appears one of the usual stop causes. Among the latter are:

(*a*) A manual operation of stop button 524, (*b*) A card run-out in one of the hoppers, causing one of contacts 2A–3, 2B–3, 2C–3 to open, (*c*) The filling-up of one of the stackers.

Relays 1A, 1B, 1C, 2A, 2B, 2C (FIGURES 21*b* to 21*d*) being all energized operating switch 523 (FIGURE 21*a*) causes relay R34 to be energized through contact 524, contacts 2A–3, 2B–3, and 2C–3 are closed, and contacts **525*a*, 525*b*, and 525*c* are in the off condition. Relay R34 is maintained through its contact R34–*a* and causes relay R–35 to be energized through its contact R34–*b*. Contacts C4–A, C4–B, C4–C are then closed because all the feeding units are stopped and the closing times of contacts C4–A, C4–B, C4–C have been arranged so that these contacts are closed at that moment. It will be noted that operating push button 522 gives the same results as the closing of contact R34–*b*. Relay R35 causes contact R35–*a*** (FIGURE 4*m*) to be transferred, which results as seen previously in a positive voltage being applied to the right side of trigger B16, and therefore the trigger is switched. Lead 107 goes positive, as does lead 117, thus starting the pulse distributor. This results in the momentary switching of trigger B2 in a positive voltage on leads 116 and 169, as well as in a positive voltage on lead 502 which results in controlling one of relays 10A, 10B or 10C (FIGURE 4*l*).

Similar results are repeated on each control of relay R35 (FIGURE 21*a*), for example, if push button 522 is used) until the energization of relay R31. Contact **R31–*a*** (FIGURE 4*m*) is opened then, preventing any new control from trigger B16 through contact **R35–*a***.

The triggers of groups HAB, FAB—HBC, FBC—HCA, FCA may be assumed in any condition. Similarly, memories M1, M2, M3 (FIGURE 4*n*) may also be assumed in any condition.

As concerns the first feed control, some of leads **438*a*, 438*b*, 438*c*** (FIGURE 4*k*) are originally at a positive voltage. At least one of leads **466*a*, 466*b* and 466*c* is also positive after the connections effected between hubs 447*a*, 447, and the hubs generally referenced 453, 460 or 473. Therefore, when the positive voltage occurs on lead 502** (FIGURE 4*l*), one of relays 10A, 10B, 10C at least is energized. Let it be assumed that relay 10A is energized. This relay is maintained by cam contact C10–A (FIGURE 21*b*), now closed, contact 10A–1 and winding 10AM. At the same time a circuit is made with clutch magnet 526a, through contact R35–e. Thus there occurs a first feed control to card reader A, which causes the first card to be advanced to position 55 (FIGURE 3) to close contact 511a (see also FIGURE 21b) and to energize relay 3A. This energization occurs on the closing of cam contact C15A.

At the same time cam contacts C1A, C2A (FIGURE 4m) are operated, thus causing triggers B11 and B16 to be controlled and all the functions controlled from these triggers to be controlled. Lead 502, in particular, is made momentarily positive, thus causing relays 10A, 10B, 10C (FIGURE 4l) to be energized.

Let it be supposed that this control affects again relay 10A. A new card feed in card reader A results, which will advance the first card from location 55 (FIGURE 3) to location 57. At the same time the second card will come to location 55. During its advance from location 55 to location 57, the first card will be scanned by prescanning brushes 56 and recorded into memories M1.

During that cycle, relay 5A in particular is energized (see FIGURE 21b) when cam C16A closes its contact and is maintained through contact 5A–1 and cam contact C6A. Contact 5A–3 being closed, the pulses delivered by cams C11A and C12A are directed towards roll 527a and brushes 56a. Later contact 512a is closed, and relay 2A is energized, the latter energization being performed when cam C15A closes its contact. The opening of contact 4A–2 results, which prevents relay 7A from being energized and prohibits temporarily any new feed in card reader A. As seen above, the first card in card reader A has been recorded into memory 1 and therefore the feeding operations in that card reader are to be conditioned to the scanning of the cards contained in card readers B and C. It may be remarked that relay 7A is energized originally as soon as contact 1A-1 (of relay 1A) is closed, contacts 4A–2 and 8A–1 being off at that time. The opening of contact 4A–2 causes relay 7A to be de-energized, which causes contact 7A–1 to be reset (FIGURE 4a). Cams C1A and C2A (FIGURE 4m) operating in the usual way results in a series of comparison operations controlled as already described under the control of trigger B11, which comparison operations are particular in that the condition of triggers HAB and FCA (FIGURE 4j) is set in advance because contact 7A–1 (FIGURE 4a) is reset and lead 271a (FIGURE 4j) is at a negative voltage. In such a case, as seen previously, lead 438a (FIGURE 4k) is at a negative voltage, so that the following feed control can affect only card readers B and C.

Let is be supposed that these controls affect first card reader B. The results will be successively:

(1) Control of relay 10B (FIGURE 4l);

(2) This relay is held by cam contact C10B (FIGURE 21c);

(3) Clutch 526b is controlled;

(4) Relays 3B, 5B, 4B are successively energized (it will be noted that FIGURE 21c is identical in all points to FIGURE 21b, except, of course as concerns index numbers and references). The first one of the cards stored in the hopper of that card reader will be successively advanced to position 55 then to position 57, and during the passage from position 55 to position 57, this card is recorded into memory M2. At the same time, contact 4B–2 is opened, so that relay 7B is de-energized, and contact 7B–1 is reset (FIGURE 4a), and so that any new feed control is prohibited in card reader B.

The following feed control will therefore affect card reader C so that successively:

(1) Relay 10C is energized (FIGURE 4l);

(2) The same relay is held through contact C10C (FIGURE 21d);

(3) Clutch 526c is controlled;

(4) Relays 3C, 5C, and 4C are successively energized.

At the same time the first one of the cards contained in card reader C will be advanced successively to position 55 (FIGURE 3) then to position 57, and during the advance from position 55 to position 57, this card is recorded into memory M3. Contact 4C–2 (FIGURE 21d), on opening, will cause relay 7C to be de-energized; however, this relay will be re-energized immediately after, at the same time as relays 7A and 78.

It may be noted that the first cards contained in card readers A, B, and C are now recorded into their respective memories. These cards may be compared two by two, and the card readers may be controlled respectively in accordance with the card content.

Relay 4C (FIGURE 21d) being energized, relay RB1 (FIGURE 21a) may be energized in turn when contact C5C is closed because contacts C5A and C5B are now closed, as are contacts 4A–4, 4B–4, and 4C–4. This relay is held by its winding R31M, its contact R31–b and contact R32–a in the off condition. Through its contacts R31–d, R31–j, R31–h (FIGURES 21b to 21d), it immediately causes relays 7A, 7B, 7C to be re-energized; and through its contacts R31–c, R31–e, R31–g, it prepares the energization of relays 8A, 8B, 8C. It is to be noted that none of the latter relays may be energized now because contacts 5A–2, 5B–2, 5C–2 are open.

At the same time as the recording of the first card contained in card reader C into memory M3, the control of triggers B11, B16 (FIGURE 4m) is effected through cam contact C1C. One of relays 10A, 10B, 10C (FIGURE 4l) may be controlled according to the results from the comparisons effected at that moment. Let is be supposed that this control concerns relay 10A, a new control of clutch 526a (FIGURE 21b) results, which causes the cards to be advanced in card reader A. Relay 6A is energized on the closing of contact C16A to be held through cam contact C6A. Contact 6A–3 being closed, the pulses of cams C11A, C12A, are distributed to roll 528a and therethrough to brushes 58a, which permits the card passing under these brushes to be recorded into memory M4 (see FIGURE 3).

*End of the Operation*

The circuits will be described only for card reader A, the circuits of card readers B and C operating similarly.

The run out of the cards in the hopper of card reader A causes contact 510A (FIGURE 21b) to open and relay 2A to be de-energized. Contact 2A–3 (FIGURE 21a) is opened, which causes relays R34, R35 to be de-energized because of the opening of contact R34–b and contacts R35–e, R35–f, R35–g (FIGURES 21b to 21d) to open. The control of clutch magnets 526a, 526b, 526c is thus momentarily deferred, momentarily prohibiting any card feed, and permitting the hopper to be refilled if the operation has not come to an end.

When the work to be performed is completed, the operations may be caused to come to an end by operating push button 529 (FIGURE 21a). Relay R33 is energized thereby which causes relays 9A to be immediately energized (FIGURE 21b). Cam contact C9A is now closed, as is contact 2A–1, the latter because of the de-energization of relay 2A. Relay 3A is still energized so that contact 3A–3 is made. Relay 9A is held by its winding 9AM (FIGURE 21a) its contact 9A–2 and contact R32–a. At the same time contact 9A–1 closes, thus restoring the control circuit of relay R34, which may be energized again by operating push button 523. The last card contained in card reader A, which was in position 55 (see FIGURE 3) is advanced to position 57. At the same time this card is recorded into memory M1. It may be noted that relay 5A (FIGURE 21b) is then de-energized.

On the following card feed control, this last card is advanced past brushes 58 (FIGURE 3) and is directed towards card stackers 54. Relay 6A is de-energized and relay 8A is energized. Contact R31–c is now closed. Contact 5A–2 is reset when relay 5A is de-energized, i.e., on the preceding feed control. Relay 8A is held by its winding 8AM (FIGURE 21*a*), its contact 8A–3 and contact **R32–*a*. By its contact 8A–1** (FIGURE 21*b*), it interrupts the pick-up circuit of relay 7A, thus resetting contact 7A–1 (FIGURE 4*a*). Consequently, as seen before, triggers HAB and FCA (FIGURE 4*j*) are systematically switched, which makes lead **438*a*** (FIGURE 4*k*) negative and directs all the new feed controls to card readers B and C.

Similar operations may be repeated for card reader B about the opening of contact **510*b*** (FIGURE 21*c*) and when relay 2B is de-energized provided push buttons 529 and 523 (FIGURE 21*a*) are operated again. Similarly, the energization of relays 9B and 8B (FIGURE 21*c*) and the holding of these relays (FIGURE 21*a*) is realized. Relay 7B (FIGURE 21*c*) in particular is de-energized, thus resetting contact 7B–1 (FIGURE 4*a*) and systematically switching triggers FAB and HBC (FIGURE 4*j*). Lead **438*b*** (FIGURE 4*k*) goes negative, so that all the new feed control signals will now affect card reader C.

Similarly, relays 9C and 8C (FIGURES 21*a* and 21*d*) will be energized when the cards run out in card reader C. Relay R32 is then energized, thus causing all relays which are held through contact **R32–*a*** to be de-energized.

*Ejection of the Cards Without Any Computation*

Operating push button 530 (FIGURE 21*a*) will cause relay R37 to be energized. Relay **11*a*** (FIGURE 21*b*) for card reader A may be then energized when contact 2A–2 has been turned off, i.e., when the cards have been removed from the hopper. Contact 11A–1 controls clutch magnet **526*a*, whereas contact 11A–3** interrupts the transmission of the pulses from contacts C11A, C12A. Under the same conditions, contact R37–*d* (FIGURE 4*m*) interrupts feeding to cams C1A, C1B, C1C.

*Stacker Control*

Connections made, for example, from the hubs generally referenced 494, 495, 496, 497 (FIGURE 4*l*) and directed towards hubs **531*a* or 532*a*** (FIGURE 21*b*) for card reader A, permit the control of one of relays 12A or 13A. Magnet **533*a* controlled either on the closing of cam contact C13A or on the closing of cam contact C14A permits the cards to be directed towards the second or the third of stackers 54** (see FIGURE 3).

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a data processing machine, a plurality of card feeds, first and second storage units for each of said card feeds, means for entering data from successively fed cards from said card feeds into the respective ones of said first and second storage units, a program unit, a comparison unit under control of said program unit for comparing selected data from said storage units, auxiliary storage units for storing the results of said comparisons, and means under control of the results of said comparisons for selectively controlling said card feeds and for altering the control exercised by said program unit on said comparison unit.

2. Apparatus according to claim 1 wherein said program unit includes means for selectively establishing priorities among said plurality of cards.

3. Apparatus according to claim 2 wherein said program unit further includes means for selectively establishing priorities for said card feeds in accordance with the condition of the cards fed.

4. Apparatus according to claim 2 wherein said program unit further includes means for eliminating comparisons between certain fields under predetermined conditions.

5. Apparatus according to claim 2 wherein said comparison unit includes controls for selectively altering the type of comparison performed.

6. Apparatus according to claim 3 wherein said first and second storage units are scannable magnetic card devices adapted to deliver characters serially.

7. Apparatus according to claim 3 wherein said program unit includes operator controllable means for changing the selective control exercised by said program unit.

8. In a data processing machine, a plurality of record feeds, first and second storage units for each of said record feeds, means for entering data from each record feed successively into the corresponding ones of said storage units, a program unit, a comparison unit under control of said program unit for comparing selected data from said storage units, auxiliary storage units for storing the results of comparisons made in said comparison unit, and means under control of said auxiliary storage units for selectively controlling the operation of said card feeds and for altering the control exercised by said program unit on said comparison unit.

References Cited in the file of this patent

UNITED STATES PATENTS 2,955,710 Piatt et al. ............. Oct. 11, 1960